(12) United States Patent
Ohta et al.

(10) Patent No.: US 7,715,302 B2
(45) Date of Patent: May 11, 2010

(54) OPTICAL ELEMENT AND OPTICAL PICKUP APPARATUS

(75) Inventors: Tatsuo Ohta, Otsuki (JP); Takashi Nozaki, Hino (JP); Yayoi Eguro, Hachioji (JP); Takeshi Kojima, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 1071 days.

(21) Appl. No.: 11/055,122

(22) Filed: Feb. 11, 2005

(65) Prior Publication Data

US 2005/0201422 A1 Sep. 15, 2005

(30) Foreign Application Priority Data

Feb. 16, 2004 (JP) .............................. 2004-038061

(51) Int. Cl.
*G11B 7/00* (2006.01)

(52) U.S. Cl. ........................... 369/112.21; 369/112.23; 369/112.26; 369/118; 369/112.22; 428/383; 428/448

(58) Field of Classification Search ............ 369/112.06, 369/112.08, 112.11, 112.23, 112.25, 112.26; 428/383, 448; 524/427; 350/581, 586, 589
See application file for complete search history.

(56) References Cited

U.S. PATENT DOCUMENTS 4,784,467 A * 11/1988 Akatsuka et al. ............ 359/588
5,181,141 A * 1/1993 Sato et al. ................... 359/580
5,725,959 A * 3/1998 Terada et al. ................ 428/448
5,789,476 A * 8/1998 Iryo et al. ................... 524/430
5,858,077 A * 1/1999 Kayanoki ............. 106/287.11
6,819,498 B1 * 11/2004 Watanabe et al. ........... 359/656
6,964,806 B1 * 11/2005 Tazaki ..................... 428/195.1
2002/0142533 A1 * 10/2002 Uchimaru et al. ........... 438/200
2003/0030909 A1 * 2/2003 Ukuda ........................ 359/582
2004/0042753 A1 * 3/2004 Steenblik et al. ............ 385/131
2004/0142185 A1 * 7/2004 Takushima ................... 428/447
2004/0240093 A1 * 12/2004 Yoshikawa et al. .......... 359/883

\* cited by examiner

Primary Examiner—Wayne R Young
Assistant Examiner—Linh T Nguyen
(74) Attorney, Agent, or Firm—Finnegan, Henderson, Farabow, Garrett & Dunner, L.L.P.

(57) ABSTRACT

An optical element for use in an optical pickup apparatus includes a substrate made of resin; an antireflection layer coating the substrate and having a low refractive index layer and a high refractive index layer, wherein the resin includes a polymer with an alicyclic structure, the low refractive index layer is formed of a material selected from the group consisting of silicon oxide; aluminum fluoride; yttrium fluoride; magnesium fluoride; a mixture of silicon oxide and aluminum oxide; and a mixture thereof, the high refractive index layer is formed of a material selected from the group consisting of scandium oxide; niobium oxide; lanthanum oxide; praseodymium titanate; lanthanum titanate; lanthanum aluminate; yttrium oxide; hafnium oxide; zirconium oxide; tantalum oxide; a mixture of tantalum oxide and titanium; silicon nitride; and a mixture thereof.

36 Claims, 7 Drawing Sheets

OPTICAL ELEMENT AND OPTICAL PICKUP APPARATUS

FIELD OF THE INVENTION

The present invention relates to an optical element and an optical pickup apparatus, particularly relates to an optical element for transmitting a light flux from a light source emitting short wavelength light and an optical pickup apparatus employing the optical element.

BACKGROUND OF THE INVENTION

Recently, research and development of high density optical disk system capable of recording and/or reproducing information by the use of a semiconductor laser emitting violet light with wavelength of about 400 nm are rapidly progressed. For example, by an optical disk system for recording and/or reproducing information according to the specification of NA0.65 and light source wavelength of 407 nm, can reduced information of 20 to 30 GB per on one surface of a 12 cm optical disk which is the same size as a DVD having NA of 0.65, light wavelength of 650 nm, memory capacity of 4.7 GB (cf. patent document 1).

Patent document 1: Japanese Patent Tokkai No. 2003-303436.

SUMMARY OF THE INVENTION

In the optical pickup apparatus, an optical element made from plastic is frequently employed, which are relatively cheep in the cost and easily produced by mass production. It has been known that short wavelength laser light emitted from a violet semiconductor laser degrades the durability of usual resins. Contrary to that, it has been known that a specific resin has resistivity against the short wavelength laser light. However, it is cleared by the test carried out by the inventors that the optical property of the optical element are considerably degraded when the optical element is irradiated for certain period by the short wavelength laser light emitted from the violet semiconductor laser.

The present invention is attained on the above-described background, and an object of the invention is to provide an optical element comprises synthesized resin and an antireflection layer formed on the resin and an optical pickup apparatus employing the optical element, which can inhibit a degradation of the optical property caused by the irradiation of the short wavelength laser light.

An optical element described in Item 1 is an optical element comprising resin as a substrate to be employed for an optical pickup apparatus having a light source emitting a light flux having a wavelength of 350 nm≦λ1≦540 nm, wherein the resin is a resin containing a polymer having a alicyclic structure and an antireflection layer which is formed on at least one surface of the substrate which is optical surface of the optical element, and the antireflection layer includes a low refractive layer having a first refractive index as to the light flux of wavelength of λ1 and a high refractive layer having a second refractive index higher than the first refractive index as to the light flux of wavelength of λ1, and the low refractive layer comprises a material or a mixture of materials such as silicon oxide, aluminum fluoride, yttrium fluoride, magnesium fluoride, a mixture of silicon oxide and aluminum oxide, or a mixture thereof, and the high refractive layer comprises a material or a mixture of materials such as scandium oxide, niobium oxide, lanthanum oxide, praseodymium titanate, lanthanum titanate, lanthanum aluminate, yttrium oxide, hafnium oxide, zirconium oxide, tantalum oxide, a mixture of tantalum oxide and titanium, silicon.

It has been found by the inventors as a result of their investigation on optical elements degraded in the optical property that the degradation of the optical property is caused by formation of fine hollows and wrinkles on the surface of the optical element on which the antireflection layer is formed. It is supposed according to the investigation by the inventors that chemical reaction of the antireflection layer containing titanium oxide usually employed as the high refractive layer and the plastic substrate is caused by laser light near 400 nm so that the plastic resin is deformed by degradation by oxidation.

Based on such the supposition, the inventors find out that the formation of the fine hollows and winkles on the surface of the optical element can be inhibited so that the optical property can be maintained for a long period even when the element is irradiated by the short wavelength light by selecting the materials of the antireflection layer based on judgment on the affinity of the resin of the substrate and the material. Such the antireflection layer comprises the low refractive layer comprising silicon oxide, aluminum fluoride, yttrium fluoride, magnesium fluoride, a mixture of silicon Oxide and aluminum oxide or a mixture thereof and the high refractive layer comprising scandium oxide, niobium oxide, lanthanum oxide, praseodymium titanate, lanthanum titanate, lanthanum aluminate, yttrium oxide, hafnium oxide, zirconium oxide, tantalum oxide, a mixture of tantalum oxide and titanium, silicon nitride, or a mixture thereof. The low refractive layer is a layer having (the first) refractive index of from 1.30 to 1.55 to light flux of 405 nm in the wavelength and the high refractive layer is a layer having (the second) refractive index of not less than 1.70. Furthermore, each material forming each layer described above means a main ingredient of each layer. The layer may include several percent of foreign substance.

The optical element described in Item 2 is the optical element of the embodiment of Item 1 wherein the high refractive layer comprises a material or a mixture of materials such as scandium oxide, lanthanum oxide, lanthanum aluminate, praseodymium titanate, lanthanum titanate, hafnium oxide, zirconium oxide, tantalum oxide, a mixture of tantalum oxide and titanium, and silicon nitride. A high inhibiting effect of the degradation of the optical property can be expected to such the layer.

The optical element described in Item 3 is the optical element of the embodiment of Item 1 wherein the high refractive layer comprises a material or a mixture of materials such as scandium oxide; lanthanum oxide; lanthanum aluminate; hafnium oxide; zirconium oxide; tantalum oxide; and silicon nitride. A high inhibiting effect to the degradation of the optical property can be expected to such the layer.

The optical element described in Item 4 is the optical element of the embodiment of any one of Items 1-3 wherein the antireflection layer has a two layer structure in which the low refractive layer and the high refractive layer are laminated in this order on the substrate of the resin.

The optical element described in Item 5 is the optical element of the embodiment of any one of Items 1-3 wherein the antireflection layer has a three layer structure in which the low refractive layer, the high refractive layer and the low refractive layer are laminated in this order on the substrate of the resin.

The optical element described in Item 6 is the optical element of the embodiment of any one of Items 1-3 wherein the antireflection layer further has a medium refractive layer having a third refractive index which comprises a material or a mixture of materials such as lanthanum fluoride; neodymium fluoride, cerium oxide, aluminum fluoride; lanthanum aluminate, lead fluoride, and aluminum oxide; accordingly an antireflection layer capable of lowering the reflectance as to a light flux of different wavelength can be formed by such the layer. The medium refractive layer is a layer having the (third) refractive index of from 1.55 to 1.70. Herein, "middle refractive index layer" means a layer having a (third) refractive index in a range of 1.55-1.70 when a light flux with a wavelength of 405 nm is irradiated on the layer.

The optical element described in Item 7 is the optical element of the embodiment of any one of Items 1-3 or 6 wherein the antireflection layer has a layer constitution comprising four or more laminated layers formed on the resin substrate. The layer construction allows wider wavelength range with low reflectance than constructions having two or three layers. Accordingly an antireflection layer capable of lowering the reflectance as to a light flux of different wavelength can be formed.

For example, there can be provided an antireflection layer restricted its reflectance low for at least one light flux among light fluxes with wavelength $\lambda 2$ which satisfies 620 nm$\leq \lambda 2 \leq$670 nm (for recording and reproducing DVD), and wavelength $\lambda 3$ which satisfies 760 nm$\leq \lambda 3 \leq$800 nm (for recording and reproducing CD) additionally to the light flux with wavelength $\lambda 1$ (350 nm$\leq \lambda 1 \leq$450 nm).

The optical element described in Item 8 is the optical element of the embodiment of Item 7 wherein the antireflective layer has a four layer structure in which a first layer is closest to the substrate surface and the first-fourth layers respectively comprising the high refractive index material, the low refractive index material, the high refractive index material and the low refractive index material are laminated on the resin substrate in this order and satisfy following expressions,

| First layer: | $1.7 \leq n1$, | $15 \text{ nm} \leq d1 \leq 36 \text{ nm}$ |
| Second layer: | $1.2 \leq n2 \leq 1.55$, | $25 \text{ nm} \leq d2 \leq 40 \text{ nm}$ |
| Third layer: | $1.7 \leq n3$, | $40 \text{ nm} \leq d3 \leq 150 \text{ nm}$ |
| Fourth layer: | $1.2 \leq n4 \leq 1.55$, | $90 \text{ nm} \leq d4 \leq 115 \text{ nm}$ | where n1-n4 are refractive indexes of materials of the first-fourth layers and d1-d4 are thickness of the first-fourth layers respectively.

The optical element described in Item 9 is the optical element of the embodiment of Item 7 wherein the antireflective layer has a five layer structure in which a first layer is closest to the substrate surface and the first-fifth layers respectively comprising the low refractive index material, the high refractive index material, the low refractive index material, the high refractive index material and the low refractive index material on the resin substrate in this order and satisfy following expressions,

| First layer: $1.2 \leq n1 \leq 1.55$, | $5 \text{ nm} \leq d1 \leq 20 \text{ nm}$ |
| Second layer: $1.7 \leq n2$, | $15 \text{ nm} \leq d2 \leq 35 \text{ nm}$ |
| Third layer: $1.2 \leq n3 \leq 1.55$, | $25 \text{ nm} \leq d3 \leq 45 \text{ nm}$ |
| Fourth layer: $1.7 \leq n4$, | $50 \text{ nm} \leq d4 \leq 130 \text{ nm}$ |
| Fifth layer: $1.2 \leq n5 \leq 1.55$, | $80 \text{ nm} \leq d5 \leq 110 \text{ nm}$ | where n1-n5 are refractive indexes of materials of the first-fifth layers and d1-d5 are thickness of the first-fifth layers respectively.

The optical element described in Item 10 is the optical element of the embodiment of Item 7 wherein the antireflective layer has a six layer structure in which a first layer is closest to the substrate surface and the first-sixth layers respectively comprising the high refractive index material, the low refractive index material, the high refractive index material, the low refractive index material, the high refractive index material and the low refractive index material on the resin substrate in this order and satisfy following expressions,

| First layer: | $1.7 \leq n1$, | $8 \text{ nm} \leq d1 \leq 15 \text{ nm}$ |
| Second layer: | $1.2 \leq n2 \leq 1.55$, | $35 \text{ nm} \leq d2 \leq 55 \text{ nm}$ |
| Third layer: | $1.7 \leq n3$, | $40 \text{ nm} \leq d3 \leq 60 \text{ nm}$ |
| Fourth layer: | $1.2 \leq n4 \leq 1.55$, | $10 \text{ nm} \leq d4 \leq 17 \text{ nm}$ |
| Fifth layer: | $1.7 \leq n5$, | $45 \text{ nm} \leq d5 \leq 90 \text{ nm}$ |
| Sixth layer: | $1.2 \leq n6 \leq 1.55$, | $70 \text{ nm} \leq d6 \leq 110 \text{ nm}$ | where n1-n6 are refractive indexes of materials of the first-sixth layers and d1-d6 are thickness of the first-sixth layers respectively.

The optical element described in Item 11 is the optical element of the embodiment of Item 7 wherein the antireflective layer has seven layer structure in which a first layer is closest to the substrate surface and the first-seventh layers respectively comprising the low refractive index material, the high refractive index material, the low refractive index material, the high refractive index material, the low refractive index material, the high refractive index material and the low refractive index material on the resin substrate in this order and satisfy following expressions,

| First layer: | $1.2 \leq n1 \leq 1.55$, | $80 \text{ nm} \leq d1 \leq 160 \text{ nm}$ |
| Second layer: | $1.7 \leq n2$, | $10 \text{ nm} \leq d2 \leq 25 \text{ nm}$ |
| Third layer: | $1.2 \leq n3 \leq 1.55$, | $33 \text{ nm} \leq d3 \leq 45 \text{ nm}$ |
| Fourth layer: | $1.7 \leq n4$, | $40 \text{ nm} \leq d4 \leq 85 \text{ nm}$ |
| Fifth layer: | $1.2 \leq n5 \leq 1.55$, | $10 \text{ nm} \leq d5 \leq 20 \text{ nm}$ |
| Sixth layer: | $1.7 \leq n6$, | $6 \text{ nm} \leq d6 \leq 70 \text{ nm}$ |
| Seventh layer: | $1.2 \leq n7 \leq 1.55$, | $60 \text{ nm} \leq d7 \leq 110 \text{ nm}$ | where n1-n7 are refractive indexes of materials of the first-seventh layers and d1-d7 are thickness of the first-seventh layers respectively.

The each optical element described in Items 8-11 provides an antireflection layer according to the optical element of the embodiment of Item 7, which comprises four-seven layers formed on the resin substrate, the layers are laminated alternatively with high refractive index materials and low refractive index material and have predefined refractive index values and thickness. Therefore, there can be provided an antireflection layer restricted its reflectance low for at least one light flux among light fluxes with wavelengths $\lambda 2$ and $\lambda 3$ additionally to the light flux with wavelength $\lambda 1$.

The optical element described in Item 12 is the optical element of the embodiment of any one Items 7-11 wherein the low refractive index layer comprises a material or a mixture of materials selected from the group consisting of silicon oxide; and a mixture of silicon oxide and aluminum oxide as a main ingredient, the high refractive index layer comprises a material or a mixture of materials selected from the group consisting of hafnium oxide; lanthanum aluminate; zirconium oxide; tantalum oxide; and silicon nitride as a main ingredient.

The optical element described in Item 12 provides, an antireflection layer according to the optical element of the embodiment of any one of Items 7-11, whose peeling and surface deformation are few for irradiation of a laser beam with wavelength of 405 nm-415 nm, whose light absorption amount is few for a beam with wavelength of 405 nm, and whose peeling and surface deformation are few even when it is left in a high-temperature and high humidity environmental atmosphere, by defining above materials of the low refractive index layers and high refractive index layers in the antireflection layer.

The optical element described in Item 13 is the optical element of the embodiment of any one Items 7-12 wherein the optical element further having a second light source emitting a light flux with at least one wavelength of λ1 and λ2 which satisfy following expressions, 620 nm≦λ2≦670 nm, 760 nm≦λ3≦800 nm, and the optical element transmits light fluxes emitted by a plurality of light sources including the first and second light sources.

The optical element described in Item 13 provides an antireflection layer can be applied for at least one of light fluxes for DVD and CD, additionally to the light flux for media using violet laser beam.

The optical element described in Item 14 is the optical element of the embodiment of any one of Items 1-13 wherein the resin having the alicyclic structure has a weight average molecular weight (Mw) of from 1,000 to 1,000,000 and contains an alicyclic repeating unit (a) represented by the following Formula (1) and a chain structure repeating unit (b) represented by the following Formula (2) or (3) in a content of not less than 90% by weight in total, and the content of the repeating unit (b) is not less than 1% and less than 10% by weight. It is particularly preferable that the chain of the repeating units (a) of the polymer satisfies the expression of A≦0.3×B wherein A=(Weight average molecular weight of the chain of the repeating units having the alicyclic structure), and B=(Weight average (Mw) of the copolymer of the alicyclic hydrocarbon)×(Number of the repeating unit having the alicyclic structure/Entire number of the repeating unit constituting the alicyclic hydrocarbon copolymer)

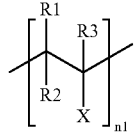

Formula (1)

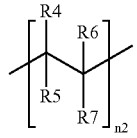

Formula (2)

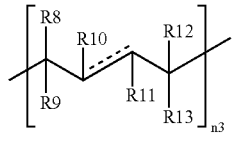

Formula (3)

R1-R13 in Formula (1), (2) and (3) each independently represent a hydrogen atom, a halogen atom, an alkoxy group, a hydroxyl group, an ether group, an ester group, a cyano group, an amido group, an imido group, a silyl group, or a chain hydrocarbon group. The chain hydrocarbon group may be substituted with a polar group of a halogen atom, an alkoxy group, a hydroxyl group, an ether group, an ester group, a cyano group, an amido group, an imino group or a silyl group. Among them, a hydrogen atom or a chain hydrocarbon group having a carbon number of 1-6 is preferred because of excellent heat resistance and a low water absorbing property. Halogen atoms include a fluorine atom, a chlorine atom, a bromine atom and an iodine atom. Chain hydrocarbon groups substituted by a polar group include, for example, a halogenated alkyl group having a carbon number of 1-20, preferably of 1-10 and more preferably of 1-6. Chain hydrocarbon groups include, for example, an alkyl group having a carbon number of 1-20, preferably of 1-10 and more preferably of 1-6; and alkenyl group having a carbon number of 2-20, preferably of 2-10 and more preferably of 2-6.

X in Formula (1) represents an alicyclic hydrocarbon group, and the carbon number constituting which is generally 4-20, preferably 4-10 and more preferably 5-7. By setting the carbon number constituting an alicyclic structure into this range, double refraction can be reduced. Further, an alicyclic structure may include not only a monocyclic structure but also polycyclic structures such as a norbornane ring and a dicyclohexane ring.

The alicyclic hydrocarbon group may be provided with a carbon-carbon unsaturated bond, however, the content is not more than 10%, preferably not more than 5% and more preferably not more than 3%, based on the total carbon-carbon bonds. By setting the content of carbon-carbon unsaturated bonds of an alicyclic hydrocarbon group into this range, transparency and heat resistance are improved. Further, to carbon atoms constituting an alicyclic hydrocarbon group, bonded may be such as a hydrogen atom, a hydrocarbon group, a halogen atom, an alkoxy group, a hydroxyl group, an ether group, an ester group, a cyano group, an amido group, an imido group, a silyl group and a chain hydrocarbon group substituted by a polar group (a halogen atom, an alkoxy group, a hydroxyl group, an ether group, an ester group, a cyano group, an amido group, an imino group or a silyl group). Among them, a hydrogen atom or a chain hydrocarbon group having a carbon number of 1-6 is preferred because of excellent heat resistance and a low water absorbing property.

Further, . . . in Formula (3) represents a carbon-carbon saturated bond or a carbon-carbon unsaturated bond, and the content of an unsaturated bond is generally not more than 10%, preferably not more than 5% and more preferably not more than 3%, based on the total carbon-carbon bonds constituting the main chain, when transparency and heat resistance are strongly required.

Among repeating units represented by Formula (1), the repeating units represented by Formula (4) is excellent with respect to heat resistance and a low water absorbing property.

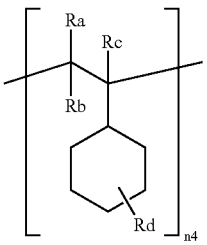

Formula (4)

Among repeating units represented by Formula (2), the repeating units represented by Formula (5) is excellent with respect to heat resistance and a low water absorbing property.

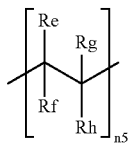

Formula (5)

Among repeating units represented by Formula (3), the repeating units represented by Formula (6) is excellent with respect to heat resistance and a low water absorbing property.

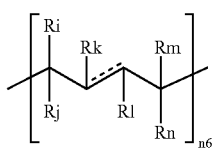

Formula (6)

Ra, Rb, Rc, Rd, Re, Rf, Rg, Rh, Ri, Rj, Rk, Rl, Rm and Rn in Formula (4), (5) and (6) each independently represent a hydrogen atom or a lower chain hydrocarbon group, and hydrogen atom or a lower alkyl group having a carbon number of 1-6 is preferred due to excellent with respect to heat resistance and low water absorbability.

Among repeating units of a chain structure represented by Formula (2) and (3), the repeating units of a chain structure represented by Formula (3) exhibits a more excellent strength property of obtained hydrocarbon type polymer.

In this invention, the sum content of repeating unit (a) provided with an alicyclic structure represented by Formula (1) and repeating unit (b) provided with a chain structure represented by Formula (2) and/or Formula (3), in hydrocarbon copolymer, is generally not less than 90%, preferably not less than 95% and more preferably not less than 97%, based on weight. By setting the sum content into the aforesaid range, low double refraction, heat resistance, low water absorbability and mechanical strength are highly suitably balanced.

The content of repeating unit (b) provided with a chain structure in an alicyclic hydrocarbon type copolymer is appropriately selected depending on the objective of application, however, is generally in a range of 1-10%, preferably of 1-8% and more preferably of 2-6%, based on weight. When the content of repeating unit (b) is in the aforesaid range, low double refraction, heat resistance and low water absorbability are highly suitably balanced.

Further, a chain length of repeating unit (a) is sufficiently short compared to a molecular chain length of an alicyclic hydrocarbon type copolymer, and specifically A is in a range of not more than 30% of B, preferably not more than 20%, more preferably not more than 15% and most preferably not more than 10%, when A=(a weight average molecular weight of a repeating unit chain provided with an alicyclic structure) and B=(a weight average molecular weight of an alicyclic hydrocarbon type copolymer (Mw)×(a number of repeating units provided with an alicyclic structure/a number of the whole repeating unit constituting an alicyclic hydrocarbon type copolymer)). Low double refraction is inferior when A is out of this range.

Further, a chain length of repeating unit (a) preferably has a specific distribution. Specifically, A/C is preferably in a range of not less than 1.3, more preferably 1.3-8 and most preferably 1.7-6, when A=(a weight average molecular weight of a repeating unit chain provided with an alicyclic structure) and C=(a number average molecular weight of a repeating unit chain provided with an alicyclic structure). A blocking degree increases when A/C is excessively small while a random degree increases when A/C is excessively large and low double refraction is inferior in the both cases.

The molecular weight of an alicyclic hydrocarbon type copolymer is in a range of 1,000-1,000,000, preferably 5,000-500,000, more preferably 10,000-300,000 and most preferably 50,000-250,000 as a polystyrene (or polyisoprene) equivalent weight average molecular weight which is measured by means of gel permeation chromatography (hereinafter, referred to as GPC). A strength property of the molded material is inferior when the weight average molecular weight of an alicyclic hydrocarbon type copolymer is excessively small, while the double refraction of the molded material become large when it is excessively too large.

The molecular weight distribution of such copolymers can be appropriately selected depending on the objective of the application, however, it is generally in a range of not more than 2.5, preferably not more than 2.3 and more preferably not more than 2, as a ratio (Mw/Mn) of a polystyrene (or polyisoprene) equivalent weight average molecular weight which is measured by means of GPC (Mw) to a number average molecular weight (Mn). Mechanical strength and heat resistance can be highly suitably balanced when Mw/Mn is in this range.

The glass transition temperature (Tg) of the copolymer may be suitably selected depending on the objective of the application, however, is generally 50-250° C., preferably 70-200° C. and more preferably 90-180° C.

The optical element described in Item 15 is the optical element of the embodiment of Item 14 wherein the polymer having the alicyclic structure is a block polymer having a polymer block A containing a repeating unit 1 represented by Formula (11) and a polymer block B containing the repeating unit 1 represented by Formula (11) and a repeating unit 2 represented by Formula (12) or/and a repeating unit 3 represented by Formula (13), and the mole ratio a (mole-%) of the repeating unit 1 in the polymer block A and the mole ratio b (mole-%) of the repeating init 1 in the polymer block B has a relation of a>b.

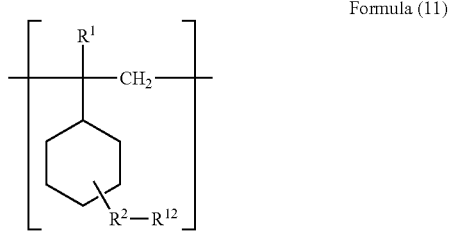

Formula (11)

In the formula, $R^1$ is a hydrogen atom or an alkyl group having 1 to 20 carbon atoms, $R^2$ through $R^{12}$ are each independently a hydrogen atom, an alkyl group having 1 to 20 carbon atoms, a hydroxyl group, an alkoxyl group having 1 to 20 carbon atoms or an halogen atom.

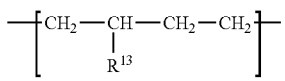

Formula (12)

In the formula, $R^{13}$ is a hydrogen atom or an alkyl group having 1 to 20 carbon atoms.

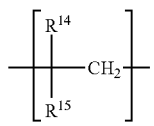

Formula (13)

In the formula, $R^{14}$ and $R^{15}$ are each independently a hydrogen atom or an alkyl group having 1 to 20 carbon atoms. A preferable structure of repeating unit [1] represented by above Formula (11) is one in which $R^1$ is a hydrogen atom or a methyl group and all of $R^2$-$R^{12}$ are hydrogen atoms. The transparency and mechanical strength are superior when the content of repeating unit [1] in polymer block [A] is in the above range. In polymer block [A], the residual parts except aforesaid repeating unit [1] are repeating units arising from chain conjugated dienes or chain vinyl compounds which have been hydrogenated.

Polymer block [B] contains aforesaid repeating unit [1] and repeating unit [2] represented by following Formula (12) and/or [3] represented by following Formula (13). The content of repeating unit [1] in polymer block [B] is preferably 40-95 mol % and more preferably 50-90 mol %. The transparency and mechanical strength are superior when the content of repeating unit [1] is in the above range. When a mol fraction of repeating unit [2] in polymer block [B] is m2 (mol %) and a mol fraction of repeating unit [3] is m3 (mol %), 2×m3+m2 is preferably not less than 2 mol %, more preferably 5-60 mol % and most preferably 10-50 mol %.

A preferable structure of repeating unit [3] represented by above Formula (13) is one in which $R^{14}$ is a hydrogen atom and $R^{15}$ is a methyl group or an ethyl group.

The mechanical strength is decreased when the content of aforesaid repeating unit [2] or repeating unit [3] in polymer block [B] is excessively small. Therefore, transparency and mechanical strength are superior when the content of repeating unit [2] and repeating unit [3] is in the above range.

Polymer block [B] may contain repeating unit [X] represented by following Formula (X). The content of repeating unit [X] is in a range not to damage the property of a block copolymer of this invention, and is preferably not more than 30 mol % and more preferably not more than 20 mol %, based on the total block copolymer.

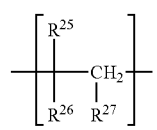

Formula (X)

In the formula, $R^{25}$ represents a hydrogen atom or an alkyl group having a carbon number of 1-20, $R^{26}$ represents a nitrile group, an alkoxycarbonyl group, a formyl group, a hydroxycarbonyl group or a halogen group, and $R^{27}$ represents a hydrogen atom. $R^{25}$ and $R^{27}$ may represent an acid anhydride group or an imido group by bonding to each other.

Further, polymer block [B] utilized in this invention preferably satisfy the relationship of a>b, when the mol fraction of repeating unit [1] in polymer block [A] is a, and the mol fraction of repeating unit [1] in polymer block [B] is b. Thereby, transparency and mechanical strength are superior.

Further, with respect to block copolymer utilized in this invention, the ratio ma/mb is preferably 5/95-95/5, more preferably 30/70-70/30 and most preferably 40/60-60/40, when ma is a mol number of total repeating units constituting block [A] and mb is a mole number of total repeating units constituting block [B]. Mechanical strength and heat resistance are superior when ma/mb is in the above range.

The molecular weight of an block copolymer utilized in this invention is preferably in a range of 10,000-300,000, more preferably 15,000-250,000 and most preferably 20,000-200,000 as a polystyrene (or polyisoprene) equivalent weight average molecular weight (hereinafter, described as Mw) which is measured by means of gel permeation chromatography employing tetrahydrofuran (THF) as a solvent. The balance of mechanical strength, heat resistance and a molding property is superior when Mw of a block copolymer is in the above range.

The molecular weight distribution of a block copolymer can be appropriately selected depending on the objective of the application, however, it is preferably not more than 5, more preferably not more than 4 and most preferably not more than 3, as a ratio (Mw/Mn) of a polystyrene (or polyisoprene) equivalent weight average molecular weight which is measured by means of GCP (hereinafter referred to as Mw) to a number average molecular weight (Mn). Mechanical strength and heat resistance are superior when Mw/Mn is in this range.

The glass transition temperature (Tg) of the copolymer may be suitably selected depending on the objective of the application, however, is preferably 70-200° C., more preferably 80-180° C. and most preferably 90-160° C., as a high temperature side value measured by a differential scanning type thermal analyzer (hereinafter, described as DSC).

The above-described block copolymer utilized in this invention is provided with polymer block [A] and polymer block [B], and may be any of a di-block copolymer of ([A]-[B]) form, a tri-block copolymer of ([A]-[B]-[A]) or ([B]-[A]-[B]) and a block copolymer in which at least 4 blocks of polymer block [A] and polymer block [B] are bonded alternately. Further, it may be a block copolymer in which these blocks are bonded in a radial form.

DETAILED DESCRIPTION OF THE INVENTION

Figure 1:
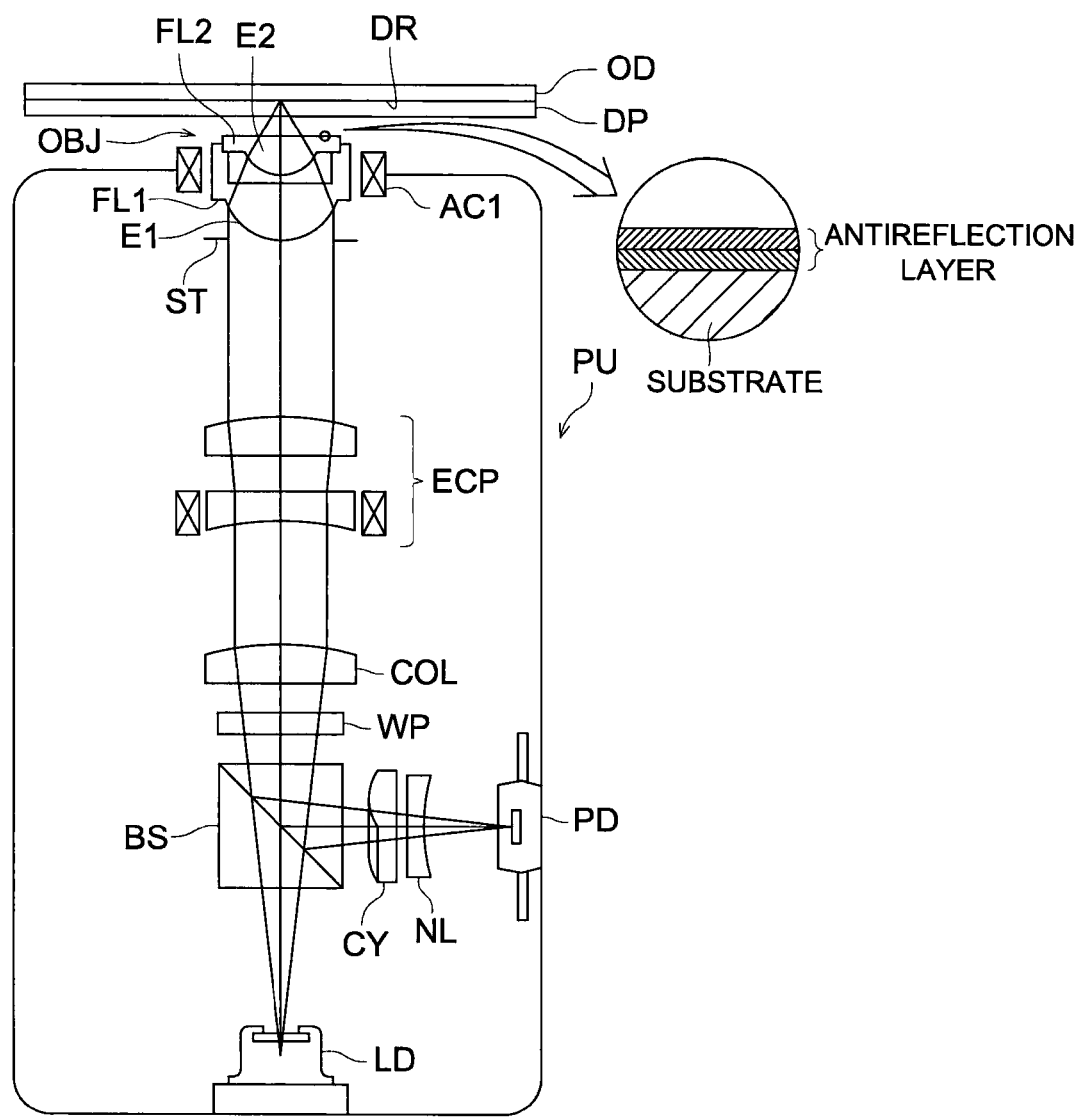
FIG. 1 shows a schematic cross section of an optical pickup apparatus capable of recording/reproducing information to/from an optical disk.

Manufacturing Method of Alicyclic Hydrocarbon Type Copolymer

Manufacturing method of alicyclic hydrocarbon type copolymer of this invention includes: (1) a method in which aromatic vinyl type compound and another copolymerizable monomer are copolymerized and carbon-carbon unsaturated bonds of the main chain and of aromatic ring are hydrogenated; and (2) a method in which alicyclic vinyl type compound and another copolymerizable monomer are copolymerized and the resulting product is appropriately hydrogenated.

In the case of manufacturing an alicyclic hydrocarbon type copolymer of this invention according to the aforesaid method, it can be efficiently prepared by hydrogenating carbon-carbon unsaturated bonds in the main chain and unsaturated rings such as an aromatic or a cycloalkene ring of a copolymer, which is a copolymer of an aromatic vinyl type compound and/or an alicyclic vinyl type compound (a') and copolymerizable another monomer (b') and a repeating unit arising from compound (a') in the copolymer is provided with a chain structure in which D is not more than 30% of E, preferably not more than 20%, more preferably not more than 15% and most preferably not more than 10%, when D=(the weight average molecular weight of a repeating unit chain arising from an aromatic vinyl type compound and/or an alicyclic vinyl type compound) and E=(the weight average molecular weight of hydrocarbon type copolymer (Mw)×(the number of a repeating unit chain arising from an aromatic vinyl type compound and/or an alicyclic vinyl type compound/the total number of repeating unit constituting a hydrocarbon type copolymer)). The low double refraction property of the obtained alicyclic hydrocarbon type copolymer is inferior when D is out of the aforesaid range.

In this invention, method (1) is preferred to prepare an alicyclic hydrocarbon type copolymer more efficiently.

Copolymers before the above-described hydrogenation is further preferably have D/F in a definite range when F=(a number average molecular weight of a repeating unit chain arising from an aromatic vinyl type compound and/or an alicyclic vinyl type compound). Specifically, D/F is preferably in a range of not less than 1.3, more preferably 1.3-8 and most preferably 1.7-6. The low double refraction property of the obtained alicyclic hydrocarbon type copolymer is inferior when D/F is out of this range.

The weight average molecular weight and number average molecular weight of a repeating unit arising from the aforesaid compound (a') can be determined, for example, by a method, described in Macromolecules, vol. 16, pp. 1925-1928 (1983), in which unsaturated double bonds in an aromatic vinyl type copolymer are reductive cleaved after having been subjected to ozone addition and the molecular weight of obtained aromatic vinyl chain is measured.

The molecular weight of a copolymer before hydrogenation is in a range of 1,000-1,000,000, preferably 5,000-500,000 and more preferably 10,000-300,000, as a polystyrene (or polyisoprene) equivalent weight average molecular weight which is measured by means of GCP. A strength property of the obtained alicyclic hydrocarbon type copolymer is inferior when the weight average molecular weight (Mw) of the copolymer is excessively small, while the hydrogenation reactivity is inferior when it is excessively large.

Specific examples of aromatic vinyl type compounds utilized in above-described method (1) include, for example, styrene, α-methylstyrene, α-ethylstyrene, α-propylstyrene, α-isopropylstyrene, α-t-butylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlorostyrene, dichlorostyrene, monofluorostyrene and 4-phenylstyrene, and such as styrene, 2-methylstyrene, 3-methylstyrene and 4-methylstyrene are preferable.

Specific examples of alicyclic vinyl type compounds utilized in above-described method (2) include, for example, cyclobutylethylene, cyclopentylethylene, cyclohexylethylene, cycloheptylethylene, cyclooctylethylene, nolbonylethylene, dicyclohexylethylene, α-methylcyclohexylethylene, α-t-butylcyclohexylethylene, cyclopentenylethylene, cyclohexenylethylene, cycloheptenylethylene, cyclooctenylethylene, cyclodecenylethylene, nolbonenylethylene, α-methylcyclohexenylethylene and α-t-butylcyclohexenylethylene, and cyclohexylethylene and α-methylcyclohexylethylene are preferable among them.

These aromatic vinyl type compounds and alicyclic vinyl type compounds can be utilized alone or in combination of two or more types.

Copolymerizable another monomers are not specifically limited, and utilized are such as chain vinyl compounds and chain conjugated diene compounds. In the case of utilizing chain conjugated diene compounds, the operating properties in the manufacturing process is superior, as well as the strength property of obtained alicyclic hydrocarbon type copolymer is excellent.

Specific examples of chain vinyl compounds include, for example, chain olefin monomers such as ethylene, propylene, 1-butene, 1-pentene and 4-methyl-1-pentene; nitrile type monomers such as 1-cyanoethylene (acrylonitrile), 1-cyano-1-methylethylene (methacrylonitrile) and 1-cyano-1-chloroethylene (α-chloroacrylonitrile), (meth)acrylic acid ester type monomers such as 1-(methoxycarbonyl)-1-methylethylene (methacrylic acid methyl ester), 1-(ethoxycarbonyl)-1-methylethylene (methacrylic acid ethyl ester), 1-(propoxycarbonyl)-1-methylethylene (methacrylic acid propyl ester), 1-(butoxycarbonyl)-1-methylethylene (methacrylic acid butyl ester), 1-methoxycarbonylethylene (acrylic acid methyl ester), 1-ethoxycarbonylethylene (acrylic acid ethyl ester), 1-propoxycarbonylethylene (acrylic acid propyl ester) and 1-butoxycarbonylethylene (acrylic acid butyl ester); unsaturated fatty acid type monomers such as 1-carboxyethylene (acrylic acid), 1-carboxy-1-methylethylene (methacrylic acid) and maleic anhydride, preferable are chain olefin monomers and most preferable are ethylene, propylene and 1-butene.

Conjugated dienes include, for example, 1,3-butadiene, isoprene, 2,3-dimethyl-1,3-butadiene, 1,3-pentadiene and 1,3-hexadiene. Among these chain vinyl compounds and chain conjugated dienes, preferable are chain conjugated dienes and specifically preferable are butadiene and isoprene.

These chain vinyl compounds and chain conjugated dienes each can be utilized alone or in combination of two or more types.

A method to polymerize compounds (a') is not specifically limited and includes such as a one-step polymerization method (a batch method) and a monomer successive addition method (a method in which, after starting polymerization by using a part of the whole using amount of the monomer, polymerization is proceeded by successively adding the residual monomer). In particular, a hydrocarbon type copolymer provided with a preferable chain structure can be prepared by employing a monomer successive addition method. A copolymer before hydrogenation has the more random structure, the smaller is the aforesaid D, and/or the larger is the D/F. How much degree of random structure a copolymer has, is determined by a rate ratio of a polymerization rate of aromatic vinyl compound to that of copolymerizable another monomer, and the smaller is this rate ratio, the chain structure of more random structure has the copolymer.

According to the aforesaid monomer successive addition method, since uniformly mixed monomers are successively added into the polymerization system, it is possible to more decrease the polymerization selectivity of monomer in a polymer growth process by polymerization, different from a batch method, resulting in more random chain structure of the obtained copolymer. Further, the polymerization temperature can be stably maintained low because accumulation of polymerization reaction heat in the polymerization system is small.

In the case of a monomer successive addition method, polymerization is started by addition of an initiator in the state that generally 0.01-60 weight %, preferably 0.02-20 weight % and more preferably 0.05-10 weight % among the total using amount of the monomer presents as an initial monomer in a polymerization reaction vessel in advance. By setting the amount of the initial monomer in such a range, easily removed can be reaction heat generated in the initial reaction after starting polymerization resulting in preparation of a copolymer having a more random chain structure.

By continuing the reaction until a polymerization conversion ratio of the aforesaid monomer reaches to not less than 70%, preferably not less than 80% and more preferably not less than 90%, preparation of a copolymer having a more random chain structure results. Thereafter, the residual portion of the aforesaid monomer is discontinuously added to the reaction system, and the addition rate is determined in view of consumption rate of the monomer in the polymerization system.

The addition of the residual monomer is adjusted to finish in a range of 0.5-3 times, preferably 0.8-2 times and more preferably 1-1.5 times, of a time duration given by a relation [(100−I)×T/I], when a required time until the polymerization conversion ratio of the initial monomer reaches to 90% is T, and the ratio (%) of the initial monomer to the total monomer utilized is I. Specifically, the addition rates of the initial monomer and of the residual monomer are determined so that the addition time duration of the residual monomer is in a range of generally 0.1-30 hours, preferably 0.5-5 hours and more preferably 1-3 hours. Further, a polymerization conversion ratio of the total monomer immediately after the finish of the monomer addition is generally not less than 80%, preferably not less than 85% and more preferably not less than 90%. By setting a polymerization conversion ratio of the total monomer immediately after the finish of the monomer addition to the aforesaid range, obtained copolymer have a more random chain structure.

The polymerization method includes such as radical polymerization, anion polymerization and cation polymerization, and is not specifically limited. However, anion polymerization is preferred in view of polymerization operation, easiness of a hydrogenation reaction in the post process and mechanical strength of a finally obtained hydrocarbon type copolymer.

In the case of radical polymerization, block polymerization, solution polymerization, suspension polymerization and emulsion polymerization in the presence of an initiator, in a temperature range of generally 0-200° C. and preferably 20-150° C. can be employed, and in particular, in the case of prevention of impurity mixing in resin is required, block polymerization and suspension polymerization are preferred. As a radical initiator, utilized can be organic peroxides such as benzoyl peroxide, lauroyl peroxide and t-butyl-peroxy-2-ethylhexaate, azo compounds such as azobisbutyronitrile, 4,4-azobis-4-cyanopenoic acid and azodibenzoyl, water-soluble catalysts exemplified by potassium persulfate and ammonium persulfate and redox initiators.

In the case of anion polymerization, block polymerization, solution polymerization and slurry polymerization in the presence of an initiator, in a temperature range of generally 0-200° C., preferably 20-100° C. preferably and specifically preferably 20-80° C. can be employed, however, solution polymerization is preferred in view of removal of reaction heat. In this case, an inert solvent which can dissolve the polymer and the hydrogenation product thereof is utilized. Inert solvents utilized in solution reaction include, for example, aliphatic hydrocarbons such as n-butane, n-pentane, iso-pentane, n-hexane, n-heptane and iso-octane; alicyclic hydrocarbons such as cyclopentane, cyclohexane, methylcyclopentane, methylcyclohexane and decalin; and aromatic hydrocarbons such as benzene and toluene, and aliphatic hydrocarbons and alicyclic hydrocarbons among them can be utilized as it is as an inert solvent also for the hydrogenation reaction. These solvents can be utilized alone or in combination of two or more types, and are utilized at a ratio of 200-10,000 weight parts against 100 weight parts of the total using monomers.

As an initiator for the anion polymerization described above, usable are, for example, mono organolithium compounds such as n-butyl lithium, sec-butyl lithium, t-butyl lithium, hexyl lithium and phenyl lithum; and multi-functional organolithium compounds of such as dilithiomethane, 1,4-dilithiobutane and 1,4-dilithio-2-ethylcyclohexane.

In polymerization reaction, a polymerization accelerator and a randomizer (an additive to prevent a chain of certain one component from becoming long) can also be utilized. In the case of anion polymerization, for example, a Lewis base compound can be utilized as a randomizer. Specific examples of a Lewis base compound include, for example, ether compounds such as dimethyl ether, diethyl ether, diisopropyl ether, dibutyl ether, tetrahydrofuran, diphenyl ether, ethylene glycol diethyl ether and ethylene glycol methylphenyl ether; tertiary amine compounds such as tetramethylethylenediamine, trimethylamine, triethylamine and pyridine; alkali metal alkoxide compounds such as potassium-t-amyloxide and potassium-t-butyloxide; and phosphine compounds such as triphenylphsphine. These Lewis base compounds can be utilized each alone or in combination of two or more types.

Polymers obtained according to the above radical polymerization or anion polymerization can be recovered by means of commonly known methods such as a steam stripping method, a direct desolvation method and an alcohol coagulation method. Further, at the time of polymerization, in the case of utilizing an inert solvent in hydrogenation reaction, the polymer is not recovered from polymerization solution but can be supplied into hydrogenation process as it is.

<<Hydrogenation Method of Unsaturated Bond>>

In the case of performing hydrogenation of carbon-carbon double bonds in an unsaturated ring such as an aromatic ring and a cycloalkene ring or unsaturated bonds in a main chain of in copolymers before hydrogenation, the reaction method and reaction form are not specifically limited, and can be performed according to commonly known method. However, preferred is a hydrogenation method which can increase a hydrogenation degree as well as decrease a polymer chain cleaving reaction caused simultaneously with the hydrogenation, and listed is a method employing a catalyst containing at least one metal selected from nickel, cobalt, iron, titanium, rhodium, palladium, platinum, ruthenium and rhenium, in an organic solvent. As a hydrogenation catalyst, either a heterogeneous catalyst or a homogeneous catalyst can be utilized.

A heterogeneous catalyst can be utilized as a metal or a metal compound as it is, or by being carried in an appropriate carrier. Carriers include, for example, active carbon, silica, alumina, calcium carbonate, titania, magnesia, zirconia, diatomaceous earth and silicon carbide, and the carring amount of the catalyst is generally in a range of 0.01-80 weight % and preferably 0.05-60 weight %. As a homogeneous catalyst, utilized can be catalyst combining nickel, cobalt, titanium or iron compounds and organometallic compounds (such as organoaluminum compounds and organolithium compounds); or organometallic complex catalysts of such as rhodium, palladium, platinum, ruthenium and rhenium. As nickel, cobalt, titanium or iron compounds, utilized are, for example, acetylacetone salts, naphthenate salts, cyclopentadienyl compounds and cyclopentadienyl dichloro compounds of various types of metals. As organoaluminum compounds, suitably utilized are alkylaluminums such as triethylaluminum and triisobutylaluminum; halogenated aluminums such as diethylaluminum chloride and ethylaluminum dichloride; and alkylaluminum hydrides such as diisobutylaluminum hydride.

As examples of an organometallic complex catalyst, utilized are metal complexes such as γ-dichloro-π-benzene complexes, dichloro-tris(triphenylphosphine) complexes and hydride-chloro-triphenylphosphine complexes of the aforesaid each metal. These hydrogenated catalysts can be utilized each alone or in combination of two or more types, and the using amount is generally 0.01-100 parts preferably 0.05-50 parts and more preferably 0.1-30 parts, based on weight against the polymer.

The hydrogenation reaction is generally performed at a temperature of 10-250° C., however, is preferably performed at a temperature of 50-200° C. and more preferably 80-180° C., for the reason of an increasing hydrogenation degree as well as decreasing a polymer chain cleaving reaction which is caused simultaneously with a hydrogenation reaction. Further, hydrogen pressure is generally 0.1-30 MPa, however, it is preferably 1-20 MPa and more preferably 2-10 MPa, with respect to easy operation in addition to the above reasons.

The hydrogenation rate of thus obtained hydrogenated compounds is generally not less than 90%, preferably not less than 95% and more preferably not less than 97%, based on 1H-NMR measurement, with respect to any of carbon-carbon unsaturated bonds of a main chain, carbon-carbon double bonds of an aromatic ring and carbon-carbon double bonds of an unsaturated ring. Such as a low double refraction property and thermal stability are deteriorated when the hydrogenation rate is low.

A method to recover a hydrogenated compound after finishing the hydrogenation reaction is not specifically limited. Generally, utilized can be a method in which the solvent is removed from the hydrogenated compound solution by means of direct drying after elimination of the residue of a hydrogenation catalyst by means of such as filtration and centrifugal separation, and a method in which the hydrogenated compound solution is poured into a poor solvent for the hydrogenated compound to coagulate the hydrogenated compound.

<<A Production Method of Block Copolymers>>

Block copolymers utilized in this invention can be obtained by the following methods. Listed is a method in which a polymer block having a repeating unit arising from an aromatic vinyl compound and/or an alicyclic vinyl compound, and a polymer block having a repeating unit arising from a vinyl type monomer are prepared by polymerizing a mixture of a monomer mixture containing an aromatic vinyl compound and/or an alicyclic vinyl compound, and a monomer mixture containing a vinyl type monomer (except aromatic vinyl compounds and alicyclic vinyl compounds), followed by hydrogenation of aromatic rings and/or aliphatic rings in said block copolymers. Further, listed is a method in which a monomer mixture containing a saturated alicyclic vinyl compound and a vinyl type monomer (except aromatic vinyl compounds and alicyclic vinyl compounds) are polymerized to prepare block copolymer having a repeating unit arising from an alicyclic vinyl compound and a repeating unit arising from a vinyl type compound. Among them, more preferable to obtain a block copolymer of this invention is, for example, the following method.

(1) In the first method, first, polymer block [A'] containing a repeating unit arising from an aromatic vinyl compound and/or an alicyclic vinyl compound which has unsaturated bonds in the ring is prepared by polymerizing a monomer mixture [a'] containing not less than 50 mol % of an aromatic vinyl compound and/or an alicyclic vinyl compound which has unsaturated bonds in the ring. Polymer block [B'] is prepared by polymerizing a monomer mixture [b'] which contains not less than 2 mol % of a vinyl type monomer (except aromatic vinyl compounds and alicyclic vinyl compounds), and containing an aromatic vinyl compound and/or an alicyclic vinyl compound which has unsaturated bonds in the ring at a ratio less than that in monomer mixture [a']. After preparing a block copolymer provided with aforesaid polymer block [A'] and polymer block [B'] via at least these process, aromatic rings and/or alicyclic rings in said block copolymer are hydrogenated.

(2) In the second method, first, polymer block [A] containing a repeating unit arising from an saturated alicyclic vinyl compound by polymerizing a monomer mixture containing not less than 50 mol % of an saturated alicyclic vinyl compound. Polymer block [B] containing a repeating unit arising from a saturated alicyclic vinyl compound and a repeating unit arising from a vinyl monomer is prepared by polymerizing a monomer mixture [b] which contains not less than 2 mol % of a vinyl type monomer (except aromatic vinyl compounds and alicyclic vinyl compounds), and containing a saturated alicyclic vinyl at a ratio less than that in monomer mixture [a]. A block copolymer provided with aforesaid polymer block [A] and polymer block [B] via at least these process.

Among the above methods, above-described method (1) is more preferred, with respect to easy availability of monomers, polymerization yield, easiness of introducing a repeating unit [1] into polymer block [B'].

Specific examples of aromatic vinyl compounds in above method (1) include such as styrene, α-methylstyrene, α-ethylstyrene, α-propylstyrene, α-isopropylstyrene, α-t-butylstyrene, 2-methylstyrene, 3-methylstyrene, 4-methylstyrene, 2,4-diisopropylstyrene, 4-t-butylstyrene, 5-t-butyl-2-methylstyrene, monochlorostyrene, dichlorostyrene, monofluorostyrene and 4-phenylstyrene, as well as those having substituents such as a hydroxyl group and an alkoxy group therein. Among them, preferable are such as 2-methylstyrene, 3-methylstyrene and 4-methylstyrene.

Specific examples of unsaturated alicyclic vinyl compounds in above method (1) include such as cyclohexenyl ethylene, α-methylcyclohexenyl ethylene and α-t-butylcyclohexenyl ethylene, as well as those having substituents such as a halogen group, an alkoxy group or a hydroxyl group therein.

These aromatic vinyl compounds and alicyclic vinyl compounds can be utilized each alone or in combination of two or more types. However, it is more preferable, in this invention, to utilize an aromatic vinyl compound in either of monomer mixtures of [a'] and [b'], and, in particular, more preferable to utilize α-methylstyrene.

Vinyl monomers utilized in the above method include chain vinyl compounds and chain conjugated diene compounds.

Specific examples of chain vinyl compounds include chain olefin monomers such as ethylene, propylene, 1-butene, 1-pentene and 4-methyl-1-pentene, and, among them, most preferable are ethylene, propylene and 1-butene.

Chain conjugated diene compounds include, for example, 1,3-butadiene, isoprene, 2,3-dimethyl-1,3-butadiene, 1,3-pentadiene and 1,3-hexadiene. Chain conjugated dienes, among these chain vinyl compounds and chain conjugated dienes, are preferred, and butadiene and isoprene are most preferred. These chain vinyl compounds and chain conjugated dienes can be utilized each alone or in combination of two or more types.

In the case of utilizing a monomer mixture containing the above-described monomers, a polymerization reaction may be performed by means of any polymerization method such as radial polymerization, anion polymerization or cation polymerization, and preferably by means of anion polymerization and most preferably by means of living anion polymerization in the presence of an inert solvent.

Anion polymerization is performed in the presence of a polymerization initiator in a temperature range of generally 0-200° C., preferably 20-100° C. and most preferably 20-80° C. As initiators, utilized can be, for example, mono-organolithium compounds such as n-butyl lithium, sec-butyl lithium, t-butyl lithium, hexyl lithium and phenyl lithium; and multifunctional organolithium compounds such as dilithiomethane, 1,4-dilithiobutane and 1,4-dilithio-2-ethylcyclohexane.

Inert solvents utilized include, for example, aliphatic hydrocarbons such as n-butane, n-pentane, iso-pentane, n-hexane, n-heptane and iso-octane; alicyclic hydrocarbons such as cyclopentane, cyclohexane, methylcyclopentane, methylcyclohexane and decalin; and aromatic hydrocarbons such as benzene and toluene, and aliphatic hydrocarbons and alicyclic hydrocarbons among them can be utilized as it is as an inert solvent also for the hydrogenation reaction. These solvents can be utilized each alone or in combination of two or more types, and are utilized at a ratio of 200-10,000 weight parts against 100 weight parts of the total using monomers.

At the time of polymerizing each polymer block, a polymerization accelerator or a randomizer can be utilized to prevent a certain one component chain from growing long. In particular, in the case of performing a polymerization reaction by means of anion polymerization, such as a Lewis base compound can be utilized as a randomizer. Specific examples of a Lewis base compound include, ether compounds such as dimethyl ether, diethyl ether, diisopropyl ether, dibutyl ether, tetrahydrofuran, diphenyl ether, ethylene glycol diethyl ether and ethylene glycol methylphenyl ether; tertiary amine compounds such as tetramethylethylenediamine, trimethylamine, triethylamine and pyridine; alkali metal alkoxide compounds such as potassium-t-amyloxide and potassium-t-butyloxide; and phosphine compounds such as triphenylphsphine. These Lewis base compounds can be utilized each alone or in combination of two or more types.

A method to preparation a block copolymer by means of living anion polymerization includes commonly known methods such as a consecutive addition polymerization reaction method and a coupling method, and in this invention, a consecutive addition polymerization reaction method is preferably employed.

In the case of preparing the above block copolymer provided with polymer block [A'] and polymer block [B'] by means of a consecutive addition polymerization method, a process to obtain polymer block [A'] and a process to obtain polymer block [B'] are performed successively in order. Specifically, in an inert solvent, polymer block [A'] is prepared by polymerizing monomer mixture [a'] in the presence of the above-described living anion polymerization catalyst, and polymer block [B'] connected to polymer block [A'] is prepared by continuing polymerization by successively adding monomer mixture [b'] into the reaction system. Further, if desired, monomer mixture [a'] is added to perform polymerization resulting in preparation of a tri-block substance by connecting polymer block [A'], then monomer mixture [b'] is further added to perform polymerize resulting in preparation of a tetra-block substance.

The obtained block copolymer is recovered by means of commonly known methods such as a steam stripping method, a direct desolvation method and an alcohol coagulation method. Further, at the time of polymerization, in the case of utilizing an inert solvent in a hydrogenation reaction, it is not necessary to recover the polymer from polymerization solution because the polymerization solution can be utilized in the hydrogenation process as it is.

Block copolymers provided with polymer block [A] and polymer block [B'], which is prepared by aforesaid method (1), are preferably those having a repeating unit of the following structure.

Preferable polymer block [A'] constituting block copolymer of before hydrogenation is a polymer block containing not less than 50% of repeating unit [4] represented by the following Formula (14).

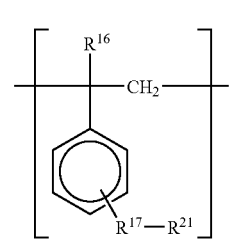

Formula (14)

In the formula, $R^{16}$ represents a hydrogen atom or an alkyl group having a carbon number of 1-20, $R^{17}$-$R^{11}$ each independently represent a hydrogen atom, an alkyl group having a carbon number of 1-20, a hydroxyl group, an alkoxy group having a carbon number of 1-20 or a halogen group. Herein, the aforesaid $R^{17}$-$R^{21}$ represent $R^{17}$, $R^{18}$ . . . and $R^{21}$.

Further, preferable polymer block [B'] necessarily contains the aforesaid repeating unit [4], and provided with at least either one of repeating unit [5] represented by following Formula (15) or repeating unit [6] represented by following Formula (16). Further, a'>b', when mol fraction of repeating unit [4] in polymer block [A'] is a' and mol fraction of repeating unit [4] in polymer block [B'] is b'.

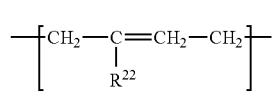

Formula (15)

In the formula, $R^{22}$ represents a hydrogen atom or an alkyl group having a carbon number of 1-20.

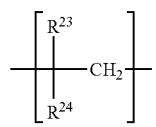

Formula (16)

In the formula, $R^{23}$ represents a hydrogen atom or an alkyl group having a carbon number of 1-20, and $R^{24}$ represents a hydrogen atom or an alkyl group or an alkenyl group having a carbon number of 1-20.

Further block [B'] may contain repeating unit [Y] represented by following Formula (Y).

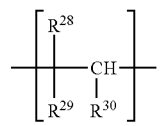

Formula (Y)

In the formula, $R^{28}$ represents a hydrogen atom or an alkyl group having a carbon number of 1-20, $R^{29}$ represents a nitrile group, an alkoxycarbonyl group, a formyl group, hydroxycarbonyl group or a halogen group, or $R^{29}$ and $R^{30}$ may form an acid anhydride group or an imido group by bonding to each other.

Further, a preferable block copolymer before hydrogenation is one having ratio ma'/mb' of preferably 5/95-95/5, more preferably 30/70-95/5 and most preferably 40/60-90/10, when a mol number of total repeating units constituting block [A'] is ma' and a mole number of total repeating units constituting block [B'] is mb'. The mechanical strength and heat resistance are superior when ma'/mb' is in the above range.

The molecular weight of a block copolymer before hydrogenation is preferably in a range of 12,000-400,000, more preferably 19,000-350,000 and most preferably 25,000-300,000 as a polystyrene (or polyisoprene) equivalent Mw which is measured by means of GCP employing THF as a solvent. Mechanical strength is decreased when Mw of a block copolymer is excessively small while hydrogenation degree is decreased when Mw of a block copolymer is excessively large.

The molecular weight distribution of a block copolymer before hydrogenation can be appropriately selected depending on the objective of the application, however, it is preferably not more than 5, more preferably not more than 4 and most preferably not more than 3, as a ration (Mw/Mn) of a polystyrene (or polyisoprene) equivalent molecular weight Mw to Mn, which are measured by means of GCP. The hydrogenation degree is improved when Mw/Mn is in this range.

The Tg of a block copolymer before hydrogenation may be suitably selected depending on the objective of the application, however, is preferably 70-150° C., more preferably 80-140° C. and most preferably 90-130° C., as a high temperature side value measured by means of DSC.

The reaction method and reaction form of performing hydrogenation of carbon-carbon unsaturated bonds in an unsaturated ring of such as an aromatic ring and a cycloalkene ring and unsaturated bonds in a main chain or a side chain, in the aforesaid block copolymer before hydrogenation, are not specifically limited, and can be performed according to commonly known methods. However, preferred is a hydrogenation method which can increase a hydrogenation degree as well as decrease a polymer chain cleaving reaction, and listed is a method employing a catalyst containing at least one metal selected from nickel, cobalt, iron, titanium, rhodium, palladium, platinum, ruthenium and rhenium, in an organic solvent. As a hydrogenation catalyst, either a heterogeneous catalyst or a homogeneous catalyst can be utilized.

A heterogeneous catalyst can be utilized as a metal or a metal compound as it is, or by being carried in an appropriate carrier. Carriers include, for example, active carbon, silica, alumina, calcium carbonate, titania, magnesia, zirconia, diatomaceous earth and silicon carbide, and the carring amount of the catalyst is generally in a range of 0.01-80 weight % and preferably 0.05-60 weight %. As a homogeneous catalyst, utilized can be catalyst combining nickel, cobalt, titanium or iron compounds and organometallic compounds (such as organoaluminum compounds and organolithium compounds); or organometallic complex catalysts of such as rhodium, palladium, platinum, ruthenium and rhenium. As nickel, cobalt, titanium or iron compounds, utilized are, for example, acetylacetone salts, naphthenate salts, cyclopentadienyl compounds and cyclopentadienyl dichloro compounds of various types of metals. As organoaluminum compounds, suitably utilized are alkylaluminums such as triethylaluminum and triisobutylaluminum; halogenated aluminum such as diethylaluminum chloride and ethylaluminum dichloride; and hydrogenated alkylaluminum such as diisobutylaluminum hydride.

As examples of an organometallic complex catalyst, utilized are metal complexes such as γ-dichloro-π-benzene complexes, dichloro-tris(triphenylphosphine) complexes and hydride-chloro-triphenylphosphine complexes of the aforesaid each metal. These hydrogenation catalysts can be utilized each alone or in combination of two or more types, and the using amount is generally 0.01-100 weight parts preferably 0.05-50 weight parts and more preferably 0.1-30 weight parts, per 100 weight parts of the polymer.

The hydrogenation reaction is generally performed at a temperature of 10-250° C., however, is preferably performed at a temperature of 50-200° C. and more preferably 80-180° C., for the reason of an increasing hydrogenation degree as well as decreasing a polymer chain cleaving reaction which is caused simultaneous with a hydrogenation reaction. Further, hydrogen pressure is generally 0.1-30 MPa, however, it is preferably 1-20 MPa and more preferably 2-10 MPa, with respect to easy operation in addition to the above reasons.

The hydrogenation degree of thus obtained hydrogenated compounds is preferably not less than 90%, more preferably not less than 95% and most preferably not less than 97%, based on 1H-NMR measurement, with respect to both of carbon-carbon unsaturated bonds of a main chain and a side chain, and carbon-carbon unsaturated bonds of an aromatic ring or a cycloalkene ring. Such as a low double refraction property and thermal stability of an obtained copolymer are deteriorated when the hydrogenation degree is low.

After finishing the hydrogenation reaction, the block copolymer can be recovered by such as a method in which the solvent is removed by means of direct drying after elimination of a hydrogenation catalyst from the reaction solution by means of such as filtration and centrifugal separation, and a method in which the hydrogenated compound solution is poured into a poor solvent for the hydrogenated compound to coagulate the hydrogenated compound.

In the aforesaid polymer according to this invention, various types of compounding ingredients can be appropriately blended. Compounding ingredients which can be blended in a block copolymer are not specifically limited and include stabilizers such as an antioxidant, a thermal stabilizer, a light fastness stabilizer, a weather-proofing stabilizer, a UV absorbent and an infrared absorbent; resin modifiers such as a sliding agent and a plastisizer; colorants such as dye and pigment; anti-static agents, non-flammable agents and fillers. These compounding ingredients can be utilized alone or in combination of two or more types, and the blending amount is selected in a range not disturbing the effects of this invention.

In this invention, it is preferable to blend an anti-oxidant, a UV absorbent and a light fastness stabilizer among the above compounding ingredients in a polymer. Anti-oxidants include such as phenol type anti-oxidants, phosphor type anti-oxidants and sulfur type anti-oxidants, and phenol type anti-oxidants, specifically alkyl-substituted phenol type anti-oxidants, are preferable among them. By blending these anti-oxidants, prevented can be coloring or strength decrease of a lens, due to oxidation deterioration at the time of molding, without deterioration of the transparency and heat resistance. These anti-oxidants can be utilized alone or in combination of two or more types, and the blending amount is selected in a range not disturbing the effects of this invention. It is preferably 0.001-5 weight parts and more preferably 0.01-1 weight parts, against 100 weight parts of the polymer.

UV absorbents include benzophenone type UV absorbents such as 2,4-dihydroxybenzophenone, 2-hydroxy-4-methoxybenzophenone, 2,2'-dihydroxy-4-methoxybenzophenone, 2,2'-dihydroxy-4,4'-dimethoxybenzophenone, 2-hydroxy-4-methoxy-2'-benzophenone, 2-hydroxy-4-methoxy-5-sulfobenzophenone trihydrate, 2-hydroxy-4-n-octoxybenzophenone, 2,2',4,4'-tetrahydroxybenzophenone, 4-dodecyloxy-2-hydroxybenzophenone and bis(5-benzoyl-4-hydroxy-2-methoxyphenyl)methane; and benzotriazole type UV absorbents such as 2-(2'-hydroxy-5'-methylphenyl)benzotriazole, 2-(2H-benzotriazole-2-il)-4-methyl-6-(3,4,5,6-tetrahydrophthalimidylmethyl)phenol, 2-(2H-benzotriazole-2-il)-4,6-bis(1-methyl-1-phenylethyl)phenol, 2-(2'-hydroxy-3', 5'-di-tertiary-butylphenyl)benzotriazole, 2-(2'-hydroxy-3'-tertiary-butyl-5'-methylphenyl)-5-chlorobenzotriazole, 2-(2'-hydroxy-5'-tertiary-octylphenyl)benzotriazole, 2-(2'-hydroxy-3', 5'-di-tertiary-amylphenyl)benzotriazole, 2-[2'-hydroxy-3'-(3",4", 5", 6"-tetrahydrophthalimidomethyl)-5'-methylphenyl]benzotriazole and 2,2'-methylenebis[4-(1,1,3,3-tetramethylbutyl)-6-(2H-benzotriazle-2-il)phenol]. Among them, preferable are 2-(2'-hydroxy-5'-methylphenyl)benzotriazole, 2-(2H-benzotriazole-2-il)-4-methyl-6-(3,4,5,6-tetrahydrophthalim- idylmethyl)phenol and 2-(2H-benzotriazole-2-il)-4,6-bis(1-methyl-1-phenylethyl)phenol, with respect to such as heat resistance and low volatility.

Light fastness stabilizers include benzophenone type light fastness stabilizers, benzotriazole type light fastness stabilizers and hindered amine type light fastness stabilizers, and, in this invention, preferably utilized are hindered amine type light fastness stabilizers, with respect to transparency and an anti-coloring property of a lens. Among hindered amine type light fastness stabilizers (hereinafter, abbreviated as a HALS), those having a polystyrene equivalent Mn, measured by means of GPC employing THF as a solvent, of preferably 1000-10000, more preferably 2000-5000 and most preferably 2800-3800. When Mn is excessively small, a predetermined amount may not be blended due to evaporation at the time of blending said HALS in a polymer by thermal fusion kneading, or foams and silver streaks may generate at the time of thermal fusion molding in the ejection molding, resulting in decrease of manufacturing stability. Further, volatile gases may be generated from a lens when the lens is used for a long period keeping an on-state of a lamp. On the contrary, when Mn is excessively large, the dispersibility of HALS in a block copolymer is decreased to decrease transparency of a lens which results in deterioration of the improvement effect of light fastness. Therefore, in this invention, obtained can be lenses exhibiting excellent manufacturing stability, low gas generation and transparency by setting Mn of HALS in the above range.

Specific examples of such a HALS include high molecular weight HALS in which a plural number of piperidine rings are bonded via a triazine skeleton such as N,N',N",N'"-tetrakis-[4,6-bis-{butyl-(N-methyl-2,2,6,6-tetramethylpiperidine-4-il)amino}-triazine-2-il]-4,7-diazadecane-1,10-diamine, a polycondensation compound of dibutylamine, 1,3,5-triazine and N,N'-bis(2,2,6,6-tetramethyl-4-piperidyl)butylamine, poly[{(1,1,3,3-tetramethylbutyl)amino-1,3,5-triazine-2,4-diil}{(2,2,6,6-tetramethyl-4-piperidyl)imino}hexamethylene{(2,2,6,6-tetramethyl-4-piperidyl)imino}], a polycondensation compound of 1,6-hexadiamine-N,N'-bis(2,2,6,6-tetramethyl-4-piperidyl) and morphorine-2,4,6-trichloro-1,3,5-triazine and poly[(6-morphorino-s-triazine-2,4-diil) (2,2,6,6-tetramethyl-4-piperidyl) imino]-hexamethylene [((2,2,6,6-tetramethyl-4-piperidyl)imino]; high molecular weight HALS in which a piperidine rings are bonded via a ester bonding such as a polymerization compound of dimethylsuccinate and 4-hydroxy-2,2,6,6-tetramethyl-1-piperidineethanol, a mixed esterified compound of 1,2,3,4-butanetetracarboxylic acid, 1,2,2,6,6-pentamethyl-4-piperidinol and 3,9-bis(2-hydroxy-1,1-dimethyl)-2,4,8,10-tetraoxasupiro[5,5]undecane.

Among them, preferred are polymers having Mn of 2000-5000, such as a polycondensation compound of dibutylamine, 1,3,5-triazine and N,N'-bis(2,2,6,6-tetramethyl-4-piperidyl)butylamine; poly[{(1,1,3,3-tetramethylbutyl)amino-1,3,5-triazie-2,4-diil}{(2,2,6,6-tetramethyl-4-piperidyl)imino}hexamethylene{(2,2,6,6-tetramethyl-4-piperidyl)imino}], a polymerization compound of dimethylsuccinate and 4-hydroxy-2,2,6,6-tetramethyl-1-piperidineethanol.

The blending amount of UV absorbent and HALS described above in a block copolymer according to this invention is preferably 0.01-20 weight parts, more preferably 0.02-15 weight parts and most preferably 0.05-10 weight perts based on 100 weight parts of the polymer compound. The improvement effect of light fastness may not be obtained sufficiently resulting in coloring in such as the case of long period outdoor use, when the addition amount is excessively small. While, when the blending amount of HALS is excessively large, a part of the HALS may be converted to a gas to be generated, or dispersibility of the HALS may be decreased, resulting in decrease of transparency of a lens.

Further, by blending a soft polymer having the lowest glass transition temperature of not higher than 30° C., it is possible to prevent turbidity under an environment of high temperature and high humidity for a long period without deteriorating such as transparency, heat resistance and mechanical strength.

Specific examples of the above soft polymers include olefin type soft polymer such as polyethylene, polypropyrene, ethylene-α-olefin copolymer and ethylene-propyrene-diene copolymer (EDPM); isobutylene type soft copolymers such as polyisobutylene, isobutylene-isoprene rubber and isobutylene-styrene copolymer; diene type soft copolymers such as polybutadiene, polyisoprene, butadiene-styrene random copolymer, isoprene-styrene random copolymer, acrylonitrile-butadiene copolymer, acrylonitrile-butadiene-styrene copolymer, butadiene-styrene•block copolymer, styrene-butadiene-styrene•block copolymer, isoprene-styrene•block copolymer and styrene-isoprene-styrene•block copolymer; silicon containing type soft polymers such as dimethyl polysiloxane and diphenyl polysiloxane; acryl type soft polymers such as polybutyl acrylate, polybutyl methacrylate and polyhydroxyethyl methacrylate; epoxy type soft polymers such as polyethyleneoxide, polypropyreneoxide and epichlorohydrine rubber; fluoride type soft polymers such as fluorovinyl type rubber and tetrafluoroethylene-propyrene rubber; other soft polymers such as natural rubber, polypeptide, protein, polyester type thermal plastic elastomers, vinylchloride type elastomers and polyamido type tnermoplastic elastomers. These soft elastomer may be provided with a cross-linking structure or introduced with a functional group by a modification reaction.

Diene type soft polymers are preferred among the soft polymers described above, and, in particular, hydrogenated compounds, in which carbon-carbon unsaturated bonds of said soft polymers are hydrogenated, are superior with respect to rubber elasticity, mechanical strength, flexibility and dispersibility. The blending amount of a soft polymer differs depending on types of the compound, however, generally, the glass transition temperature or transparency may be decreased remarkably resulting in being unusable as a lens when the blending amount is too large. While turbidity of a molded product may generates under high temperature and high humidity when the blending amount is excessively small. The blending amount is preferably 0.01-10 weight parts, more preferably 0.02-5 weight parts and specifically preferably 0.05-2 weight parts against 100 weight parts of the block copolymer.

As the method for forming the block copolymer composition by adding the additives to the block copolymer, for example, a method in which the block copolymer in a molten state is kneaded with the additives by a mixer, a double-axial kneader, a roll, a Brabender mixer or a extruder and a method in which the materials are dissolved in a suitable solvent and dispersed and solidified. When the double-axial kneader is employed, the molten mixture is usually extruded in a form of stick and cut into a suitable length by a strand cutter to form pellets for employing as the molding material.

Other than the above resin, for example, a resin containing a norbonene type open ring (hydrogen) polymer described in Japanese Patent Tokkai No. 2003-73460 can be employed for the material of the optical element according to the invention.

<<Resin Composition>>

In the invention, a resin composition comprising the polymer having the alicyclic structure containing an antioxidant is provided.

For the antioxidant, a phenol type antioxidant, a phosphor type antioxidant and a sulfur type antioxidant are usable, and among them the phenol type antioxidant, particularly an alkyl-substituted phenol type antioxidant, is preferable. By addition of these antioxidants, coloring and lowering of the strength of the molded material caused by the degradation by oxidation on the occasion of the molding can be prevented without lowering in the transparency and the low moisture absorption.

For the phenol type antioxidant, usually known ones ca be employed. For example, acrylate compounds described in Japanese Patent Tokkai Nos. 63-179953 and 1-168643 such as 2-t-butyl-6-(3-t-butyl-2-hydroxy-5-methylbenzyl)-4-methylphenyl acrylate and 2,4-di-t-amyl-6-(1-(3,5-di-t-amyl-2-hydroxyphenyl)ethyl)phenyl acrylate; an alkyl-substituted phenol compound such as octadecyl-3-(3,5-di-t-butyl-4-hydroxyphenyl)propionate, 2,2'-methylene-bis(4-methyl-6-t-butylphenol), 1,1,3-tris(2-methyl-4-hydroxy-5-t-butylphenyl)butane, 1,3,5-trimethyl-2,4,6-tris (3,5-di-t-butyl-4-hydroxybenzyl)benzene, tetrakis(methylene-3-(3', 5'-di-t-butyl-4'-hydroxyphenylpropionate)methane, namely pentaerythrimethyl-tetrakis(3-(3,5-di-t-butyl-4-hydroxyphenylpropionate) and triethylene glycol bis-(3-(3-t-butyl-4-hydroxy-5-methylphenyl)-propionate; and a triazine group-containing phenol compound such as 6-(4-hydroxy-3,5-di-t-butylanilino)-2,4-bisoctyl-1,3,5-triazine, 4-bisoctylthio-1,3, 5-triazine and 2-octylthio-4,6-bis-(3,5-di-t-butyl-4-oxyanilino)-1,3,5-triazine are cited.

For the phosphor type antioxidant, ones usually employed in the field of resin industry can be employed without any limitation. For example, monophosphite compounds such as triphenyl phosphate, diphenylisodecyl phosphate, phenylisodecyl phosphate, tris(nonylphenyl)phosphate, tris(dinonylphenyl)phosphate, tris(dinonylphenyl)phosphate, tris (2,4-di-t-butylphenyl)phosphate, and 10-(3,5-di-t-butyl-4-hydroxybenzyl)-9,10-dihydro-9-oxa-10-Phosphaphenanthrene-10-oxide; and diphosphite compounds such as 4,4'-butylidene-bis(3-methyl-6-t-butylphenyl-di-tridecyl phosphate and 4,4'-isopropyridene-bis (phenyl-di-alkyl($C_{12}$ to $C_{15}$)phosphate) are cited. Among them, the monophosphite compounds are preferable and tris (nonylphenyl)phosphate, tris(dinonylphenyl)phosphate and tris(2,4-di-t-butylphenyl) phosphate are particularly preferable.

As the sulfur type antioxidant, for example, dilauryl 3,3-thiodipropionate, dimyrystyl 3,3'-thiodipropionate, distearyl 3,3-thiodipropionate, laurystearyl 3,3-dithiopropionate, pentaerythrytol-tetrakis-(β-laurylstearyl-thio-propionate and 3,9-bis-(2-dodecylthioethyl)-2,4,8,10-tetrakispiro[5,5]undecane are cited.

These antioxidants may be employed singly or in combination of two or more kinds. The adding amount of the antioxidant is optionally decided within the range in which the object of the invention is not vitiated; it is usually from 0.001 to 5 parts by weight and preferably from 0.01 to 1 part by weight to 100 parts by weight of the polymer having the alicyclic structure.

In the invention, a resin composition containing the polymer having the alicyclic structure and at least one selected from the group consisting of (1) a soft polymer, (2) an alcoholic compound and (3) an organic or inorganic filler is employed. By adding such the additives, occurrence of white turbid caused by standing for a long period under a high temperature and high humidity condition can be prevented without degradation in properties such as the transparency, low moisture absorption and mechanical strength.

Among the above-mentioned, (1) the soft polymer and (2) the alcoholic compound are excellent in the white turbid preventing effect and the transparency of the resin composition.

(1) Soft Polymer

The soft polymer to be employed in the invention is usually a polymer having a Tg of not more than 30° C. When the polymer shows plural Tgs, it is allowed that the lowest Tg is not more than 30° C.

The concrete examples of the soft polymer include an olefin type copolymer such as liquid polyethylene, polypropylene, poly-1-butene, ethylene•α-olefin copolymer, propylene•α-olefin copolymer, ethylene•propylene•diene copolymer (EPDM) and ethylene•propylene•styrene copolymer; an isobutylene type soft polymer such as polyisobutylene, isobutylene•isoprene rubber and isobutylene•styrene copolymer; a diene type soft polymer such as polybutadiene, polyisoprene, butadiene•styrene random copolymer, isoprene•styrene random copolymer, acrylonitrile•butadiene copolymer, acrylonitrile•butadiene•styrene copolymer, butadiene•styrene block copolymer, isoprene•styrene block copolymer, styrene•butadiene•styrene block copolymer isoprene•styrene block copolymer and styrene•isoprene•styrene block copolymer; a silicon-containing soft polymer such as dimethylpolysiloxane, diphenylpolysiloxane and dihydroxypolysiloxane; a soft polymer composed of a α, β-unsaturated acid such as poly(butyl acrylate), poly(butyl methacrylate), poly(hydroxyethyl methacrylate), polyacrylamide, polyacrylonitrile and butyl acrylate•styrene copolymer; a soft polymer composed of a unsaturated alcohol and amine, an acyl derivative thereof or acetal such as poly (vinyl alcohol), poly(vinyl acetate), poly(vinyl stearate) and cetate•styrene copolymer; an epoxy type soft polymer such as poly(ethylene oxide), poly(propylene oxide) and epichlorohydrine rubber; a fluorine-containing soft polymer such as vinylidene fluoride type rubber and ethylene tetrafluoride•propylene rubber; and another soft polymer such as natural rubber, polypeptide, protein, a polyester type thermoplastic estramer, a vinyl chloride type thermoplastic estramer and a polyamide type thermoplastic estramer. The soft polymers may be one having a crosslinking structure and one introduced with a functional group by a modification reaction.

In the above soft polymers, the diene type soft polymer is preferable, particularly a hydride compound in which carbon-carbon unsaturated bond is hydride, is superior in the rubber elasticity, mechanical strength, softness and dispersing ability.

(2) Alcoholic Compound

The alcoholic compound is a compound having at least one non-phenolic hydroxyl group, and preferably at least one hydroxyl group and at least one ether bond or ester bond. Concrete examples of such the compound include an alcoholic ether and ester compounds such as a poly-valent alcohol for example di or more-valent alcohol, preferably tri or more-valent alcohol, and more preferably poly-valent alcohol having 3 to 8 hydroxyl groups, in which one of the hydroxyl group is etherized or esterized.

As the di- or more-valent alcohol, for example, poly(ethylene glycol), glycerol, trimethylolpropane, pentaerythrytol, diglycerol, triglycerol, dipentaerythrytol, 1,6,7-trihydroxy-2, 2-di(hydroxymethyl)-4-oxo-heptane, sorbitol, 2-methyl-1,6, 7-trihydroxy-2-hydroxymethyl-4-oxo-heptane, 1,5,6-trihydroxy-3-oxo-hexanepentaerythrytol and tris(2-hydroxyethyl)isocyanurate are cited, and the tri- or more-valent alcohol, particularly having 3 to 8 hydroxyl groups, are preferable. To obtain the alcoholic ester compound, glycerol, diglycerol and triglycerol are preferable, by which alcoholic ester compound containing α,β-diol can be synthesized.

Examples of such the alcoholic compound include a poly-valent alcoholic esterized compound such as glycerol monostearate, glycerol monolaurate, glycerol monobehenate, glycerol monostearate, glycerol distearate, glycerol dilaurate, pentaerythrytol monostearate, pentaerythrytol monolaurate, pentaerythrytol monobehenate, pentaerythrytol distearate, pentaerythrytol dilaurate, pentaerythrytol tristearate and dipentaerythrytol distearate; 3-(octyloxy)-1,2-propanediol, 3-(decyloxy)-1,2-propanediol, 3-(lauryloxy)-1,2-propanediol, 3-(4-nonylphenyloxy)-1,2-propanediol, 1,6-dihydroxy-2,2-di(hydroxymethyl)-7-(4-nonylphenyloxy)-4-oxo-eptane, an alcoholic ether compound obtained by reaction of a condensate of p-nonylphenyl ether with formaldehyde and glycidol, an alcoholic ether compound obtained by reaction of a condensate of p-octylphenyl ether with formaldehyde and crycidol, and an alcoholic ether compound obtained by reaction of a condensate of p-octylphenyl ether with dicyclopentadiene and crycidol are employable. These poly-valent alcoholic compounds are employed singly or in combination of two or more kinds thereof. The molecular weight of these poly-valent alcoholic compounds is usually from 500 to 2,000, preferably from 800 to 1,500 even though the molecular weight is not specifically limited.

(3) Organic or Inorganic Filler

As the organic filler, a usual organic polymer particle or a crosslinked organic polymer particle can be employed. For example, a particle or a crosslinked particle of a polyolefin such as polyethylene and polypropylene; a halogen-containing vinyl polymer such as poly(vinyl chloride) and poly(vinylidene chloride); a polymer derived from a α,β-unsaturated acid such as polyallylate and polymethacrylate; a polymer derived from a unsaturated alcohol such as poly(vinyl alcohol) and poly(vinyl acetate); a polymer derived from poly (ethylene oxide) or bisglycidol ether; an aromatic condensate polymer such as poly(phenylene oxide), polycarbonate and polysulfone; polyurethane; polyamide; polyester; aldehyde; aldehyde•phenol type resin; and natural polymer compound are employable.

As the inorganic filler, for example, a powder of a compound of an element of Group 1 of periodic table such as lithium fluoride and borax (sodium borate hydrate); a compound of an element of Group 2 such as magnesium carbonate, magnesium phosphate, calcium carbonate, strontium titanate and barium carbonate; a compound of an element of Group 4 such as titanium dioxide (titania) and titanium monoxide; a compound of an element Group 6 such as molybdenum dioxide and molybdenum trioxide; a compound of an element of Group 7 such as manganese chloride and manganese acetate; a compound of an element of Groups 8 to 10 such as cobalt chloride and cobalt acetate; a compound of an element of Group 11 such as cuprous iodide; a compound of an element of Group 12 such as zinc oxide and zinc acetate; a compound of an element of Group 13 such as aluminum oxide (alumina), aluminum fluoride and aluminosilicate (alumina silicate, kaolin and kaolinite): a compound of an element of Group 14 such as silicon oxide (silica and silicagel); and a natural mineral such as graphite, carbon and glass; carnallite, kainite, mica (mica and golden mica) and pyrolusite are employable.

Though the adding amount of the compounds of (1) to (3) is decided by the combination of the polymer having the alicyclic structure and the compound to be added, the glass transition point and the transparency of the composition is largely lowered when the adding amount is too large in general. When the adding amount is too small, white turbid tends to occur under the high temperature and high humid condition so that the composition becomes unsuitable to use for the optical material. The adding amount is usually from 0.01 to 10, preferably from 0.02 to 5, particularly preferably from 0.05 to 2, parts by weight to 100 parts by weight of the polymer having the alicyclic structure. When the adding amount is too small, the effect for preventing occurrence of the white turbid under the high temperature and high humidity condition cannot be obtained, and when the adding amount is too large, the heat resistivity and the transparency of the molded product are lowered.

<<Another Additive>>

Another additive such as a UV absorbent, a light stabilizer, a near infrared absorbent, a colorant such as a dye and a pigment, a slipping agent, a plasticizer, an antistatic agent and a fluorescent whitening agent may be added to the resin composition of the invention according to necessity. These additives may be employed singly or in a combination of two or more kinds thereof, and the adding amount is optionally decided within the range in which the object of the invention is not vitiated.

<<Molding Material>>

The resin composition according to the invention can be obtained by suitably mixing the foregoing raw materials. The mixing method is not specifically limited as long as the additives can be satisfactorily dispersed in the hydrocarbon type polymer by the method. For example, a method in which the resin is kneaded in a molten form by a mixer, double-axial kneader, rollers, brabender or extruder and a method in which the materials are dissolved in a suitable solvent and dispersed and solidified. When the double-axial kneader is employed, the molten mixture is usually extruded in a form of stick and cut into a suitable length by a strand cutter to form pellets for employing as the molding material.

<<Optical Element>>

The optical element according to the invention is obtained by molding the polymer having the alicyclic structure or the resin composition. Though the molding method is not specifically limited, a melt molding is preferable for obtaining a molded product excellent in the birefringency, the mechanical strength and the dimension precision. Examples of the melt molding method include a press molding, an extruding molding, and injection molding in which the injection molding is preferred from the viewpoint of the molding ability and the production efficiency. The molding condition is suitably decided according to the object and the method of the molding, for example, the rein temperature for the injection molding is usually selected within the range of from 150 to 400° C., preferably from 200 to 350° C., more preferably from 230 to 330° C. When the resin temperature is too low, the fluidity of the resin is lowered so as to cause a sink marks and distortion, and when the temperature is too high, a silver streak and yellowish coloring of the molded product tend to be caused by thermal decomposition of the resin.

An optical pickup apparatus described in Item 16 is an optical pickup apparatus comprising: a light source emitting a light flux with a wavelength $\lambda 1$ which satisfies 350 nm$\leq\lambda 1\leq$450 nm; an optical element arranged at a position where a light flux emitted by the light source passes through; an objective lens for converging a light flux emitted from the light source after the light flux passes through the optical element onto an information recording medium of an optical information recording medium. The optical element comprises a resin substrate; an antireflection layer arranged on at least one surface on the substrate and having a low refractive index layer and a high refractive index layer and the resin includes a polymer with an alicyclic structure. The low refractive index layer has a first refractive index when the light flux with the wavelength $\lambda 1$ passes through the low refractive index layer and is formed of a material or a mixture of materials selected from the group including silicon oxide; aluminum fluoride; yttrium fluoride; magnesium fluoride; and a mixture of silicon oxide and aluminum oxide. The high refractive index layer has a second refractive index which is higher than the first refractive index when the light flux with the wavelength $\lambda 1$ passes through the high refractive index layer and is formed of a material or a mixture of materials selected from the group including scandium oxide; niobium oxide; lanthanum oxide; praseodymium titanate; lanthanum titanate; lanthanum aluminate; yttrium oxide; hafnium oxide; zirconium oxide; tantalum oxide; a mixture of tantalum oxide and titanium; and silicon nitride.

The optical pickup apparatus described in Item 17 is the optical pickup apparatus of the embodiment of Item 16 wherein the high refractive layer is formed of a material or a mixture of materials such as scandium oxide, niobium oxide, lanthanum oxide, praseodymium titanate, lanthanum titanate, lanthanum aluminate, yttrium oxide, hafnium oxide, zirconium oxide, tantalum oxide, a mixture of tantalum oxide and titanium; and silicon nitride.

The optical pickup apparatus described in Item 18 is the optical pickup apparatus of the embodiment of Item 16 wherein the high refractive layer is formed of a material or a mixture of materials such as scandium oxide, lanthanum oxide, lanthanum aluminate, hafnium oxide, zirconium oxide, tantalum oxide, and silicon nitride.

The optical pickup apparatus described in Item 19 is the optical pickup apparatus of the embodiment of any one of Items 16 or 18 wherein the antireflection layer has two-layer structure in which the high refractive layer and the low refractive layer are laminated on the resin substrate in this order.

The optical pickup apparatus described in Item 20 is the optical pickup apparatus of the embodiment of any one of Items 16-18 wherein the antireflection layer has three-layer structure in which the low refractive layer, the high refractive layer and the low refractive layer are laminated on the resin substrate in this order.

The optical pickup apparatus described in Item 21 is the optical pickup apparatus of the embodiment of any one of Items 16-18 wherein the antireflection layer further has a medium refractive layer having a third refractive index higher than the first refractive index and lower than the second refractive index as to passing the beam of light of wavelength $\lambda$, and the medium refractive layer is formed of a material or a mixture of materials such as lanthanum fluoride, neodymium fluoride, cerium oxide, aluminum fluoride, lanthanum aluminate, lead fluoride, and aluminum oxide.

The optical pickup apparatus described in Item 22 is the optical pickup apparatus of the embodiment of any one of Items 16-18, 21 wherein the antireflection layer is formed by four or more laminated layers.

The optical pickup apparatus described in Item 23 is the optical pickup apparatus of the embodiment of Item 22 wherein the antireflective layer has a four layer structure in which a first layer is closest to the substrate surface and the first-fourth layers respectively comprising the high refractive index material, the low refractive index material, the high refractive index material and the low refractive index material are laminated on the resin substrate in this order and satisfy following expressions,

| | |
|---|---|
| First layer: $1.7 \leq n1$, | $15 \text{ nm} \leq d1 \leq 36 \text{ nm}$ |
| Second layer: $1.2 \leq n2 \leq 1.55$, | $25 \text{ nm} \leq d2 \leq 40 \text{ nm}$ |
| Third layer: $1.7 \leq n3$, | $40 \text{ nm} \leq d3 \leq 150 \text{ nm}$ |
| Fourth layer: $1.2 \leq n4 \leq 1.55$, | $90 \text{ nm} \leq d4 \leq 115 \text{ nm}$ | where n1-n4 are refractive indexes of materials of the first-fourth layers and d1-d4 are thickness of the first-fourth layers respectively.

The optical pickup apparatus described in Item 24 is the optical pickup apparatus of the embodiment of Item 22 wherein the antireflective layer has a five layer structure in which a first layer is closest to the substrate surface and the first-fifth layers respectively comprising the low refractive index material, the high refractive index material, the low refractive index material, the high refractive index material and the low refractive index material on the resin substrate in this order and satisfy following expressions,

| | |
|---|---|
| First layer: $1.2 \leq n1 \leq 1.55$, | $5 \text{ nm} \leq d1 \leq 20 \text{ nm}$ |
| Second layer: $1.7 \leq n2$, | $15 \text{ nm} \leq d2 \leq 35 \text{ nm}$ |
| Third layer: $1.2 \leq n3 \leq 1.55$, | $25 \text{ nm} \leq d3 \leq 45 \text{ nm}$ |
| Fourth layer: $1.7 \leq n4$, | $50 \text{ nm} \leq d4 \leq 130 \text{ nm}$ |
| Fifth layer: $1.2 \leq n5 \leq 1.55$, | $80 \text{ nm} \leq d5 \leq 110 \text{ nm}$ | where n1-n5 are refractive indexes of materials of the first-fifth layers and d1-d5 are thickness of the first-fifth layers respectively.

The optical pickup apparatus described in Item 25 is the optical pickup apparatus of the embodiment of Item 22 wherein the antireflective layer has a six layer structure in which a first layer is closest to the substrate surface and the first-sixth layers respectively comprising the high refractive index material, the low refractive index material, the high refractive index material, the low refractive index material, the high refractive index material and the low refractive index material on the resin substrate in this order and satisfy following expressions,

| | |
|---|---|
| First layer: $1.7 \leq n1$, | $8 \text{ nm} \leq d1 \leq 15 \text{ nm}$ |
| Second layer: $1.2 \leq n2 \leq 1.55$, | $35 \text{ nm} \leq d2 \leq 55 \text{ nm}$ |
| Third layer: $1.7 \leq n3$, | $40 \text{ nm} \leq d3 \leq 60 \text{ nm}$ |
| Fourth layer: $1.2 \leq n4 \leq 1.55$, | $10 \text{ nm} \leq d4 \leq 17 \text{ nm}$ |
| Fifth layer: $1.7 \leq n5$, | $45 \text{ nm} \leq d5 \leq 90 \text{ nm}$ |
| Sixth layer: $1.2 \leq n6 \leq 1.55$, | $70 \text{ nm} \leq d6 \leq 110 \text{ nm}$ | where n1-n6 are refractive indexes of materials of the first-sixth layers and d1-d6 are thickness of the first-sixth layers respectively.

The optical pickup apparatus described in Item 26 is the optical pickup apparatus of the embodiment of Item 22 wherein the antireflective layer has seven layer structure in which a first layer is closest to the substrate surface and the first-seventh layers respectively comprising the low refractive index material, the high refractive index material, the low refractive index material, the high refractive index material, the low refractive index material, the high refractive index material and the low refractive index material on the resin substrate in this order and satisfy following expressions,

| | |
|---|---|
| First layer: $1.2 \leq n1 \leq 1.55$, | $80 \text{ nm} \leq d1 \leq 160 \text{ nm}$ |
| Second layer: $1.7 \leq n2$, | $10 \text{ nm} \leq d2 \leq 25 \text{ nm}$ |
| Third layer: $1.2 \leq n3 \leq 1.55$, | $33 \text{ nm} \leq d3 \leq 45 \text{ nm}$ |
| Fourth layer: $1.7 \leq n4$, | $40 \text{ nm} \leq d4 \leq 85 \text{ nm}$ |
| Fifth layer: $1.2 \leq n5 \leq 1.55$, | $10 \text{ nm} \leq d5 \leq 20 \text{ nm}$ |
| Sixth layer: $1.7 \leq n6$, | $6 \text{ nm} \leq d6 \leq 70 \text{ nm}$ |
| Seventh layer: $1.2 \leq n7 \leq 1.55$, | $60 \text{ nm} \leq d7 \leq 110 \text{ nm}$ | where n1-n7 are refractive indexes of materials of the first-seventh layers and d1-d7 are thickness of the first-seventh layers respectively.

The each optical pickup apparatus described in Items 23-26 provides an antireflection layer according to the optical element of the embodiment of Item 22, which comprises four-seven layers formed on the resin substrate, the layers are laminated alternatively with high refractive index materials and low refractive index material and have predefined refractive index values and thickness. Therefore, there can be provided an antireflection layer restricted its reflectance low for at least one light flux among light fluxes with wavelengths λ2 and λ3 additionally to the light flux with wavelength λ1.

The optical pickup apparatus described in Item 27 is the optical pickup apparatus of the embodiment of any one Items 22-26 wherein the low refractive index layer comprises a material or a mixture of materials selected from the group consisting of silicon oxide; and a mixture of silicon oxide and aluminum oxide as a main ingredient, the high refractive index layer comprises a material or a mixture of materials selected from the group consisting of hafnium oxide; lanthanum aluminate; zirconium oxide; tantalum oxide; and silicon nitride as a main ingredient.

The optical pickup apparatus described in Item 27 provides, an antireflection layer according to the optical pickup apparatus of the embodiment of any one Items 22-26, whose peeling and surface deformation are few for irradiation of a laser beam with wavelength of 405 nm-415 nm, whose light absorption amount is few for a beam with wavelength of 405 nm, and whose peeling and surface deformation are few even when it is left in a high-temperature and high humidity environmental atmosphere, by defining above materials of the low refractive index layers and high refractive index layers in the antireflection layer.

The optical pickup apparatus described in Item 28 is the optical pickup apparatus of the embodiment of any one of Items 16-27 wherein the optical element further having a second light source emitting a light flux with at least one wavelength of λ1 and λ2 which satisfy following expressions, $$620 \text{ nm} \leq \lambda2 \leq 670 \text{ nm},$$

$$760 \text{ nm} \leq \lambda3 \leq 800 \text{ nm, and}$$

the optical element transmits light fluxes emitted by a plurality of light sources including the first and second light sources.

The optical pickup apparatus described in Item 28 provides an antireflection layer can be applied for at least one of light fluxes for DVD and CD, additionally to the light flux for media using violet laser beam.

The optical pickup apparatus described in Item 29 is the optical pickup apparatus of the embodiment of any one of Items 16 through 28 wherein the optical element is an objective lens. However the optical element may be, for example, collimator lens, expander lens, prism, grating optical element such as a diffraction lens, a diffraction prism, a diffraction plate and a chromatic aberration compensation plate, an optical filter such as a spatial low pass filter, a wavelength band pass filter, a wavelength low pass filter and a wavelength high pass filter, a polarizing filter such as light detector element, a light polarizing element and a polarized light separation prism, and not limited to the above-mentioned.

The optical pickup apparatus described in Item 30 is the optical pickup apparatus of the embodiment of Item 16 to 29 wherein the resin having the alicyclic structure has a weight average molecular weight (Mw) of from 1,000 to 1,000,000 and contains an alicyclic repeating unit (a) represented by the following Formula (1) and a chain structure repeating unit (b) represented by the following Formula (2) or (3) in a content of not less than 90% by weight in total, and the content of the repeating unit (b) is not less than 1% and less than 10% by weight. It is particularly preferable that the chain of the repeating units (a) of the polymer satisfies the expression of A≦0.3×B wherein A=(Weight average molecular weight of the chain of the repeating units having the alicyclic structure), and B=(Weight average (Mw) of the copolymer of the alicyclic hydrocarbon)×(Number of the repeating unit having the alicyclic structure/Entire number of the repeating unit constituting the alicyclic hydrocarbon copolymer).

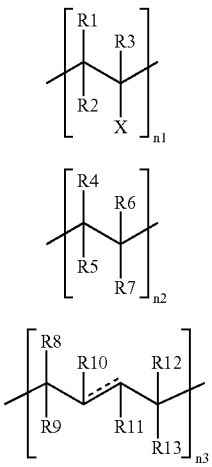

Formula (1)

Formula (2)

Formula (3)

In Formula (1), X is an alicyclic hydrocarbon group, and in Formulas 1, 2 and 3, R1 through R13 are each independently a hydrogen atom, a chain hydrocarbon group, a halogen atom, an alkoxyl group, a hydroxyl group, an ether group, an ester group, a cyano group, an amido group, an imido group, a silyl group, or a hydrocarbon group substituted by a polar group (a halogen atom, an alkoxyl group, a hydroxyl group, an ether group, an ester group, a cyano group, an amido group, an imido group or a silyl group) In Formula 3, . . . represents a saturated bond or an unsaturated bond between carbon atoms.

The optical pickup apparatus described in Item 31 is the optical pickup apparatus of the embodiment of Item 30 wherein the polymer having the alicyclic structure has a polymer block A containing a repeating unit represented by the following Formula (11) and a polymer block B containing the repeating unit represented by the following Formula (11) and a repeating unit 2 represented by the following Formula (12) or/and a repeating unit 3 represented by the following Formula (13), and the mole ratio a (mole-%) the repeating unit 1 in the polymer block A and the mole ratio b (mole-%) of the repeating unit 1 in the polymer block B has a relation of a>b.

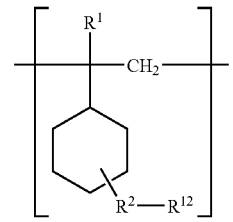

Formula (11)

In the formula, $R^1$ is a hydrogen tom or an alkyl group having 1 to 20 carbon atoms, $R^2$ through $R^{12}$ are each independently a hydrogen atom, an alkyl group having 1 to 20 carbon atoms, a hydroxyl group, an alkoxyl group having 1 to 20 carbon atoms or a halogen atom.

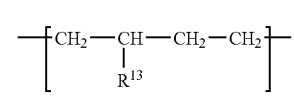

Formula (12)

In the formula, $R^{13}$ is a hydrogen atom or an alkyl group having 1 to 20 carbon atoms.

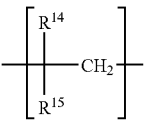

Formula (13)

In the formula, $R^{14}$ and $R^{15}$ are each independently a hydrogen atom or an alkyl group having 1 to 20 carbon atoms.

The optical element comprising synthesized resin having the antireflection layer provided thereon which is prevented from the degradation in the optical characteristic even when the short wave laser light is irradiated and the optical pickup apparatus employing the optical element can be provided by the invention.

Preferred embodiments of the invention will be explained as follows, referring to the drawings.

FIG. 1 shows a schematic cross section of an optical pickup apparatus capable of recording and reducing information on a BD (blu-ray disc) or an AOD (advanced optical disc) as an information recording medium (also referred to as an optical disk).

The optical pickup apparatus PU has a semiconductor laser LD as a light source as shown in FIG. 1. The semiconductor laser LD is a GaN type violet semiconductor laser or a SHG type violet laser emitting light of wavelength of about 400 nm. The divergent light flux emitted from the semiconductor laser is passed through a polarization beam splitter and a ¼ wavelength plate WP to be made to a circular polarized parallel light flux by a collimator lens COL.

The parallel light flux is expanded in the diameter by passing through an expander lens EXP and passed through a diaphragm ST, and then the light flux is formed a converged spot on an information recording surface by an objective lens OBJ through a protective layer DP of an optical disk OD. The objective lens OBJ is driven in the focusing direction and the tracking direction by a double-axes actuator.

The objective lens OBJ is integrated by inlaying a flange FL1 and FL2 each unified with the optical surface of lens groups E1 and E2, respectively, and the objective lens OBJ can be attached with high accuracy to the optical pickup apparatus PU by the flange FL1 of the first lens group E1. A reflected light flux modulated by information pits at the image recording surface DR is passed through the objective lens OBJ, diaphragm ST and expander lens EX and then made a converged light flux by the collimator lens. The converged light flux is made to a liner polarized light by the ¼ wavelength plate WP and reflected by the polarized light beam splitter BS, and given astigmatism by passing a cylindrical lens CY and a concave lens NL and then converged onto the light receiving surface of a photo detector PD. Recording and reproducing of the information can be performed to the optical disk OD using focus error signals and tracking error signals according to output signals of the photo detector PD.

An information recording/reproducing apparatus can comprises the optical pickup apparatus PU and an optical information recording medium holding means, not displayed in the drawing, by which the optical disk OD is held so that the recording and reproducing of the information can be made possible. The optical information recording medium holding means comprises a rotating device for holding the central portion at the optical disk OD and rotating the disc.

When the antireflection layer is formed on the light ejecting side of the objective lens OBJ, the expander lens EX, or the collimator lens COL, the layer is formed by a vacuum deposition method, a spattering method or a CVD method. In the case of the vacuum deposition method, the layer can be formed by employing an electron gun heating device while the substrate is heated at a temperature of from 70° C. to 130° C. by a halogen lamp or a sheathed heater, and the substrate are held, and an inert gas such as argon gas and nitrogen gas, hydrogen gas or $CF_4$ gas is introduced singly or as a mixture thereof in the vacuum in which a electron heating gun, a raw material for deposition so as to kept at a vacuum degree of from 0.2 to 5 $E^{-2}$PA. The layer formation is performed while controlling the deposited layer thickness by a quartz layer thickness controlling method or an optical monitor controlling method.

The constitution of the layer is described below. In the followings, ni is the refractive index of the $i^{th}$ layer and di is the thickness of the $i^{th}$ layer.

(1) Two-layer structure: Laminated layers and the resin substrate are arranged in the order of Resin substrate/High refractive layer/Low refractive layer.

| | | |
|---|---|---|
| $1^{st}$ layer: | $1.7 \leq n1$, | $15 \text{ nm} \leq d1 \leq 91 \text{ nm}$ |
| $2^{nd}$ layer: | $1.2 \leq n2 \leq 1.55$, | $30 \text{ nm} \leq d2 \leq 118 \text{ nm}$ |

(2) Three-layer structure: Laminated layers and the resin substrate are arranged in the order of Resin substrate/Low refractive layer/High refractive layer/Low refractive layer.

| | | |
|---|---|---|
| $1^{st}$ layer: | $1.2 \leq n1 \leq 1.55$, | $10 \text{ nm} \leq d1 \leq 130 \text{ nm}$ |
| $2^{nd}$ layer: | $1.7 \leq n2$, | $20 \text{ nm} \leq d2 \leq 110 \text{ nm}$ |
| $3^{rd}$ layer: | $1.2 \leq n3 \leq 1.55$, | $35 \text{ nm} \leq d3 \leq 90 \text{ nm}$ |

(3) Three-layer structure: Laminated layers and the resin substrate are arranged in the order of Resin substrate/Medium refractive layer/High refractive layer/Low refractive layer.

| | | |
|---|---|---|
| $1^{st}$ layer: | $1.55 \leq n1 \leq 1.7$, | $40 \text{ nm} \leq d1 \leq 110 \text{ nm}$ |
| $2^{nd}$ layer: | $1.7 \leq n2$, | $35 \text{ nm} \leq d2 \leq 90 \text{ nm}$ |
| $3^{rd}$ layer: | $1.2 \leq n3 \leq 1.55$, | $45 \text{ nm} \leq d3 \leq 85 \text{ nm}$ |

(4) Four-layer structure: Laminated layers and the resin substrate are arranged in the order of Resin substrate/High refractive layer/Low refractive material/High refractive layer/Low refractive layer.

| | | |
|---|---|---|
| $1^{st}$ layer: | $1.7 \leq n1$, | $15 \text{ nm} \leq d1 \leq 36 \text{ nm}$ |
| $2^{nd}$ layer: | $1.2 \leq n2 \leq 1.55$, | $25 \text{ nm} \leq d2 \leq 40 \text{ nm}$ |
| $3^{rd}$ layer: | $1.7 \leq n3$, | $40 \text{ nm} \leq d3 \leq 150 \text{ nm}$ |
| $4^{th}$ layer: | $1.2 \leq n4 \leq 1.55$, | $90 \text{ nm} \leq d4 \leq 115 \text{ nm}$ |

(5) Five-layer structure: Laminated layers and the resin substrate are arranged in the order of Resin substrate/Low refractive layer/High refractive layer/Low refractive layer/High refractive layer/Low refractive layer.

| | | |
|---|---|---|
| $1^{st}$ layer: | $1.2 \leq n1 \leq 1.55$, | $5 \text{ nm} \leq d1 \leq 20 \text{ nm}$ |
| $2^{nd}$ layer: | $1.7 \leq n2$, | $15 \text{ nm} \leq d2 \leq 35 \text{ nm}$ |
| $3^{rd}$ layer: | $1.2 \leq n3 \leq 1.55$, | $25 \text{ nm} \leq d3 \leq 45 \text{ nm}$ |
| $4^{th}$ layer: | $1.7 \leq n4$, | $50 \text{ nm} \leq d4 \leq 130 \text{ nm}$ |
| $5^{th}$ layer: | $1.2 \leq n5 \leq 1.55$, | $80 \text{ nm} \leq d5 \leq 110 \text{ nm}$ |

(6) Six-layer structure: Laminated layers and the resin substrate are arranged in the order of Resin substrate/High refractive layer/Low refractive layer/High refractive layer/Low refractive layer/High refractive layer/Low refractive layer.

| | | |
|---|---|---|
| $1^{st}$ layer: | $1.7 \leq n1$, | $1.8 \text{ nm} \leq d1 \leq 15 \text{ nm}$ |
| $2^{nd}$ layer: | $1.2 \leq n2 \leq 1.55$, | $35 \text{ nm} \leq d2 \leq 55 \text{ nm}$ |
| $3^{rd}$ layer: | $1.7 \leq n3$, | $40 \text{ nm} \leq d3 \leq 60 \text{ nm}$ |
| $4^{th}$ layer: | $1.2 \leq n4 \leq 1.55$, | $10 \text{ nm} \leq d4 \leq 17 \text{ nm}$ |
| $5^{th}$ layer: | $1.7 \leq n5$, | $45 \text{ nm} \leq d5 \leq 90 \text{ nm}$ |
| $6^{th}$ layer: | $1.2 \leq n6 \leq 1.55$, | $70 \text{ nm} \leq d6 \leq 110 \text{ nm}$ |

(7) Seven-layer structure: Laminated layers and the resin substrate are arranged in the order of Resin substrate/Low refractive layer/High refractive layer/Low refractive layer/High refractive layer/Low refractive layer/High refractive layer/Low refractive layer.

| | | |
|---|---|---|
| $1^{st}$ layer: | $1.2 \leq n1 \leq 1.55$, | $80 \text{ nm} \leq d1 \leq 160 \text{ nm}$ |
| $2^{nd}$ layer: | $1.7 \leq n2$, | $10 \text{ nm} \leq d2 \leq 25 \text{ nm}$ |
| $3^{rd}$ layer: | $1.2 \leq n3 \leq 1.55$, | $30 \text{ nm} \leq d3 \leq 45 \text{ nm}$ |
| $4^{th}$ layer: | $1.7 \leq n4$, | $40 \text{ nm} \leq d4 \leq 85 \text{ nm}$ |
| $5^{th}$ layer: | $1.2 \leq n5 \leq 1.55$, | $10 \text{ nm} \leq d5 \leq 20 \text{ nm}$ |
| $6^{th}$ layer: | $1.7 \leq n6$, | $6 \text{ nm} \leq d6 \leq 70 \text{ nm}$ |
| $7^{th}$ layer: | $1.2 \leq n7 \leq 1.55$, | $60 \text{ nm} \leq d7 \leq 110 \text{ nm}$ |

The inventors prepared samples of Examples 1 through 40-3 and Comparative examples 1 through 10 as shown in Tables 1 through 7 by forming each an antireflection layer M on a test resin substrate having a diameter of 30 mm and a thickness of 3 mm by the vacuum deposit method or the spattering method for investigating the specification of the antireflection layer not causing the degradation of the optical property of the optical element. And then the samples were subjected to a laser light irradiation test, measurement of light absorption and environmental resistivity test for evaluating. For the resin material of the testing resin substrate, the following Resin 1, and acryl resin and polycarbonate resin for comparison were employed.

In these tables H represents a high refractive index material, L represents a low refractive index material, M represents a middle refractive index material.

Resin 1:

<<Preparation of Polymer>>

Into a stainless steel polymerization vessel having a stirrer, in which a sufficiently dried and air was replaced by nitrogen, 320 parts of dehydrated cyclohexane, 60 parts of styrene and 0.38 parts of dibutyl ether were charged, and 0.36 parts of a n-butyl lithium solution (hexane solution having a content of 15%) was added while stirring at 60° C. for starting polymerization reaction. After the polymerization for 1 hour, 20 parts of a monomer mixture composed of 8 parts of styrene and 12 parts of isoprene, and the polymerization reaction was further continued for 1 hour, and then 0.2 parts of isopropyl alcohol was added to stop the reaction. The Mw of thus obtained block copolymer was 102,000 and Mw/Mn was 1.11.

After that, 400 parts of the above polymerization reacting liquid was transferred to a pressure vessel, and 10 parts of silica-alumina carrier type nickel catalyst, E22U having a carried nickel amount of 60%, manufactured by Nikki Kagaku Kogyo Co., Ltd, was added and mixed. The interior of the reaction vessel was replaced by hydrogen gas and hydrogen gas was further supplied while stirring and then temperature was set at 160° C., and the reaction was performed for 8 hours at a pressure of 4.5 MPa for hydrogenating to aromatic ring. After completion of the hydrogenation, the reaction liquid was filtered for removing the hydrogenation catalyst, and then the liquid was diluted by adding 800 parts of cyclohexane and poured into 3,500 parts of isopropanol (previously filtered through a filter having a pore diameter of 1 μm in a clean room of class 1000) to precipitate the block copolymer. The block copolymer was recovered by filtration and dried for 48 hours at 80° C. Thus obtained block copolymer is a two component block copolymer including a block containing a repeating unit derived from styrene, hereinafter referred to as St, and a block containing a repeating unit derived for styrene and isoprene, hereinafter referred to as St/Ip, and the mole ration of each blocks was St:St/Ip was 69:31 (St:Ip=10:21). The Mw of the block copolymer was 85,100, Mw/Mn was 1.17, the hydrogenated ratio of the main chain and the aromatic ring was 99.9% and the Tg is 126.5° C.

<<Preparation of Resin>>

To 100 parts of thus obtained block copolymer, 0.1 parts of styrene-ethylene-butylene-styrene block copolymer Septon 2002, manufactured by Kuraray Co., Ltd., 0.1 parts of tetrakis-[methylene-3-(3',5'-di-tert-butyl-4'-hydroxypheny) propionate] methane, Irganox 1010 manufactured by Ciba Speciality•chemicals Co., Ltd., as an antioxidant, 0.1 parts of 2-(2'-hydroxy-5'-methyl-phenyl)benzotriazole, Tinuvin P manufactured by Ciba Speciality•chemicals Co., Ltd., as a benzotriazole type UV absorbent and 0.1 parts of a condensation polymerization product of dibutylamine, 1,3,5-triazine•N,N'-bis(2,2,6,6,6-tetramethyl-4-piperidyl)-1,6-hexa methylendiamine and N-(2,2,6,6-tetramethyl-4-piperidyl)butylamine HALS(A) having a Mn of 3,000 as HALS were added and kneaded by a double-axes kneader, TEM-35B manufactured by Toshiba Kikai Co., Ltd., (screw diameter: 37 mm, L/D: 32, rotation rate: 150 rpm, resin temperature: 240° C. and feed rate: 10 kg/hour) and extruded in a form of strand and cooled by water and cut into pellets by a pelletizer. Thus Resin 1 was obtained.

The pellets of obtained Resin 1, acryl resin and polycarbonate resin were each dried by air in a hot air drying apparatus for 2 hours at 70° C. to remove moisture and formed by injection molding to obtain the resin substrate for the test.

TABLE 1

(1) Two-layer structure: Resin substrate/H/L
(H: High refractive index material, L: Low refractive index material)

| | Example 1 | Example 2 | Example 3 | Example 4 | Example 5 |
|---|---|---|---|---|---|
| Resin substrate | Resin 1 | Resin 1 | Resin 1 | Resin 1 | Resin 1 |
| First layer (High refractive index material) | | | | | |
| Deposition source | Scandium oxide | Niobium oxide | Lanthanum oxide | Substance H2 | Substance H5 |
| Layer material | Scandium oxide | Niobium oxide | Lanthanum oxide | Praseodymium titanate | Lanthanum titanate |
| Inert Gas | Oxygen gas | Oxygen gas | Argon gas | Oxygen gas | Oxygen gas |
| n1 | 1.83 | 1.9 | 1.92 | 1.95 | 2.01 |
| d1(nm) | 39 | 23 | 19 | 54 | 23 |
| Second layer (Low refractive index material) | | | | | |
| Deposition source | Silicon oxide | Substance L5 | Silicon oxide | Substance L5 | Substance L5 |
| Layer material | Silicon oxide | Mixture of Silicon oxide and aluminum oxide | Silicon oxide | Mixture of silicon oxide and aluminum oxide | Mixture of silicon oxide and aluminum oxide |
| Inert Gas | Oxygen gas | None | None | Oxygen gas | Oxygen gas |
| n2 | 1.43–1.49 | 1.46–1.53 | 1.44–1.50 | 1.45–1.52 | 1.45–1.52 |
| d2(nm) | 82 | 104 | 100 | 67 | 97 |

TABLE 1-continued (1) Two-layer structure: Resin substrate/H/L
(H: High refractive index material, L: Low refractive index material)

| Resin substrate | Example 6 Resin 1 | Example 7 Resin 1 | Example 8 Resin 1 | Example 9 Resin 1 | Example 10 Resin 1 |
|---|---|---|---|---|---|
| First layer (High refractive index material) | | | | | |
| Deposition source | Substance H5 | Substance M3 | Yttrium oxide | Hafnium oxide | Zirconium oxide |
| Layer material | Lanthanum titanate | Lanthanum aluminate | Yttrium oxide | Hafnium oxide | Zirconium oxide |
| Inert Gas | Argon gas | Oxygen gas | Oxygen gas | Oxygen gas | Oxygen gas |
| n1 | 2.02 | 1.75 | 1.75 | 1.88 | 1.95 |
| d1(nm) | 91 | 30 | 21 | 28 | 23 |
| Second layer (Low refractive index material) | | | | | |
| Deposition source | Silicon oxide | Silicon oxide | Silicon oxide | Silicon oxide | Silicon oxide |
| Layer material | Silicon oxide | Silicon oxide | Silicon oxide | Silicon oxide | Silicon oxide |
| Inert Gas | Oxygen gas | None | Oxygen gas | None | Oxygen gas |
| n2 | 1.43–1.49 | 1.44–1.50 | 1.43–1.49 | 1.44–1.50 | 1.43–1.48 |
| d2(nm) | 32 | 98 | 88 | 96 | 79 |

| Resin substrate | Example 11 Resin 1 | Comparative Example 1 Acrylate resin 1 | Comparative Example 2 Resin 1 | Comparative Example 3 Resin 1 | Comparative Example 4 Resin 1 |
|---|---|---|---|---|---|
| First layer (High refractive index material) | | | | | |
| Deposition source | Substance M3 | Substance H5 | Cerium oxide | Zinc sulfide | Titanium oxide |
| Layer material | Lanthanum aluminate | Lanthanum titanate | Cerium oxide | Zinc sulfide | Titanium oxide |
| Inert Gas | Nitrogen gas | Oxygen gas | Oxygen gas | None | Oxygen gas |
| n1 | 1.95 | 2.02 | 1.85 | 2.2 | 2.08 |
| d1(nm) | 24 | 28 | 25 | 33 | 24 |
| Second layer (Low refractive index material) | | | | | |
| Deposition source | Substance L5 | Substance L5 | Substance L5 | Silicon oxide | Silicon oxide |
| Layer material | *1 | *1 | *1 | Silicon oxide | Silicon oxide |
| Inert Gas | Oxygen gas | Oxygen gas | None | Oxygen gas | None |
| n2 | 1.45–1.51 | 1.49 | 1.49 | 1.46 | 1.44–1.50 |
| d2(nm) | 116 | 90 | 88 | 81 | 100 |

*1: Mixture Of Silicon Oxide And Aluminum Oxide

TABLE 2

(2) Three-layer structure: Resin substrate/L/H/L
(H: High refractive index material, L: Low refractive index material)

| | Example 12 | Example 13 | Example 14 | Example 15 |
|---|---|---|---|---|
| Resin substrate | Resin 1 | Resin 1 | Resin 1 | Resin 1 |
| First layer (Low refractive index material) | | | | |
| Deposition source | Silicon oxide | Silicon oxide | Silicon oxide | Substance L5 |
| Layer material | Silicon oxide | Silicon oxide | Silicon oxide | Mixture of silicon oxide and aluminum oxide |
| Inert Gas | Oxygen gas | None | Argon gas | None |
| n1 | 1.46 | 1.46 | 1.46 | 1.49 |
| d1(nm) | 41 | 61 | 38 | 37 |
| Second layer (High refractive index material) | | | | |
| Deposition source | Niobium oxide | Substance H5 | Substance M3 | Hafnium oxide |
| Layer material | Niobium oxide | Lanthanum titanate | Lanthanum aluminate | Hafnium oxide |
| Inert Gas | Oxygen gas | Oxygen gas | Oxygen gas | Oxygen gas |
| n2 | 1.9 | 2.01 | 1.95 | 1.89 |
| d2(nm) | 43 | 27 | 70 | 94 |
| Third layer (Low refractive index material) | | | | |
| Deposition source | Substance L5 | Substance L5 | Silicon oxide | Silicon oxide |
| Layer material | Mixture of silicon | Mixture of silicon | Silicon oxide | Silicon oxide |

TABLE 2-continued (2) Three-layer structure: Resin substrate/L/H/L
(H: High refractive index material, L: Low refractive index material)

|  |  |  |  |  |
|---|---|---|---|---|
|  | oxide and aluminum oxide | oxide and aluminum oxide |  |  |
| Inert Gas | Oxygen gas | None | Oxygen gas | Oxygen gas |
| n3 | 1.49 | 1.49 | 1.46 | 1.46 |
| d3(nm) | 70 | 86 | 72 | 61 |

|  | Example 16 | Example 17 | Example 18 | Example 19 |
|---|---|---|---|---|
| Resin substrate | Resin 1 | Resin 1 | Resin 1 | Resin 1 |
| First layer (Low refractive index material) | | | | |
| Deposition source | Substance L5 | Magnesium fluoride | Substance L5 | Aluminum fluoride |
| Layer material | Mixture of silicon oxide and aluminum oxide | Magnesium fluoride | Mixture of silicon oxide and aluminum oxide | Aluminum fluoride |
| Inert Gas | Argon gas | Argon gas | Nitrogen gas | Argon gas |
| n1 | 1.49 | 1.34 | 1.49 | 1.31 |
| d1(nm) | 19 | 24 | 130 | 130 |
| Second layer (High refractive index material) | | | | |
| Deposition source | Zirconium oxide | Substance M3 | Hafnium oxide | Hafnium oxide |
| Layer material | Zirconium oxide | Lanthanum aluminate | Hafnium oxide | Hafnium oxide |
| Inert Gas | Oxygen gas | Oxygen gas | Oxygen gas | Oxygen gas |
| n2 | 1.94 | 1.95 | 1.89 | 1.89 |
| d2(nm) | 108 | 99 | 84 | 85 |
| Third layer (Low refractive index material) | | | | |
| Deposition source | Substance L5 | Cerous fluoride | Substance L5 | Substance L5 |
| Layer material | Mixture of silicon oxide and aluminum oxide | Cerous fluoride | Mixture of silicon oxide and aluminum oxide | Mixture of silicon oxide and aluminum oxide |
| Inert Gas | Oxygen gas | None | None | Oxygen gas |
| n3 | 1.49 | 1.58 | 1.49 | 1.49 |
| d3(nm) | 55 | 58 | 46 | 38 |

|  | Example 20 | Example 21 | Example 22 |
|---|---|---|---|
| Resin substrate | Resin 1 | Resin 1 | Resin 1 |
| First layer (Low refractive index material) | | | |
| Deposition source | Yttrium fluoride | Aluminum fluoride | Aluminum fluoride |
| Layer material | Yttrium fluoride | Aluminum fluoride | Aluminum fluoride |
| Inert Gas | Nitrogen gas | None | Argon gas |
| n1 | 1.53 | 1.29 | 1.3 |
| d1(nm) | 16 | 37 | 81 |
| Second layer (High refractive index material) | | | |
| Deposition source | Zirconium oxide | Hafnium oxide | Zirconium oxide |
| Layer material | Zirconium oxide | Hafnium oxide | Zirconium oxide |
| Inert Gas | Oxygen gas | Oxygen gas | Oxygen gas |
| n2 | 1.94 | 1.86 | 1.98 |
| d2(nm) | 26 | 24 | 24 |
| Third layer (Low refractive index material) | | | |
| Deposition source | Silicon oxide | Substance L5 | Substance L5 |
| Layer material | Mixture of silicon oxide and aluminum oxide | Mixture of silicon oxide and aluminum oxide | Mixture of silicon oxide and aluminum oxide |

|  | Comparative Example 5 | Comparative Example 6 |
|---|---|---|
| Resin substrate | Polycarbonate | Resin 1 |
| First layer (Low refractive index material) | | |
| Deposition source | Aluminum fluoride | Substance L5 |
| Layer material | Aluminum fluoride | Mixture of silicon oxide and aluminum oxide |
| Inert Gas | CF4 gas | None |
| n1 | 1.29 | 1.49 |
| d1(nm) | 37 | 45 |
| Second layer (High refractive index material) | | |
| Deposition source | Substance H5 | Cerium oxide |
| Layer material | Lanthanum titanate | Cerium oxide |
| Inert Gas | Oxygen gas | Oxygen gas |
| n2 | 2.01 | 1.85 |
| d2(nm) | 24 | 26 |
| Third layer (Low refractive index material) | | |
| Deposition source | Silicon oxide | Silicon oxide |
| Layer material | Silicon oxide | Silicon oxide |
| Inert Gas | Oxygen gas | None |
| n3 | 1.47 | 1.46 |
| d3(nm) | 116 | 100 |

TABLE 3

(3) Three-layer structure: Resin substrate/M/H/L
(H: High refractive index material, M: Medium refractive material, L: Low refractive index material)

|  | Example 23 | Example 24 | Example 25 |
|---|---|---|---|
| Resin substrate | Resin 1 | Resin 1 | Resin 1 |
| First layer (Middle refractive index material) | | | |
| Deposition source | Aluminum oxide | Aluminum oxide | Aluminum oxide |
| Layer material | Aluminum oxide | Aluminum oxide | Aluminum oxide |
| Inert Gas | Oxygen gas | Oxygen gas | Oxygen gas |
| N1 | 1.62 | 1.62 | 1.62 |
| D1(nm) | 42 | 100 | 102 |
| Second layer (High refractive index material) | | | |
| Deposition source | Hafnium oxide | Substance M3 | Substance M3 |
| Layer material | Hafnium oxide | | |
| Inert Gas | Oxygen gas | Oxygen gas | Oxygen gas |
| N2 | 1.88 | 1.76 | 1.76 |
| D2(nm) | 37 | 74 | 89 |
| Third layer (Low refractive index material) | | | |
| Deposition source | Silicon oxide | Silicon oxide | Silicon oxide |
| Layer material | Silicon oxide | Silicon oxide | Silicon oxide |

TABLE 3-continued

(3) Three-layer structure: Resin substrate/M/H/L
(H: High refractive index material, M: Medium refractive material, L: Low refractive index material)

|  | Example 23 | Example 24 | Example 25 |
|---|---|---|---|
| Inert Gas | Oxygen gas | Oxygen gas | Oxygen gas |
| n3 | 1.46 | 1.46 | 1.46 |
| d3(nm) | 82 | 76 | 46 |

TABLE 4

(4) Four-layer structure: Resin substrate/H/L/H/L
(H: High refractive index material, L: Low refractive index material)

|  | Example 26 | Example 27 | Example 28 |
|---|---|---|---|
| Resin substrate | Resin 1 | Resin 1 | Resin 1 |
| *First layer (High refractive index material)* | | | |
| Deposition Source | Substance H5 | Hafnium oxide | Zirconium oxide |
| Layer material | Lanthanum titanate | Hafnium oxide | Zirconium oxide |
| Inert gas | Oxygen gas | Oxygen gas | Oxygen gas |
| N1 | 2.01 | 1.85 | 1.93 |
| D1(nm) | 29 | 16.3 | 28 |
| *Second layer (Low refractive index material)* | | | |
| Deposition Source | Silicon oxide | Substance L5 | Silicon oxide |
| Layer material | Silicon oxide | Substance L5 | Silicon oxide |
| Inert Gas | None | Oxygen gas | Oxygen gas |
| N2 | 1.46 | 1.51 | 1.47 |
| d2(nm) | 40 | 29.3 | 30 |
| *Third layer (High refractive index material)* | | | |
| Deposition Source | Substance H5 | Hafnium oxide | Zirconium oxide |
| Layer material | Lanthanum titanate | Hafnium oxide | Zirconium oxide |
| Inert Gas | Oxygen gas | Oxygen gas | Oxygen gas |
| n3 | 2.01 | 1.85 | 1.93 |
| d3(nm) | 44 | 145.5 | 63.6 |
| *Fourth layer (Low refractive index material)* | | | |
| Deposition source | Silicon oxide | Substance L5 | Silicon oxide |
| Layer material | Silicon oxide | Substance L5 | Silicon oxide |
| Inert Gas | Oxygen gas | Oxygen gas | None |
| n4 | 1.46 | 1.50 | 1.46 |
| d4(nm) | 92 | 85.5 | 102 |

|  | Example 29 | Example 29-2 | Comparative Example 7 |
|---|---|---|---|
| Resin substrate | Resin 1 | Resin 1 | Resin 1 |
| *First layer (High refractive index material)* | | | |
| Deposition source | Substance M3 | Silicon nitride | Cerium oxide |
| Layer material | Lanthanum aluminate | Silicon nitride | Cerium oxide |
| Inert Gas | Oxygen gas | Nitrogen gas | Oxygen gas |
| N1 | 1.95 | 1.80 | 1.85 |
| D1(nm) | 36 | 25 | 23 |
| *Second layer (Low refractive index material)* | | | |
| Deposition source | Silicon oxide | Silicon oxide | Silicon oxide |
| Layer material | Silicon oxide | Silicon oxide | Silicon oxide |

TABLE 4-continued

(4) Four-layer structure: Resin substrate/H/L/H/L
(H: High refractive index material, L: Low refractive index material)

| Inert Gas | Oxygen gas | Oxygen gas | Oxygen gas |
|---|---|---|---|
| N2 | 1.47 | 1.47 | 1.47 |
| d2(nm) | 34 | 25 | 25 |
| *Third layer (High refractive index material)* | | | |
| Deposition source | Hafnium oxide | Tantalum oxide | Cerium oxide |
| Layer material | Hafnium oxide | Tantalum oxide | Cerium oxide |
| Inert Gas | Oxygen gas | Oxygen gas | Oxygen gas |
| n3 | 1.95 | 2.01 | 1.85 |
| d3(nm) | 65 | 55 | 50 |
| *Fourth layer (Low refractive index material)* | | | |
| Deposition source | Silicon oxide | Silicon oxide | Silicon oxide |
| Layer material | Silicon oxide | Silicon oxide | Silicon oxide |
| Inert Gas | Oxygen gas | Oxygen gas | Oxygen gas |
| n4 | 1.46 | 1.47 | 1.46 |
| d4(nm) | 111 | 85 | 85 |

TABLE 5

(5) Five-layer structure: Resin substrate/L/H/L/H/L
(H: High refractive index material, L: Low refractive index material)

|  | Example 30 | Example 31 |
|---|---|---|
| Resin substrate | Resin 1 | Resin 1 |
| *First layer (Low refractive index material)* | | |
| Deposition source | Silicon oxide | Silicon oxide |
| Layer material | Silicon oxide | Silicon oxide |
| Inert Gas | None | Oxygen gas |
| n1 | 1.46 | 1.46 |
| d1(nm) | 18.1 | 14.2 |
| *Second layer (High refractive index material)* | | |
| Deposition source | Substance H5 | Hafnium oxide |
| Layer material | Lanthanum titanate | Hafnium oxide |
| Inert Gas | Oxygen gas | Oxygen gas |
| n2 | 2.01 | 1.85 |
| d2(nm) | 18.1 | 27.9 |
| *Third layer (Low refractive index material)* | | |
| Deposition source | Silicon oxide | Silicon oxide |
| Layer material | Silicon oxide | Silicon oxide |
| Inert Gas | None | Oxygen gas |
| n3 | 1.46 | 1.46 |
| d3(nm) | 41.4 | 25.9 |
| *Fourth layer (High refractive index material)* | | |
| Deposition source | Substance H5 | Hafnium oxide |
| Layer material | Lanthanum titanate | Hafnium oxide |
| Inert Gas | Oxygen gas | Oxygen gas |
| n4 | 2.01 | 1.85 |
| d4(nm) | 33.2 | 59 |
| *Fifth layer (Low refractive index material)* | | |
| Deposition source | Silicon oxide | Silicon oxide |
| Layer material | Silicon oxide | Silicon oxide |
| Inert Gas | None | Oxygen gas |
| n5 | 1.46 | 1.46 |
| d5(nm) | 99.7 | 86 |

|  | Example 32 | Example 33 |
|---|---|---|
| Resin substrate | Resin 1 | Resin 1 |

TABLE 5-continued

(5) Five-layer structure: Resin substrate/L/H/L/H/L
(H: High refractive index material, L: Low refractive index material)

First layer (Low refractive index material)

| | | |
|---|---|---|
| Deposition source | Silicon oxide | Silicon oxide |
| Layer material | Silicon oxide | Silicon oxide |
| Inert Gas | None | Oxygen gas |
| n1 | 1.46 | 1.46 |
| d1(nm) | 16 | 6.4 |

Second layer (High refractive index material)

| | | |
|---|---|---|
| Deposition source | Hafnium oxide | Zirconium oxide |
| Layer material | Hafnium oxide | Zirconium oxide |
| Inert Gas | Oxygen gas | Oxygen gas |
| n2 | 1.85 | 1.93 |
| d2(nm) | 34 | 15.1 |

Third layer (Low refractive index material)

| | | |
|---|---|---|
| Deposition source | Silicon oxide | Silicon oxide |
| Layer material | Silicon oxide | Silicon oxide |
| Inert Gas | None | Oxygen gas |
| n3 | 1.46 | 1.46 |
| d3(nm) | 30 | 29.5 |

Fourth layer (High refractive index material)

| | | |
|---|---|---|
| Deposition source | Hafnium oxide | Zirconium oxide |
| Layer material | Hafnium oxide | Zirconium oxide |
| Inert Gas | Oxygen gas | Oxygen gas |
| n4 | 1.85 | 1.93 |
| d4(nm) | 68 | 123 |

Fifth layer (Low refractive index material)

| | | |
|---|---|---|
| Deposition source | Silicon oxide | Silicon oxide |
| Layer material | Silicon oxide | Silicon oxide |
| Inert Gas | None | Oxygen gas |
| n5 | 1.46 | 1.46 |
| d5(nm) | 102 | 82.7 |

| | Example 33-2 | Example 33-3 | Comparative Example 8 |
|---|---|---|---|
| Resin substrate | Resin 1 | Resin 1 | Resin 1 |

First layer (Low refractive index material)

| | | | |
|---|---|---|---|
| Deposition source | Substance L5 | Substance L5 | Silicon oxide |
| Layer material | *1 | *1 | Silicon oxide |
| Inert Gas | Oxygen gas | Oxygen gas | None |
| n1 | 1.49 | 1.49 | 1.46 |
| d1(nm) | 10 | 11 | 5 |

Second layer (High refractive index material)

| | | | |
|---|---|---|---|
| Deposition source | Zirconium oxide | Tantalum oxide | Cerium oxide |
| Layer material | Zirconium oxide | Tantalum oxide | Cerium oxide |
| Inert Gas | Oxygen gas | Oxygen gas | Oxygen gas |
| n2 | 1.93 | 1.96 | 1.85 |
| d2(nm) | 15.2 | 14.8 | 24 |

Third layer (Low refractive index material)

| | | | |
|---|---|---|---|
| Deposition source | Substance L5 | Substance L5 | Silicon oxide |
| Layer material | *1 | *1 | Silicon oxide |
| Inert Gas | Oxygen gas | Oxygen gas | None |
| n3 | 1.49 | 1.49 | 1.46 |
| d3(nm) | 27 | 27 | 26 |

Fourth layer (High refractive index material)

| | | | |
|---|---|---|---|
| Deposition source | Zirconium oxide | Tantalum oxide | Cerium oxide |
| Layer material | Zirconium oxide | Tantalum oxide | Cerium oxide |
| Inert Gas | Oxygen gas | Oxygen gas | Oxygen gas |
| n4 | 1.93 | 1.96 | 1.85 |
| d4(nm) | 122 | 120 | 53 |

Fifth layer (Low refractive index material)

| | | | |
|---|---|---|---|
| Deposition source | Substance L5 | Substance L5 | Silicon oxide |
| Layer material | *1 | *1 | Silicon oxide |
| Inert Gas | Oxygen gas | Oxygen gas | None |
| n5 | 1.49 | 1.49 | 1.46 |
| d5(nm) | 82.6 | 82.8 | 83 |

*1: Mixture Of Silicon Oxide And Aluminum Oxide

TABLE 6

(6) Six-layer structure: Resin substrate/H/L/H/L/H/L

| | Example 34 | Example 35 |
|---|---|---|
| Resin substrate | Resin 1 | Resin 1 |

First layer (High refractive index material)

| | | |
|---|---|---|
| Deposition source | Substance H5 | Hafnium oxide |
| Layer material | Lanthanum titanate | Hafnium oxide |
| Inert Gas | Oxygen gas | Oxygen gas |
| n1 | 2.01 | 1.85 |
| d1(nm) | 8.72 | 11.7 |

Second layer (Low refractive index material)

| | | |
|---|---|---|
| Deposition source | Silicon oxide | Silicon oxide |
| Layer material | Silicon oxide | Silicon oxide |
| Inert Gas | None | Oxygen gas |
| n2 | 1.46 | 1.46 |
| d2(nm) | 39.6 | 52.2 |

Third layer (High refractive index material)

| | | |
|---|---|---|
| Deposition source | Substance H5 | Hafnium oxide |
| Layer material | Lanthanum titanate | Hafnium oxide |
| Inert Gas | Oxygen gas | Oxygen gas |
| n3 | 2.01 | 1.85 |
| d3(nm) | 44 | 54.7 |

Fourth layer (Low refractive index material)

| | | |
|---|---|---|
| Deposition source | Silicon oxide | Silicon oxide |
| Layer material | Silicon oxide | Silicon oxide |
| Inert Gas | None | Oxygen gas |
| n4 | 1.46 | 1.46 |
| d4(nm) | 12.6 | 14.6 |

Fifth layer (High refractive index material)

| | | |
|---|---|---|
| Deposition source | Substance H5 | Hafnium oxide |
| Layer material | Lanthanum titanate | Hafnium oxide |
| Inert Gas | Oxygen gas | Oxygen gas |
| n3 | 2.01 | 1.85 |
| d3(nm) | 51 | 85.6 |

Sixth layer (Low refractive index material)

| | | |
|---|---|---|
| Deposition source | Silicon oxide | Silicon oxide |
| Layer material | Silicon oxide | Silicon oxide |
| Inert Gas | None | Oxygen gas |
| n4 | 1.46 | 1.46 |
| d4(nm) | 78.9 | 103 |

| | Example 36 | Example 36-2 | Comparative Example 9 |
|---|---|---|---|
| Resin substrate | Resin 1 | Resin 1 | Resin 1 |

First layer (High refractive index material)

| | | | |
|---|---|---|---|
| Deposition source | Zirconium oxide | Silicon nitride | Cerium oxide |
| Layer material | Zirconium oxide | Silicon nitride | Cerium oxide |
| Inert Gas | Oxygen gas | Nitrogen gas | Oxygen gas |
| n1 | 1.93 | 1.80 | 1.85 |
| d1(nm) | 10.2 | 11 | 10.2 |

Second layer (Low refractive index material)

| | | | |
|---|---|---|---|
| Deposition source | Silicon oxide | Substance L5 | Silicon oxide |
| Layer material | Silicon oxide | *1 | Silicon oxide |

TABLE 6-continued (6) Six-layer structure: Resin substrate/H/L/H/L/H/L

| | | | |
|---|---|---|---|
| Inert Gas | Oxygen gas | Oxygen gas | None |
| n2 | 1.46 | 1.49 | 1.46 |
| d2(nm) | 43.1 | 42 | 43 |

Third layer (High refractive index material)

| | | | |
|---|---|---|---|
| Deposition source | Zirconium oxide | Tantalum oxide | Cerium oxide |
| Layer material | Zirconium oxide | Tantalum oxide | Cerium oxide |
| Inert Gas | Oxygen gas | Oxygen gas | Oxygen gas |
| n3 | 1.93 | 2.01 | 1.85 |
| d3(nm) | 49.8 | 41.0 | 49.5 |

Fourth layer (Low refractive index material)

| | | | |
|---|---|---|---|
| Deposition source | Silicon oxide | Substance L5 | Silicon oxide |
| Layer material | Silicon oxide | *1 | Silicon oxide |
| Inert Gas | Oxygen gas | Oxygen gas | None |
| n4 | 1.46 | 1.49 | 1.46 |
| d4(nm) | 12.5 | 12.6 | 12.8 |

Fifth layer (High refractive index material)

| | | | |
|---|---|---|---|
| Deposition source | Zirconium oxide | Tantalum oxide | Cerium oxide |
| Layer material | Zirconium oxide | Tantalum oxide | Cerium oxide |
| Inert Gas | Oxygen gas | Oxygen gas | Oxygen gas |
| n3 | 1.93 | 2.01 | 1.85 |
| d3(nm) | 75.5 | 51 | 74.8 |

Sixth layer (Low refractive index material)

| | | | |
|---|---|---|---|
| Deposition source | Silicon oxide | Substance L5 | Silicon oxide |
| Layer material | Silicon oxide | *1 | Silicon oxide |
| Inert Gas | Oxygen gas | Oxygen gas | None |
| n4 | 1.46 | 1.49 | 1.46 |
| d4(nm) | 94.1 | 78.9 | 94.8 |

*1: Mixture Of Silicon Oxide And Aluminum Oxide

TABLE 7

(7) seven-layer structure: Resin substrate/L/H/L/H/L/H/L
(H: High refractive index material, L: Low refractive index material)

| | Example 37 | Example 38 | Example 39 | Example 40 |
|---|---|---|---|---|
| Resin substrate | Resin 1 | Resin 1 | Resin 1 | Resin 1 |

First layer (Low refractive index material)

| | | | | |
|---|---|---|---|---|
| Deposition source | Silicon oxide | Silicon oxide | Silicon oxide | Silicon oxide |
| Layer material | Silicon oxide | Silicon oxide | Silicon oxide | Silicon oxide |
| Inert Gas | None | Oxygen gas | Oxygen gas | None |
| n1 | 1.46 | 1.46 | 1.46 | 1.46 |
| d1(nm) | 87.6 | 140 | 102.7 | 103.3 |

Second layer (High refractive index material)

| | | | | |
|---|---|---|---|---|
| Deposition source | Substance H5 | Hafnium oxide | Hafnium oxide | Zirconium oxide |
| Layer material | Lanthanum titanate | Hafnium oxide | Hafnium oxide | Zirconium oxide |
| Inert Gas | Oxygen gas | Oxygen gas | Oxygen gas | Oxygen gas |
| n2 | 1.94 | 1.85 | 1.85 | 1.93 |
| d2(nm) | 22.1 | 14.8 | 12.4 | 13.7 |

Third layer (Low refractive index material)

| | | | | |
|---|---|---|---|---|
| Deposition source | Silicon oxide | Silicon oxide | Silicon oxide | Silicon oxide |
| Layer material | Silicon oxide | Silicon oxide | Silicon oxide | Silicon oxide |
| Inert Gas | None | Oxygen gas | Oxygen gas | None |
| n3 | 1.46 | 1.46 | 1.46 | 1.46 |
| d3(nm) | 41.2 | 41.5 | 34.4 | 39.5 |

TABLE 7-continued (7) seven-layer structure: Resin substrate/L/H/L/H/L/H/L
(H: High refractive index material, L: Low refractive index material)

Fourth layer (High refractive index material)

| | | | | |
|---|---|---|---|---|
| Deposition source | Substance H5 | Hafnium oxide | Hafnium oxide | Zirconium oxide |
| Layer material | Lanthanum titanate | Hafnium oxide | Hafnium oxide | Zirconium oxide |
| Inert Gas | Oxygen gas | Oxygen gas | Oxygen gas | Oxygen gas |
| n4 | 1.94 | 1.85 | 1.85 | 1.93 |
| d4(nm) | 52.2 | 57.4 | 48.2 | 54.8 |

Fifth layer (Low refractive index material)

| | | | | |
|---|---|---|---|---|
| Deposition source | Silicon oxide | Silicon oxide | Silicon oxide | Silicon oxide |
| Layer material | Silicon oxide | Silicon oxide | Silicon oxide | Silicon oxide |
| Inert Gas | None | Oxygen gas | Oxygen gas | None |
| n5 | 1.46 | 1.46 | 1.46 | 1.46 |
| d5(nm) | 15.1 | 14.3 | 11.8 | 13.5 |

Sixth layer (High refractive index material)

| | | | | |
|---|---|---|---|---|
| Deposition source | Substance H5 | Hafnium oxide | Zirconium oxide | Zirconium oxide |
| Layer material | Lanthanum titanate | Hafnium oxide | Zirconium oxide | Zirconium oxide |
| Inert Gas | Oxygen gas | Oxygen gas | Oxygen gas | Oxygen gas |
| n6 | 1.94 | 1.85 | 1.93 | 1.93 |
| d6(nm) | 51.7 | 64.6 | 6.85 | 46.2 |

Seventh layer (Low refractive index material)

| | | | | |
|---|---|---|---|---|
| Deposition source | Silicon oxide | Silicon oxide | Silicon oxide | Silicon oxide |
| Layer material | Silicon oxide | Silicon oxide | Silicon oxide | Silicon oxide |
| Inert Gas | None | Oxygen gas | Oxygen gas | None |
| n7 | 1.46 | 1.46 | 1.46 | 1.46 |
| d7(nm) | 92.8 | 97.2 | 68.7 | 82.4 |

| | Example 40-2 | Example 40-3 | Comparative Example 10 |
|---|---|---|---|
| Resin substrate | Resin 1 | Resin 1 | Resin 1 |

First layer (Low refractive index material)

| | | | |
|---|---|---|---|
| Deposition source | Substance L5 | Substance L5 | Silicon oxide |
| Layer material | Mixture of silicon oxide and aluminum oxide | Mixture of silicon oxide and aluminum oxide | Silicon oxide |
| Inert gas | Oxygen gas | Oxygen gas | Oxygen gas |
| n1 | 1.49 | 1.49 | 1.46 |
| d1(nm) | 114 | 152 | 103.5 |

Second layer (High refractive index material)

| | | | |
|---|---|---|---|
| Deposition source | Zirconium oxide | Tantalum oxide | Cerium oxide |
| Layer material | Zirconium oxide | Tantalum oxide | Cerium oxide |
| Inert gas | Oxygen gas | Oxygen gas | Oxygen gas |
| n2 | 1.95 | 2.01 | 1.85 |
| d2(nm) | 18 | 18 | 19 |

Third layer (Low refractive index material)

| | | | |
|---|---|---|---|
| Deposition source | Substance L5 | Substance L5 | Silicon oxide |
| Layer material | Mixture of silicon oxide and aluminum oxide | Mixture of silicon oxide and aluminum Oxide | Silicon oxide |
| Inert gas | Oxygen gas | Oxygen gas | Oxygen gas |
| n3 | 1.49 | 1.49 | 1.46 |
| d3(nm) | 42 | 36 | 40 |

Fourth layer (High refractive index material)

| | | | |
|---|---|---|---|
| Deposition source | Zirconium oxide | Tantalum oxide | Cerium oxide |

TABLE 7-continued (7) seven-layer structure: Resin substrate/L/H/L/H/L/H/L
(H: High refractive index material, L: Low refractive index material)

| Layer material | Zirconium oxide | Tantalum oxide | Cerium oxide |
|---|---|---|---|
| Inert gas | Oxygen gas | Oxygen gas | Oxygen gas |
| n4 | 1.95 | 2.01 | 1.85 |
| d4(nm) | 83 | 75.3 | 55.2 |
| Fifth layer (Low refractive index material) | | | |
| Deposition source | Substance L5 | Substance L5 | Silicon oxide |
| Layer material | Mixture of silicon oxide and aluminum oxide | Mixture of silicon oxide and aluminum oxide | Silicon oxide |
| Inert gas | Oxygen gas | Oxygen gas | Oxygen gas |
| n5 | 1.49 | 1.49 | 1.46 |
| d5(nm) | 12.3 | 11.9 | 13.8 |
| Sixth layer (High refractive index material) | | | |
| Deposition source | Zirconium oxide | Tantalum oxide | Cerium oxide |
| Layer material | Zirconium oxide | Tantalum oxide | Cerium oxide |
| Inert gas | Oxygen gas | Oxygen gas | Oxygen gas |
| n6 | 1.95 | 2.01 | 1.85 |
| d6(nm) | 52.6 | 47.9 | 47.1 |
| Seventh layer (Low refractive index material) | | | |
| Deposition source | Silicon oxide | Substance L5 | Silicon oxide |
| Layer material | Silicon oxide | Mixture of silicon oxide and aluminum oxide | Silicon oxide |
| Inert Gas | Oxygen gas | Oxygen gas | Oxygen gas |
| n7 | 1.46 | 1.49 | 1.46 |
| d7(nm) | 99.5 | 97.2 | 82.8 |

<<Laser Light Irradiation Test 1>>

Figure 2:
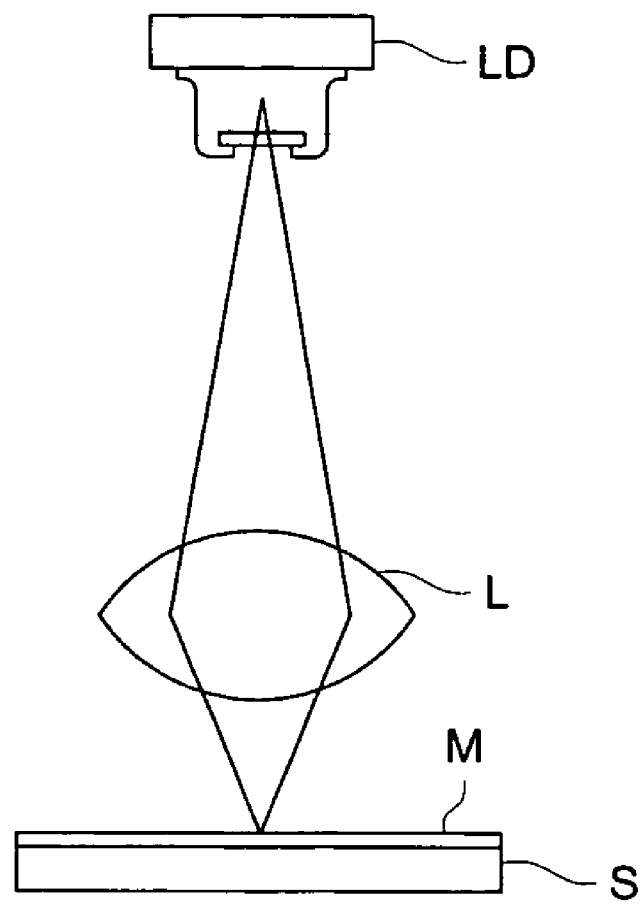
FIG. 2 shows a schematic drawing of the apparatus used for the laser light irradiation test by the inventors.

FIG. 2 shows a schematic drawing of the laser light irradiation test apparatus used by the inventers. In FIG. 2, laser light having a wavelength λ in range of 405 to 415 nm is emitted from a semiconductor laser LD and converged by a converging lens L onto the example or comparative antireflection layer M on the substrate S so as to irradiate for 120 hours. After that the surface of the antireflection layer was observed by a microscope. On the occasion of that, the power density on the substrate A was 120 mW/mm$^2$, temperature of the substrate S was 85° C. and the humidity of the atmosphere was 5%. Evaluation was performed according to the followings:

A: Wrinkle was little observed and the layer was not peeled.

B: Extremely fine wrinkles were observed but the layer was not peeled.

C: Fine wrinkles were observed but the layer was not peeled.

D: Variation of the shape such as occurrence of wrinkles and cracks were clearly observed and the layer was peeled.

<<Laser Light Irradiation Test 2>>

The test was carried out in the same manner as in the above-mentioned except that the irradiation time was prolonged to 250 hours. After the irradiation, the surface of each sample was observed by the microscope. Evaluation was performed according to the following ranking:

A: Wrinkle was little observed and the layer was not peeled.

B: Extremely fine wrinkles were observed but the layer was not peeled.

C: Fine wrinkles were observed but the layer was not peeled.

D: Variation of the shape such as occurrence of wrinkles and cracks were clearly observed and the layer was peeled.

(Measurement of Light Transmittance)

Light flux having a wavelength λ of 405 nm was irradiated to the sample and the transmittance T and reflectance R were measured by a spectrophotometer UP-4000 manufactured by Hitachi Ltd., and light absorption was calculated by 100-T-R. Evaluation was performed according to the following ranking:

A: The light absorption was less than 0.1%.

B: The light absorption was not less than 0.1% and less than 0.5%.

C: The light absorption was not less than 0.5% and less than 2%.

D: The light absorption was not less than 2%.

Figure 3:
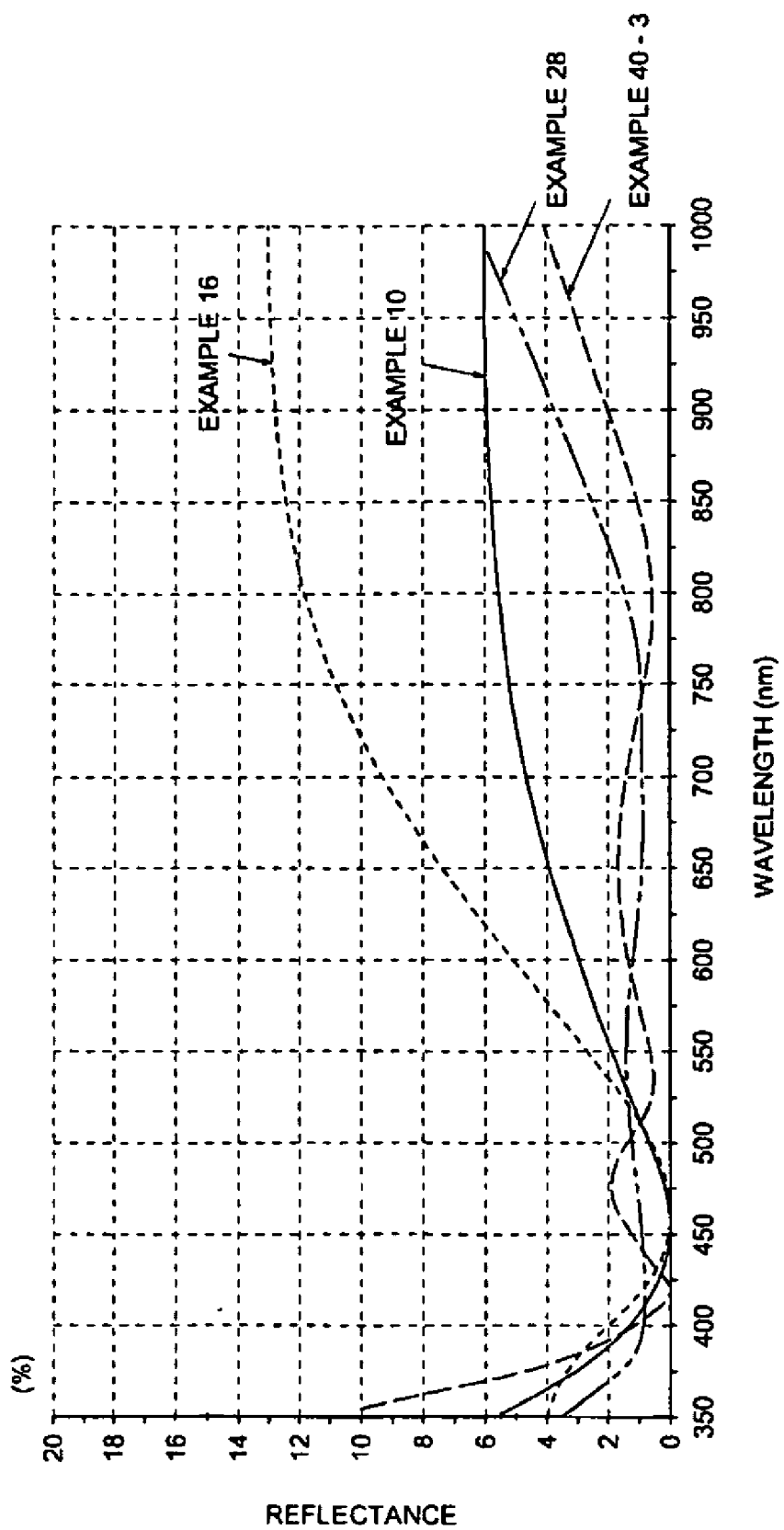
FIG. 3 shows a graph displaying the reflectance of Examples 10, 16, 28 and 40-3 in which the reflectance is measured on the vertical axis and the wavelength is measured on the horizontal axis.
Figure 4:
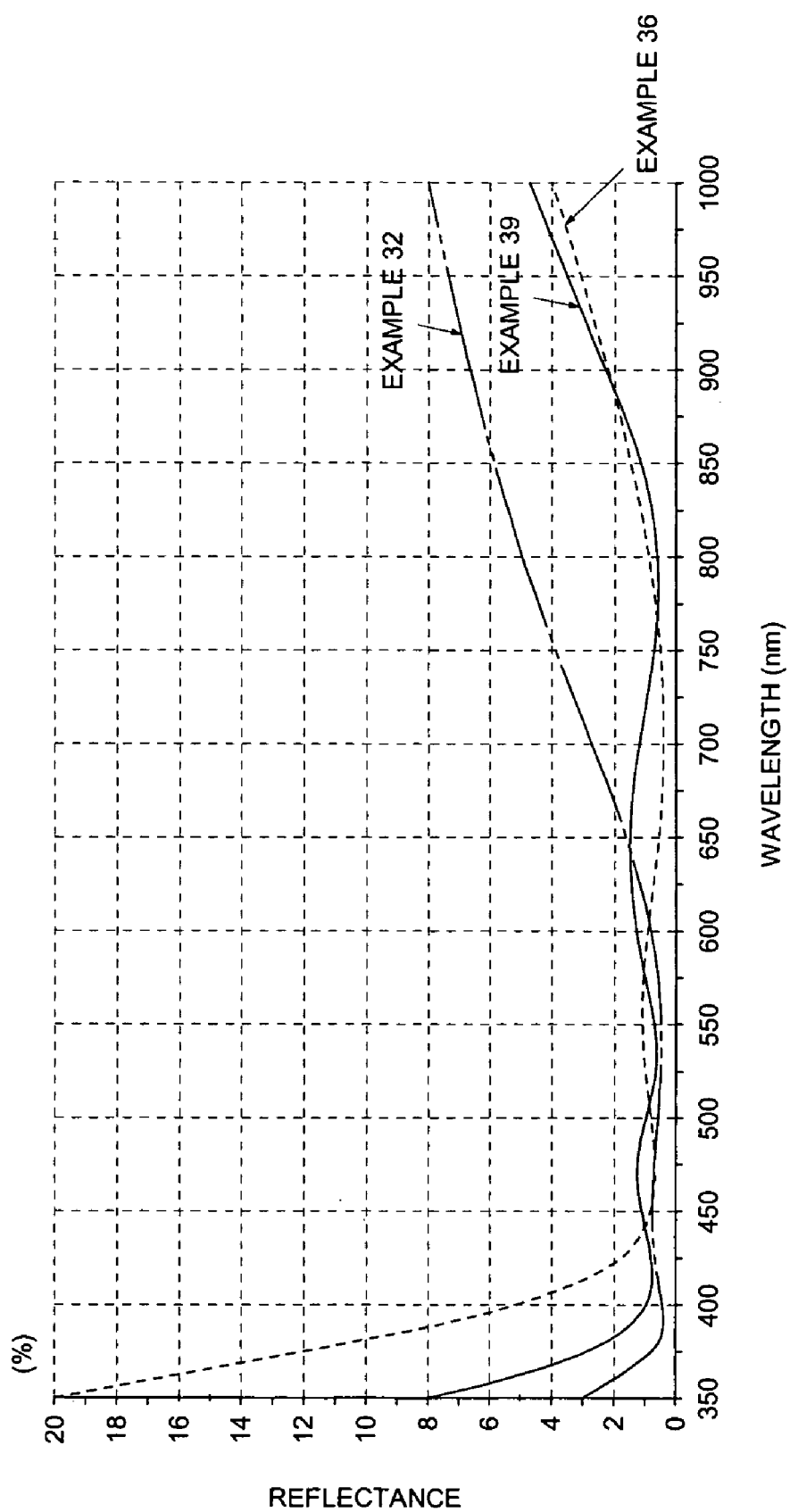
FIG. 4 shows a graph displaying the reflectance of Examples 32, 36 and 39, in which the reflectance is measured on the vertical axis and the wavelength is measured on the horizontal axis.
Figure 5:
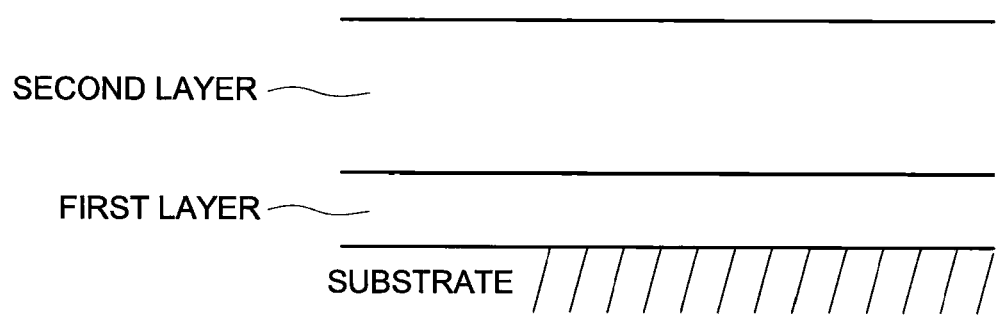
FIG. 5 shows a cross-sectional view of an example of the antireflection film formed of two layers.
Figure 6:
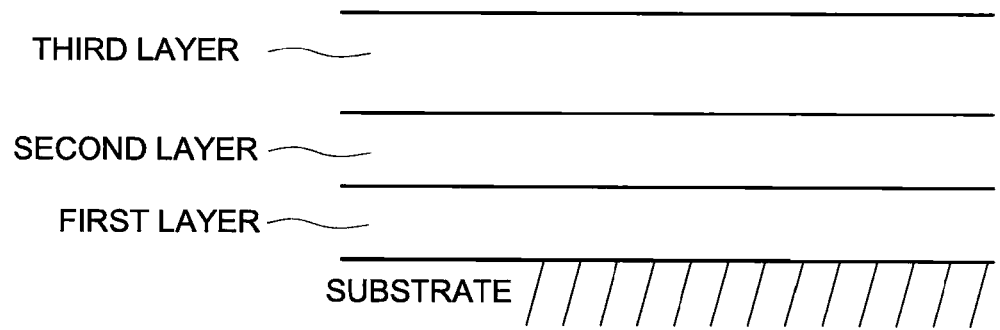
FIG. 6 shows a cross-sectional view of an example of the antireflection film formed of three layers.
Figure 7:
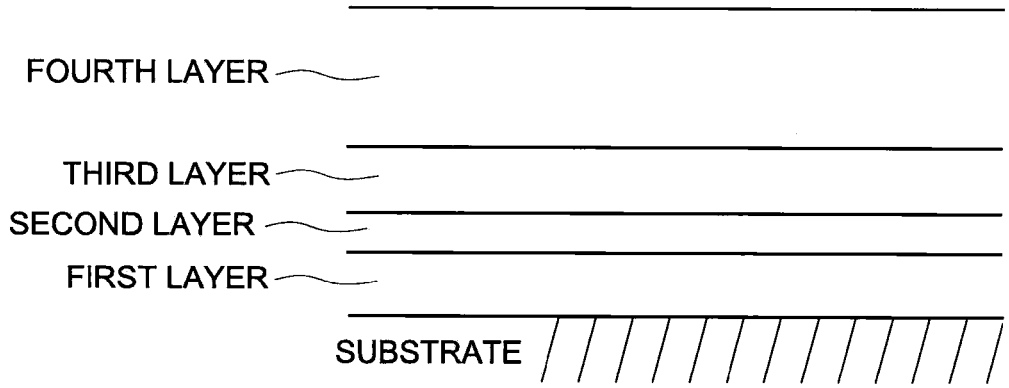
FIG. 7 shows a cross-sectional view of an example of the antireflection film formed of four layers.
Figure 8:
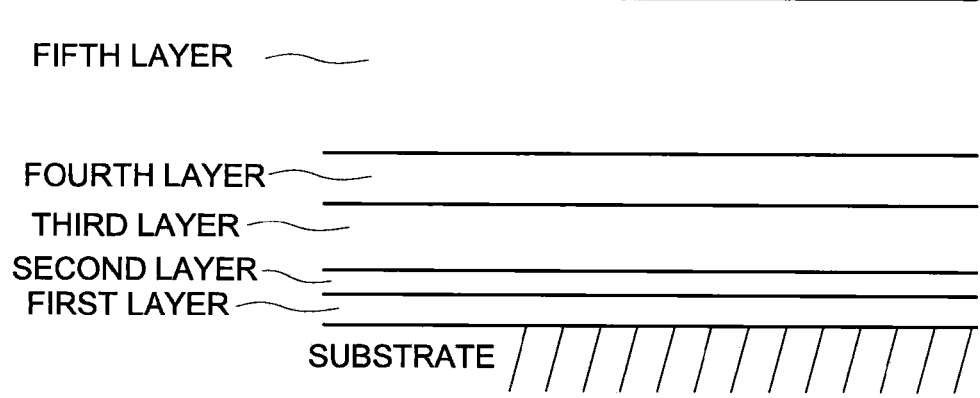
FIG. 8 shows a cross-sectional view of an example of the antireflection film formed of five layers.
Figure 9:
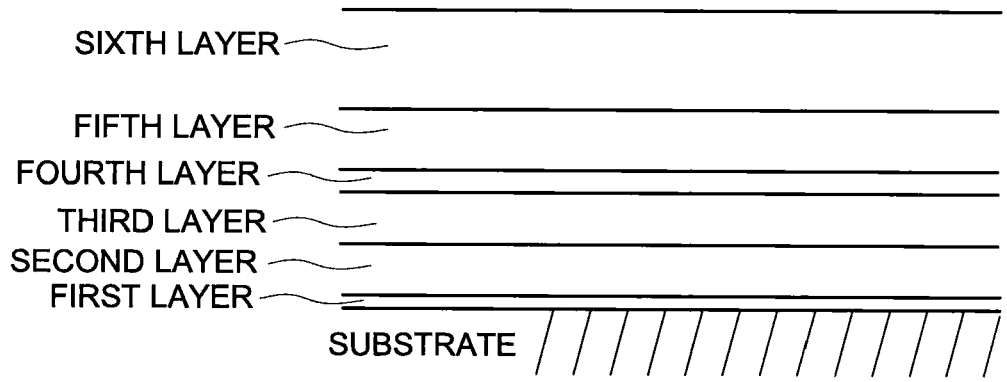
FIG. 9 shows a cross-sectional view of an example of the antireflection film formed of six layers.
Figure 10:
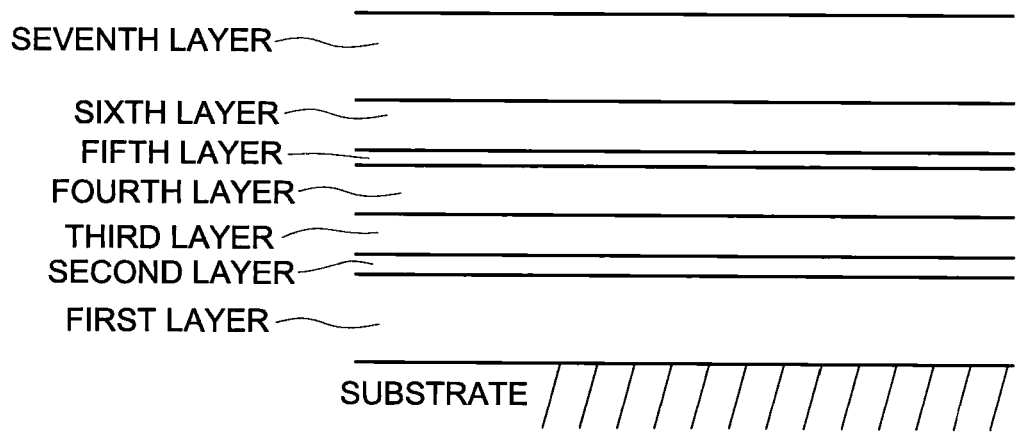
FIG. 10 shows a cross-sectional view of an example of the antireflection film formed of seven layers.

A graph showing the reflectance of Examples 10, 16 and 28 is displayed in FIG. 3 and that of Examples 32, 36 and 39 are displayed in FIG. 4.

(Environmental Resistivity Test)

The samples were stood for 168 hours in an environment of high temperature (60° C.) and high humidity (90%) and the appearance of them were visually observed. Evaluation was performed according to the following ranking:

A: Any wrong change such as peeling of the layer and the occurrence of cracks was not observed.

B: Though the layer is not peeled, extremely slight cracks (line-shaped) was observed.

C: Though the layer is not peeled, cracks (line-shaped) was slightly observed.

D: Peeling of the layer and the occurrence of cracks were clearly observed.

According to the above test results, it was synthetically evaluated that the sample has or not has suitable property for the optical pickup apparatus employing the short wavelength laser light. The results of the synthetic evaluation were ranked as follows:

A: The sample was judged that it had very high reliability when it is employed in the optical pickup apparatus using the short wavelength laser light.

B: The sample was judged that it had high reliability for the same use.

C: The sample was judged that it was usable at least for the optical pickup apparatus employing the short wavelength laser light.

D: The sample was judged that it was not suitable for the optical pickup apparatus employing the short wavelength laser light.

The foregoing evaluation results are listed in Table 8.

TABLE 8

| | I | II | III | IV | V |
|---|---|---|---|---|---|
| Example 1 | B | A | B | B | A |
| Example 2 | B | C | C | B | C |
| Example 3 | B | A | B | B | A |
| Example 4 | B | B | B | B | B |
| Example 5 | B | B | B | B | B |
| Example 6 | B | B | B | B | B |
| Example 7 | A | A | B | B | A |
| Example 8 | B | C | C | B | C |

TABLE 8-continued

|  | I | II | III | IV | V |
|---|---|---|---|---|---|
| Example 9 | A | A | A | B | A |
| Example 10 | A | B | B | B | A |
| Example 11 | A | B | B | B | A |
| Comparative Example 1 | D | D | D | B | D |
| Comparative Example 2 | C | D | D | B | D |
| Comparative Example 3 | D | D | D | B | D |
| Comparative Example 4 | D | D | C | B | D |
| Example 12 | C | C | C | B | C |
| Example 13 | B | B | B | B | B |
| Example 14 | A | A | B | B | A |
| Example 15 | A | A | A | B | A |
| Example 16 | A | B | B | B | A |
| Example 17 | B | B | B | C | C |
| Example 18 | A | A | A | B | A |
| Example 19 | B | B | B | C | C |
| Example 20 | B | B | B | C | C |
| Example 21 | A | B | A | C | C |
| Example 22 | A | B | A | C | C |
| Comparative Example 5 | B | D | C | C | D |
| Comparative Example 6 | B | D | D | B | D |
| Example 23 | B | A | A | B | A |
| Example 24 | B | B | A | B | A |
| Example 25 | B | B | A | B | A |
| Example 26 | B | B | B | B | B |
| Example 27 | A | A | A | B | A |
| Example 28 | A | A | A | B | A |
| Example 29 | A | A | B | B | A |
| Example 29-2 | A | A | B | B | A |
| Comparative Example 7 | B | D | D | B | D |
| Example 30 | A | B | B | B | B |
| Example 31 | A | A | A | B | A |
| Example 32 | A | A | A | B | A |
| Example 33 | A | A | B | B | A |
| Example 33-2 | A | A | B | B | A |
| Example 33-3 | A | A | B | B | A |
| Comparative Example 8 | B | D | D | B | D |
| Example 34 | A | B | B | B | B |
| Example 35 | A | A | A | B | A |
| Example 36 | A | A | B | B | A |
| Example 36-2 | A | A | B | B | A |
| Comparative Example 9 | B | D | D | B | D |
| Example 37 | A | B | B | B | B |
| Example 38 | A | A | A | B | A |
| Example 39 | A | A | A | B | A |
| Example 40 | A | A | B | B | A |
| Example 40-2 | A | A | B | B | A |
| Example 40-3 | A | A | B | B | A |
| Comparative Example 10 | B | D | D | B | D |

I: Laser Light Irradiation Test 1
II: Laser Light Irradiation Test 2
III: Measurement Of Light Transmittance
IV: Environmental Resistivity Test
V: Overall Evaluation It is understood from the above test results that the degradation of the optical property of the optical element can be inhibited for a long period when the antireflection layer of the optical element has the low refractive layer comprising a material including scandium oxide; niobium oxide; lanthanum oxide; praseodymium titanate; lanthanum titanate; lanthanum aluminate; yttrium oxide; hafnium oxide; zirconium oxide; tantalum oxide; a mixture of tantalum oxide and titanium; and silicon nitride; or a mixture thereof, even when the optical element is employed in the optical system of the optical pickup apparatus having the short wavelength laser light source.

In the above, the invention is described referring the embodiments. However, the invention is not limited to the above embodiments, and it can be of course optionally varied or improved.

What is claimed is:

1. An optical element for use in an optical pickup apparatus, the optical element comprising:
    a substrate made of resin; and
    an antireflection layer transmitting a light flux with a wavelength $\lambda 1$ from a first light source, arranged on at least one surface on the substrate and comprising a low refractive index layer and a high refractive index layer,
    wherein the resin includes a polymer with an alicyclic structure,
    the wavelength $\lambda 1$ satisfies $350 \text{ nm} \leq \lambda 1 \leq 450 \text{ nm}$,
    the low refractive index layer has a first refractive index when the light flux with the wavelength $\lambda 1$ passes through the low refractive index layer and comprises a material selected from the group consisting of silicon oxide, aluminum fluoride, yttrium fluoride, magnesium fluoride, and a mixture of silicon oxide and aluminum oxide,
    the high refractive index layer has a second refractive index that is higher than the first refractive index when the light flux with the wavelength $\lambda 1$ passes through the high refractive index layer and comprises a material selected from the group consisting of scandium oxide, niobium oxide, lanthanum oxide, praseodymium titanate, lanthanum titanate, lanthanum aluminate, yttrium oxide, hafnium oxide, zirconium oxide, tantalum oxide, a mixture of tantalum oxide and titanium, and silicon nitride,
    wherein the polymer with an alicyclic structure comprises repeating units whose weight average molecular weight (Mw) is in a range of 1,000-1,000,000,
    the repeating units comprises an alicyclic repeating unit (a) represented by Formula (1) and a chain structure repeating unit (b) represented by Formula (2) or (3),
    a total content of the repeating unit (a) and the repeating unit (b) is not less than 90% by weight,
    a content of the repeating unit (b) is not less than 1% and less than 10% by weight,

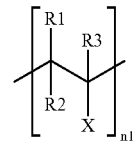

Formula (1)

wherein, X represents an alicyclic hydrocarbon group,

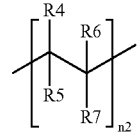

Formula (2)

-continued

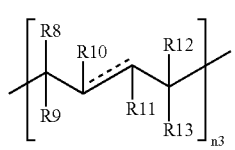

Formula (3)

wherein R1 through R13 in Formulas (1), (2), and (3) each represents independently a hydrogen atom, a halogen atom, an alkoxy group, a hydroxyl group, an ether group, an ester group, a cyano group, an amido group, an imido group, a silyl group, or a chain hydrocarbon group, provided that the chain hydrocarbon group may be substituted with a polar group of a halogen atom, an alkoxy group, a hydroxyl group, an ether group, an ester group, a cyano group, an amido group, an imino group, or a silyl group, and the symbol ". . . ." in Formula (3) represents a carbon-carbon saturated bond or a carbon-carbon unsaturated bond.

2. The optical element of claim 1,
wherein the high refractive index layer comprises a material selected from the group consisting of scandium oxide, lanthanum oxide, lanthanum aluminate, praseodymium titanate, lanthanum titanate, hafnium oxide, zirconium oxide, tantalum oxide, a mixture of tantalum oxide and titanium, and silicon nitride.

3. The optical element of claim 1,
wherein the high refractive index layer comprises a material selected from the group consisting of scandium oxide, lanthanum oxide, lanthanum aluminate, hafnium oxide, zirconium oxide, tantalum oxide, and silicon nitride.

4. The optical element of claim 1,
wherein the antireflection layer consists of a high refractive index layer and a low refractive index layer laminated sequentially on the resin substrate in an order the layers are listed herein.

5. The optical element of claim 4,
wherein the antireflection layer consists of a first layer and a second layer laminated on the resin substrate in an order the layers are listed herein,
the first layer is formed of the high refractive index material, and
the second layer is formed of the low refractive index material, and
the first and second layers satisfy following expressions:

$1.7 \leq n1, 15\ nm \leq d1 \leq 91\ nm$ $1.2 \leq n2 \leq 1.55, 30\ nm \leq d2 \leq 118\ nm$ where n1 and n2 are refractive indexes of materials of the first and second layers and d1 and d2 are thickness of the first and second layers respectively.

6. The optical element of claim 1,
wherein the antireflection layer consists of a low refractive index layer, a high refractive index layer, and a low refractive index layer laminated sequentially on the resin substrate in an order the layers are listed herein.

7. The optical element of claim 1,
wherein the antireflection layer further comprises a middle refractive index layer having a third refractive index that is higher than the first refractive index and is lower than the second refractive index when the light flux with the wavelength λ1 passes through the middle refractive index layer, and the middle refractive index layer comprises a material selected from the group consisting of lanthanum fluoride, neodymium fluoride, cerium oxide, aluminum fluoride, lanthanum aluminate, lead fluoride, and aluminum oxide.

8. The optical element of claim 1,
wherein the antireflection layer comprises four or more layers laminated on the resin substrate.

9. The optical element of claim 8,
wherein the antireflection layer consists of four layers formed on the resin substrate,
a first layer is formed of the high refractive index material,
a second layer is formed of the low refractive index material,
a third layer is formed of the high refractive index material,
a fourth layer is formed of the low refractive index material, and
the first through fourth layers are laminated sequentially on the resin substrate in an order the layers are listed herein and satisfy following expressions, $1.7 \leq n1, 15\ nm \leq d1 \leq 36\ nm$ $1.2 \leq n2 \leq 1.55, 25\ nm \leq d2 \leq 40\ nm$ $1.7 \leq n3, 40\ nm \leq d3 \leq 150\ nm$ $1.2 \leq n4 \leq 1.55, 90\ nm \leq d4 \leq 115\ nm$ where n1 through n4 are refractive indexes of materials of the first through fourth layers and d1 through d4 are thickness of the first through fourth layers respectively.

10. The optical element of claim 7,
wherein the antireflection layer consists of six layers formed on the resin substrate,
a first layer is formed of the high refractive index material,
a second layer is formed of the low refractive index material,
a third layer is formed of the high refractive index material,
a fourth layer is formed of the low refractive index material,
a fifth layer is formed of the high refractive index material,
a sixth layer is formed of the low refractive index material, and
the first through sixth layers are laminated sequentially on the resin substrate in an order the layers are listed herein and satisfy following expressions, $1.7 \leq n1, 8\ nm \leq d1 \leq 15\ nm$ $1.2 \leq n2 \leq 1.55, 35\ nm \leq d2 \leq 55\ nm$ $1.7 \leq n3, 40\ nm \leq d3 \leq 60\ nm$ $1.2 \leq n4 \leq 1.55, 10\ nm \leq d4 \leq 17\ nm$ $1.7 \leq n5, 45\ nm \leq d5 \leq 90\ nm$ $1.2 \leq n6 \leq 1.55, 70\ nm \leq d6 \leq 110\ nm$ where n1 through n6 are refractive indexes of materials of the first through sixth layers and d1 through d6 are thickness of the first through sixth layers respectively.

11. The optical element of claim 8,
wherein the low refractive index layer comprises a material selected from the group consisting of silicon oxide, and a mixture of silicon oxide and aluminum oxide as a main ingredient, the high refractive index layer comprises a material selected from the group consisting of hafnium oxide, lanthanum aluminate, zirconium oxide, tantalum oxide, and silicon nitride as a main ingredient.

12. The optical element of claim 8,
wherein the optical pickup apparatus further comprising a second light source emitting a light flux with at least one wavelength chosen from a wavelength λ2 and a wavelength λ3 that satisfy following expressions, 620 nm≦λ2≦670 nm, 760 nm≦λ3≦800 nm, and the optical element transmits light fluxes emitted by the first and second light sources.

13. The optical element of claim 1,
wherein the polymer with the alicyclic structure comprises a polymer block (A) including a repeating unit 1 represented by Formula (11); and a polymer block (B) including the repeating unit (1) represented by Formula (11) and a repeating unit (2) represented by Formula (12) and/or a repeating unit (3) represented by Formula (13), and
the mole ratio a (mole-%) of the repeating unit 1 in the polymer block (A) and the mole ratio b (mole-%) of the repeating unit (1) in the polymer block (B) satisfy a>b,

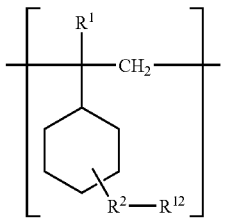

Formula (11)

wherein $R^1$ represents a hydrogen atom or an alkyl group having 1 to 20 carbon atoms,
$R^2$ through $R^{12}$ each represents independently a hydrogen atom, an alkyl group having 1 to 20 carbon atoms, a hydroxyl group, an alkoxyl group having 1 to 20 carbon atoms or an halogen atom,

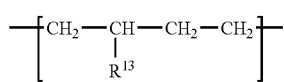

Formula (12)

wherein $R^{13}$ represents a hydrogen atom or an alkyl group having 1 to 20 carbon atoms,

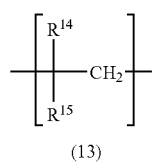

Formula (13)

wherein $R^{14}$ and $R^{15}$ each represents independently a hydrogen atom or an alkyl group having 1 to 20 carbon atoms.

14. The optical element of claim 1,
wherein the optical element is an objective lens converging the light flux with the wavelength λ1 from the first light source onto an information recording surface of an information recording medium.

15. An optical element for use in an optical pickup apparatus, the optical element comprising:
a substrate made of resin; and
an antireflection layer transmitting a light flux with a wavelength λ1 from a first light source, arranged on at least one surface on the substrate and comprising a low refractive index layer and a high refractive index layer,
wherein the resin includes a polymer with an alicyclic structure,
the wavelength λ1 satisfies 350 nm≦λ1≦450 nm,
the low refractive index layer has a first refractive index when the light flux with the wavelength λ1 passes through the low refractive index layer and comprises a material selected from the group consisting of silicon oxide, aluminum fluoride, yttrium fluoride, magnesium fluoride, and a mixture of silicon oxide and aluminum oxide,
the high refractive index layer has a second refractive index that is higher than the first refractive index when the light flux with the wavelength λ1 passes through the high refractive index layer and comprises a material selected from the group consisting of scandium oxide, niobium oxide, lanthanum oxide, praseodymium titanate, lanthanum titanate, lanthanum aluminate, yttrium oxide, hafnium oxide, zirconium oxide, tantalum oxide, a mixture of tantalum oxide and titanium, and silicon nitride,
wherein the antireflection layer consists of five layers formed on the resin substrate,
a first layer is formed of the low refractive index material,
a second layer is formed of the high refractive index material,
a third layer is formed of the low refractive index material,
a fourth layer is formed of the high refractive index material,
a fifth layer is formed of the low refractive index material; and
the first through fifth layers are laminated sequentially on the resin substrate in an order the layers are listed herein and satisfy following expressions, 1.2≦n1≦1.55, 5 nm d1≦20 nm 1.7≦n2, 15 nm≦d2≦35 nm 1.2≦n3≦1.55, 25 nm≦d3≦45 nm 1.7≦n4, 50 nm≦d4≦130 nm 1.2≦n5≦1.55, 80 nm≦d5≦110 nm where n1 through n5 are refractive indexes of materials of the first through fifth layers and d1 through d5 are thickness of the first through fifth layers respectively.

16. An optical element for use in an optical pickup apparatus, the optical element comprising:
a substrate made of resin; and
an antireflection layer transmitting a light flux with a wavelength λ1 from a first light source, arranged on at least one surface on the substrate and comprising a low refractive index layer and a high refractive index layer,
wherein the resin includes a polymer with an alicyclic structure,
the wavelength λ1 satisfies 350 nm≦λ1≦450 nm, the low refractive index layer has a first refractive index when the light flux with the wavelength λ1 passes through the low refractive index layer and comprises a material selected from the group consisting of silicon oxide, aluminum fluoride, yttrium fluoride, magnesium fluoride, and a mixture of silicon oxide and aluminum oxide, the high refractive index layer has a second refractive index that is higher than the first refractive index when the light flux with the wavelength λ1 passes through the high refractive index layer and comprises a material selected from the group consisting of scandium oxide, niobium oxide, lanthanum oxide, praseodymium titanate, lanthanum titanate, lanthanum aluminate, yttrium oxide, hafnium oxide, zirconium oxide, tantalum oxide, a mixture of tantalum oxide and titanium, and silicon nitride, wherein the antireflection layer consists of seven layers formed on the resin substrate, a first layers is formed of the low refractive index material, a second layers is formed of the high refractive index material, a third layers is formed of the low refractive index material, a fourth layers is formed of the high refractive index material, a fifth layers is formed of the low refractive index material, a sixth layers is formed of the high refractive index material a seventh layers is formed of the low refractive index material, and the first through seventh layers are laminated sequentially on the resin substrate in an order the layers are listed herein and satisfy following expressions, $1.2 \leq n1 \leq 1.55$, $80\ nm \leq d1 \leq 160\ nm$ $1.7 \leq n2$, $10\ nm \leq d2 \leq 25\ nm$ $1.2 \leq n3 \leq 1.55$, $30\ nm \leq d3 \leq 45\ nm$ $1.7 \leq n4$, $40\ nm \leq d4 \leq 85\ nm$ $1.2 \leq n5 \leq 1.55$, $10\ nm \leq d5 \leq 20\ nm$ $1.7 \leq n6$, $6\ nm \leq d6 \leq 70\ nm$ $1.2 \leq n7 \leq 1.55$, $60\ nm \leq d7 \leq 110\ nm$ where n1 through n7 are refractive indexes of materials of the first through seventh layers and d1 through d7 are thickness of the first through seventh layers respectively.

17. An optical pickup apparatus, comprising:

a first light source emitting a light flux with a wavelength λ1 that satisfies $350\ nm \leq \lambda 1 \leq 450\ nm$;

an optical element arranged at a position where the light flux emitted by the first light source passes through;

an objective lens for converging the light flux emitted from the first light source onto an information recording medium of an optical information recording medium, wherein the optical element comprises a resin substrate;

an antireflection layer transmitting the light flux from the first light source, arranged on at least one surface on the substrate and comprising a low refractive index layer and a high refractive index layer, wherein the resin includes a polymer with an alicyclic structure, the low refractive index layer has a first refractive index when the light flux with the wavelength λ1 passes through the low refractive index layer and comprises a material selected from the group consisting of silicon oxide, aluminum fluoride, yttrium fluoride, magnesium fluoride, and a mixture of silicon oxide and aluminum oxide, the high refractive index layer has a second refractive index that is higher than the first refractive index when the light flux with the wavelength λ1 passes through the high refractive index layer and comprises a material selected from the group consisting of scandium oxide, niobium oxide, lanthanum oxide, praseodymium titanate, lanthanum titanate, lanthanum aluminate, yttrium oxide, hafnium oxide, zirconium oxide, tantalum oxide, a mixture of tantalum oxide and titanium, and silicon nitride, wherein the polymer with an alicyclic structure comprises repeating units whose weight average molecular weight (Mw) is in a range of 1,000-1,000,000, the repeating units comprises an alicyclic repeating unit (a) represented by Formula (1) and a chain structure repeating unit (b) represented by Formula (2) or (3), a total content of the repeating unit (a) and the repeating unit (b) is not less than 90% by weight, a content of the repeating unit (b) is not less than 1% and less than 10% by weight,

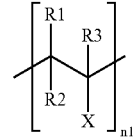

Formula (1)

wherein, X represents an alicyclic hydrocarbon group,

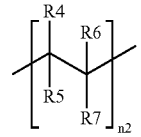

Formula (2)

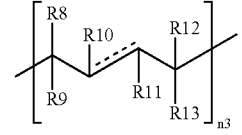

Formula (3)

wherein R1 through R13 in Formulas (1), (2) and (3) each represents independently a hydrogen atom, a halogen atom, an alkoxy group, a hydroxyl group, an ether group, an ester group, a cyano group, an amido group, an imido group, a silyl group, or a chain hydrocarbon group, provided that the chain hydrocarbon group may be substituted with a polar group of a halogen atom, an alkoxy group, a hydroxyl group, an ether group, an ester group, a cyano group, an amido group, an imino group, or a silyl group, and the symbol ". . . ." in Formula (3) represents a carbon-carbon saturated bond or a carbon-carbon unsaturated bond.

18. The optical pickup apparatus of claim 17, wherein the high refractive index layer comprises a material selected from the group consisting of scandium oxide, lanthanum oxide, lanthanum aluminate, praseodymium titanate, lanthanum titanate, hafnium oxide, zirconium oxide, tantalum oxide, a mixture of tantalum oxide and titanium, and silicon nitride.

19. The optical pickup apparatus of claim 17, wherein the high refractive index layer comprises a material selected from the group consisting of scandium oxide, lanthanum oxide, lanthanum aluminate, hafnium oxide, zirconium oxide, tantalum oxide, and silicon nitride.

20. The optical pickup apparatus of claim 17, wherein the antireflection layer consists of a high refractive index layer and a low refractive index layer laminated sequentially on the resin substrate in an order the layers are listed herein.

21. The optical pickup apparatus of claim 20, wherein the antireflection layer consists of a first layer and a second layer laminated on the resin substrate in an order the layers are listed herein, the first layer is formed of the high refractive index material, and the second layer is formed of the low refractive index material, and the first and second layers satisfy following expressions:

$1.7 \leq n1$, $15\ \text{nm} \leq d1 \leq 91\ \text{nm}$ $1.2 \leq n2 \leq 1.55$, $30\ \text{nm} \leq d2 \leq 118\ \text{nm}$ where n1 and n2 are refractive indexes of materials of the first and second layers and d1 and d2 are thickness of the first and second layers respectively.

22. The optical pickup apparatus of claim 17, wherein the antireflection layer consists of a low refractive index layer, a high refractive index layer, and a low refractive index layer laminated sequentially on the resin substrate in an order the layers are listed herein.

23. The optical pickup apparatus of claim 17, wherein the antireflection layer further comprises a middle refractive index layer having a third refractive index that is higher than the first refractive index and is lower than the second refractive index when the light flux with the wavelength λ1 passes through the middle refractive index layer and the middle refractive index layer comprises a material selected from the group consisting of lanthanum fluoride, neodymium fluoride, cerium oxide, aluminum fluoride, lanthanum aluminate, lead fluoride, and aluminum oxide.

24. The optical pickup apparatus of claim 17, wherein the antireflection layer comprises four or more layers laminated on the resin substrate.

25. The optical pickup apparatus of claim 24, wherein the antireflection layer consists of four layers formed on the resin substrate, a first layer is formed of the high refractive index material, a second layer is formed of the low refractive index material, a third layer is formed of the high refractive index material, a fourth layer is formed of the low refractive index material, and the first through fourth layers are laminated sequentially on the resin substrate in an order the layers are listed herein and satisfy following expressions, $1.7 \leq n1$, $15\ \text{nm} \leq d1 \leq 36\ \text{nm}$ $1.2 \leq n2 \leq 1.55$, $25\ \text{nm} \leq d2 \leq 40\ \text{nm}$ $1.7 \leq n3$, $40\ \text{nm} \leq d3 \leq 150\ \text{nm}$ $1.2 \leq n4 \leq 1.55$, $90\ \text{nm} \leq d4 \leq 115\ \text{nm}$ where n1 through n4 are refractive indexes of materials of the first through fourth layers and d1 through d4 are thickness of the first through fourth layers respectively.

26. The optical pickup apparatus of claim 24, wherein the antireflection layer consists of six layers formed on the resin substrate, a first layer is formed of the high refractive index material, a second layer is formed of the low refractive index material, a third layer is formed of the high refractive index material, a fourth layer is formed of the low refractive index material, a fifth layer is formed of the high refractive index material, a sixth layer is formed of the low refractive index material, and the first through sixth layers are laminated sequentially on the resin substrate in an order the layers are listed herein and satisfy following expressions, $1.7 \leq n1$, $8\ \text{nm} \leq d1 \leq 15\ \text{nm}$ $1.2 \leq n2 \leq 1.55$, $35\ \text{nm} \leq d2 \leq 55\ \text{nm}$ $1.7 \leq n3$, $40\ \text{nm} \leq d3 \leq 60\ \text{nm}$ $1.2 \leq n4 \leq 1.55$, $10\ \text{nm} \leq d4 \leq 17\ \text{nm}$ $1.7 \leq n5$, $45\ \text{nm} \leq d5 \leq 90\ \text{nm}$ $1.2 \leq n6 \leq 1.55$, $70\ \text{nm} \leq d6 \leq 110\ \text{nm}$ where n1 through n6 are refractive indexes of materials of the first through sixth layers and d1 through d6 are thickness of the first through sixth layers respectively.

27. The optical pickup apparatus of claim 24, wherein the low refractive index layer comprises a material or a mixture of materials selected from the group consisting of silicon oxide, and a mixture of silicon oxide and aluminum oxide as a main ingredient, the high refractive index layer comprises a material selected from the group consisting of hafnium oxide, lanthanum aluminate, zirconium oxide, tantalum oxide, and silicon nitride as a main ingredient.

28. The optical pickup apparatus of claim 24, further comprising a second light source emitting a light flux with at least one wavelength chosen from a wavelength λ2 and a wavelength λ3 that satisfy following expressions, $620\ \text{nm} \leq \lambda 2 \leq 670\ \text{nm}$, $760\ \text{nm} \leq \lambda 3\ 800\ \text{nm}$, and the optical element transmits light fluxes emitted by the first and second light sources.

29. The optical pickup apparatus of claim 17, wherein the optical element is the objective lens.

30. The optical pickup apparatus of claim 17, wherein the polymer with the alicyclic structure comprises a polymer block (A) including a repeating unit 1 represented by Formula (11); and a polymer block (B) including the repeating unit (1) represented by Formula (11) and a repeating unit (2) represented by Formula (12) and/or a repeating unit (3) represented by Formula (13), and the mole ratio a (mole-%) of the repeating unit 1 in the polymer block (A) and the mole ratio b (mole-%) of the repeating unit (1) in the polymer block (B) satisfy a>b,

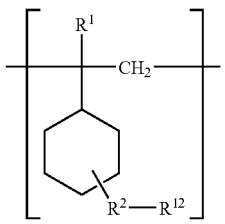

Formula (11)

wherein $R^1$ represents a hydrogen atom or an alkyl group having 1 to 20 carbon atoms, $R^2$ through $R^{12}$ each represents independently a hydrogen atom, an alkyl group having 1 to 20 carbon atoms, a hydroxyl group, an alkoxyl group having 1 to 20 carbon atoms or an halogen atom,

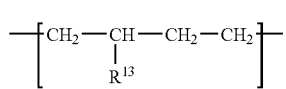

Formula (12)

wherein $R^{13}$ represents a hydrogen atom or an alkyl group having 1 to 20 carbon atoms,

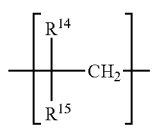

Formula (13)

wherein $R^{14}$ and $R^{15}$ each represents independently a hydrogen atom or an alkyl group having 1 to 20 carbon atoms.

31. An optical pickup apparatus, comprising:

a first light source emitting a light flux with a wavelength $\lambda 1$ that satisfies 350 nm$\leq \lambda 1 \leq$450 nm;

an optical element arranged at a position where the light flux emitted by the first light source passes through;

an objective lens for converging the light flux emitted from the first light source onto an information recording medium of an optical information recording medium, wherein the optical element comprises a resin substrate;

an antireflection layer transmitting the light flux from the first light source, arranged on at least one surface on the substrate and comprising a low refractive index layer and a high refractive index layer, wherein the resin includes a polymer with an alicyclic structure, the low refractive index layer has a first refractive index when the light flux with the wavelength $\lambda 1$ passes through the low refractive index layer and comprises a material selected from the group consisting of silicon oxide, aluminum fluoride, yttrium fluoride, magnesium fluoride, and a mixture of silicon oxide and aluminum oxide, the high refractive index layer has a second refractive index that is higher than the first refractive index when the light flux with the wavelength $\lambda 1$ passes through the high refractive index layer and comprises a material selected from the group consisting of scandium oxide, niobium oxide, lanthanum oxide, praseodymium titanate, lanthanum titanate, lanthanum aluminate, yttrium oxide, hafnium oxide, zirconium oxide, tantalum oxide, a mixture of tantalum oxide and titanium, and silicon nitride, wherein the antireflection layer consists of five layers formed on the resin substrate, a first layer is formed of the low refractive index material, a second layer is formed of the high refractive index material, a third layer is formed of the low refractive index material, a fourth layer is formed of the high refractive index material, a fifth layer is formed of the low refractive index material, and the first through fifth layers are laminated sequentially on the resin substrate in an order the layers are listed herein and satisfy following expressions, $1.2 \leq n1 \leq 1.55$, 5 nm$\leq d1 \leq$20 nm $1.7 \leq n2$, 15 nm$\leq d2 \leq$35 nm $1.2 \leq n3 \leq 1.55$, 25 nm$\leq d3 \leq$45 nm $1.7 \leq n4$, 50 nm$\leq d4 \leq$130 nm $1.2 \leq n5 \leq 1.55$, 80 nm$\leq d5 \leq$110 nm where n1 through n5 are refractive indexes of materials of the first through fifth layers and d1 through d5 are thickness of the first through fifth layers respectively.

32. An optical pickup apparatus, comprising:

a first light source emitting a light flux with a wavelength $\lambda 1$ that satisfies 350 nm$\leq \lambda 1 \leq$450 nm;

an optical element arranged at a position where the light flux emitted by the first light source passes through;

an objective lens for converging the light flux emitted from the first light source onto an information recording medium of an optical information recording medium, wherein the optical element comprises a resin substrate;

an antireflection layer transmitting the light flux from the first light source, arranged on at least one surface on the substrate and comprising a low refractive index layer and a high refractive index layer, wherein the resin includes a polymer with an alicyclic structure, the low refractive index layer has a first refractive index when the light flux with the wavelength $\lambda 1$ passes through the low refractive index layer and comprises a material selected from the group consisting of silicon oxide, aluminum fluoride, yttrium fluoride, magnesium fluoride, and a mixture of silicon oxide and aluminum oxide, the high refractive index layer has a second refractive index that is higher than the first refractive index when the light flux with the wavelength $\lambda 1$ passes through the high refractive index layer and comprises a material selected from the group consisting of scandium oxide, niobium oxide, lanthanum oxide, praseodymium titanate, lanthanum titanate, lanthanum aluminate, yttrium oxide, hafnium oxide, zirconium oxide, tantalum oxide, a mixture of tantalum oxide and titanium, and silicon nitride, wherein the antireflection layer consists of seven layers formed on the resin substrate, a first layers is formed of the low refractive index material, a second layers is formed of the high refractive index material, a third layers is formed of the low refractive index material, a fourth layers is formed of the high refractive index material, a fifth layers is formed of the low refractive index material, a sixth layers is formed of the high refractive index material, a seventh layers is formed of the low refractive index material, and the first through seventh layers are laminated sequentially on the resin substrate in an order the layers are listed herein and satisfy following expressions, $1.2 \leq n1 \leq 1.55$, 80 nm $\leq d1 \leq 160$ nm $1.7 \leq n2$, 10 nm $\leq d2 \leq 25$ nm $1.2 \leq n3 \leq 1.55$, 30 nm $\leq d3 \leq 45$ nm $1.7 \leq n4$, 40 nm $\leq d4 \leq 85$ nm $1.2 \leq n5 \leq 1.55$, 10 nm $\leq d5 \leq 20$ nm $1.7 \leq n6$, 6 nm $\leq d6 \leq 70$ nm $1.2 \leq n7 \leq 1.55$, 60 nm $\leq d7 \leq 110$ nm where n1 through n7 are refractive indexes of materials of the first through seventh layers and d1 through d7 are thickness of the first through seventh layers respectively.

33. An optical element for use in an optical pickup apparatus, the optical element comprising:

a substrate made of resin; and an antireflection layer transmitting a light flux with a wavelength λ1 from a first light source, arranged on at least one surface on the substrate and comprising a low refractive index layer and a high refractive index layer, wherein the resin includes a polymer with an alicyclic structure, the wavelength λ1 satisfies 350 nm $\leq$ λ1 $\leq$ 450 nm, the low refractive index layer has a first refractive index when the light flux with the wavelength λ1 passes through the low refractive index layer and comprises a material selected from the group consisting of silicon oxide, aluminum fluoride, yttrium fluoride, magnesium fluoride, and a mixture of silicon oxide and aluminum oxide, the high refractive index layer has a second refractive index that is higher than the first refractive index when the light flux with the wavelength λ1 passes through the high refractive index layer and comprises a material selected from the group consisting of scandium oxide, niobium oxide, lanthanum oxide, praseodymium titanate, lanthanum titanate, lanthanum aluminate, yttrium oxide, hafnium oxide, zirconium oxide, tantalum oxide, a mixture of tantalum oxide and titanium, and silicon nitride, wherein the antireflection layer consists of a first layer, a second layer, and a third layer laminated on the resin substrate in an order the layers are listed herein, the first layer is formed of the low refractive index material, the second layer is formed of the high refractive index material, the third layer is formed of the low refractive index material, and the first through third layers satisfy following expressions:

$1.2 \leq n1 \leq 1.55$, 10 nm $\leq d1 \leq 130$ nm $1.7 \leq n2$, 20 nm $\leq d2 \leq 110$ nm $1.2 \leq n3 \leq 1.55$, 35 nm $\leq d3 \leq 90$ nm where n1 through n3 are refractive indexes of materials of the first through third layers and d1 through d3 are thickness of the first through third layers respectively.

34. An optical element for use in an optical pickup apparatus, the optical element comprising:

a substrate made of resin; and an antireflection layer transmitting a light flux with a wavelength λ1 from a first light source, arranged on at least one surface on the substrate and comprising a low refractive index layer and a high refractive index layer, wherein the resin includes a polymer with an alicyclic structure, the wavelength λ1 satisfies 350 nm $\leq$ λ1 $\leq$ 450 nm, the low refractive index layer has a first refractive index when the light flux with the wavelength λ1 passes through the low refractive index layer and comprises a material selected from the group consisting of silicon oxide, aluminum fluoride, yttrium fluoride, magnesium fluoride, and a mixture of silicon oxide and aluminum oxide, the high refractive index layer has a second refractive index that is higher than the first refractive index when the light flux with the wavelength λ1 passes through the high refractive index layer and comprises a material selected from the group consisting of scandium oxide, niobium oxide, lanthanum oxide, praseodymium titanate, lanthanum titanate, lanthanum aluminate, yttrium oxide, hafnium oxide, zirconium oxide, tantalum oxide, a mixture of tantalum oxide and titanium, and silicon nitride, wherein the antireflection layer consists of a first layer, a second layer, and a third layer laminated on the resin substrate in an order the layers are listed herein, the first layer is formed of the middle refractive index material, the second layer is formed of the high refractive index material, the third layer is formed of the low refractive index material, and the first through third layers satisfy following expressions:

$1.55 \leq n1 \leq 17$, 40 nm $\leq d1 \leq 110$ nm $1.7 \leq n2$, 35 nm $\leq d2 \leq 90$ nm $1.2 \leq n3 \leq 1.55$, 45 nm $\leq d3 \leq 85$ nm where n1 through n3 are refractive indexes of materials of the first through third layers and d1 through d3 are thickness of the first through third layers respectively.

35. An optical pickup apparatus, comprising:

a first light source emitting a light flux with a wavelength λ1 that satisfies 350 nm $\leq$ λ1 $\leq$ 450 nm;

an optical element arranged at a position where the light flux emitted by the first light source passes through;

an objective lens for converging the light flux emitted from the first light source onto an information recording medium of an optical information recording medium, wherein the optical element comprises a resin substrate;

an antireflection layer transmitting the light flux from the first light source, arranged on at least one surface on the substrate and comprising a low refractive index layer and a high refractive index layer, wherein the resin includes a polymer with an alicyclic structure, the low refractive index layer has a first refractive index when the light flux with the wavelength λ1 passes through the low refractive index layer and comprises a material selected from the group consisting of silicon oxide, aluminum fluoride, yttrium fluoride, magnesium fluoride, and a mixture of silicon oxide and aluminum oxide, the high refractive index layer has a second refractive index that is higher than the first refractive index when the light flux with the wavelength λ1 passes through the high refractive index layer and comprises a material selected from the group consisting of scandium oxide, niobium oxide, lanthanum oxide, praseodymium titanate, lanthanum titanate, lanthanum aluminate, yttrium oxide, hafnium oxide, zirconium oxide, tantalum oxide, a mixture of tantalum oxide and titanium, and silicon nitride, wherein the antireflection layer consists of a first layer, a second layer, and a third layer laminated on the resin substrate in an order the layers are listed herein, the first layer is formed of the low refractive index material, the second layer is formed of the high refractive index material, the third layer is formed of the low refractive index material, and the first through third layers satisfy following expressions:

$$1.2 \leq n1 \leq 1.55,\ 10\ \text{nm} \leq d1 \leq 130\ \text{nm}$$

$$1.7 \leq n2,\ 20\ \text{nm} \leq d2 \leq 110\ \text{nm}$$

$$1.2 \leq n3 \leq 1.55,\ 35\ \text{nm} \leq d3 \leq 90\ \text{nm}$$

where n1 through n3 are refractive indexes of materials of the first through third layers and d1 through d3 are thickness of the first through third layers respectively.

36. An optical pickup apparatus, comprising:

a first light source emitting a light flux with a wavelength λ1 that satisfies 350 nm≦λ1≦450 nm;

an optical element arranged at a position where the light flux emitted by the first light source passes through;

an objective lens for converging the light flux emitted from the first light source onto an information recording medium of an optical information recording medium, wherein the optical element comprises a resin substrate;

an antireflection layer transmitting the light flux from the first light source, arranged on at least one surface on the substrate and comprising a low refractive index layer and a high refractive index layer, wherein the resin includes a polymer with an alicyclic structure, the low refractive index layer has a first refractive index when the light flux with the wavelength λ1 passes through the low refractive index layer and comprises a material selected from the group consisting of silicon oxide, aluminum fluoride, yttrium fluoride, magnesium fluoride, and a mixture of silicon oxide and aluminum oxide, the high refractive index layer has a second refractive index that is higher than the first refractive index when the light flux with the wavelength λ1 passes through the high refractive index layer and comprises a material selected from the group consisting of scandium oxide, niobium oxide, lanthanum oxide, praseodymium titanate, lanthanum titanate, lanthanum aluminate, yttrium oxide, hafnium oxide, zirconium oxide, tantalum oxide, a mixture of tantalum oxide and titanium, and silicon nitride, wherein the antireflection layer consists of a first layer, a second layer, and a third layer laminated on the resin substrate in an order the layers are listed herein, the first layer is formed of the middle refractive index material, the second layer is formed of the high refractive index material, the third layer is formed of the low refractive index material, and the first through third layers satisfy following expressions:

$$1.55 \leq n1 \leq 17,\ 40\ \text{nm} \leq d1 \leq 110\ \text{nm}$$

$$1.7 \leq n2,\ 35\ \text{nm} \leq d2 \leq 90\ \text{nm}$$

$$1.2 \leq n3 \leq 1.55,\ 45\ \text{nm} \leq d3 \leq 85\ \text{nm}$$

where n1 through n3 are refractive indexes of materials of the first through third layers and d1 through d3 are thickness of the first through third layers respectively.

* * * * *